US012638919B2

(12) United States Patent
      Esaka

(10) Patent No.: US 12,638,919 B2
(45) Date of Patent: May 26, 2026

(54) INFORMATION PROCESSING SYSTEM, INFORMATION PROCESSING TERMINAL, AND EXPECTED-OPERATION RECOGNITION METHOD

(71) Applicant: MAXELL, LTD., Kyoto (JP)

(72) Inventor: Fumiaki Esaka, Kyoto (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 18/574,598

(22) PCT Filed: Jun. 28, 2021

(86) PCT No.: PCT/JP2021/024418
     § 371 (c)(1),
     (2) Date: Dec. 27, 2023

(87) PCT Pub. No.: WO2023/275957
     PCT Pub. Date: Jan. 5, 2023

(65) Prior Publication Data
     US 2024/0338075 A1     Oct. 10, 2024

(51) Int. Cl.
     *G06F 3/01*          (2006.01)
(52) U.S. Cl.
     CPC .................................... *G06F 3/015* (2013.01)
(58) Field of Classification Search
     CPC . G06F 3/01; G06F 3/015; G06F 3/147; G06F 3/14; G09G 2380/08
     See application file for complete search history.

(56) References Cited

U.S. PATENT DOCUMENTS 7,120,486 B2 * 10/2006 Leuthardt .............. A61B 5/374
                                                          600/545
7,546,158 B2 *  6/2009 Allison ................... G06F 3/015
                                                          60/545

(Continued)

FOREIGN PATENT DOCUMENTS

JP       2013-016116 A      1/2013
JP       2020-061162 A      4/2020

OTHER PUBLICATIONS

International Search Report dated Aug. 31, 2022 issued in International Patent Application No. PCT/JP2021/024418, with English translation.

*Primary Examiner* — Olga V Merkoulova
(74) *Attorney, Agent, or Firm* — Rimon P.C.

(57)                ABSTRACT
An information processing system includes a brain wave detector and an information processing terminal. The brain wave detector detects a brain wave of a user, converts the detected brain wave into data in accordance with a conversion dictionary for converting characteristics of the brain wave into data processable in the terminal, and transmits the data to the terminal. In accordance with the received data, the terminal executes a corresponding processing corresponding to the data. Further, to the brain wave detector, the terminal transmits a group of data for instruction input used in software in operation in the terminal, during or after execution of a cooperation processing achieving a cooperation operation with the brain wave detector. The brain wave detector stores the received group of data into a storage, and executes a conversion processing by use of the group of data.

14 Claims, 43 Drawing Sheets

(56)         References Cited

U.S. PATENT DOCUMENTS

| | | | |
|---|---|---|---|
| 8,483,816 B1 * | 7/2013 | Payton | A61B 34/30 |
| | | | 700/245 |
| 9,864,431 B2 * | 1/2018 | Keskin | G06F 3/015 |
| 10,126,816 B2 * | 11/2018 | Segal | A61B 5/369 |
| 11,635,813 B2 * | 4/2023 | Coleman | A61B 5/0024 |
| | | | 705/3 |
| 2005/0131311 A1 * | 6/2005 | Leuthardt | A61B 5/293 |
| | | | 600/545 |
| 2012/0049998 A1 * | 3/2012 | Lim | A61B 5/165 |
| | | | 340/1.1 |
| 2012/0090003 A1 * | 4/2012 | Dove | H04N 21/42201 |
| | | | 725/38 |
| 2013/0014024 A1 | 1/2013 | Sudo | |
| 2013/0314243 A1 * | 11/2013 | Le | A61B 5/165 |
| | | | 340/870.01 |
| 2016/0103487 A1 * | 4/2016 | Crawford | A61B 5/117 |
| | | | 600/544 |
| 2018/0246570 A1 * | 8/2018 | Coleman | A61B 5/0006 |
| 2021/0004084 A1 * | 1/2021 | Milstein | G06F 3/147 |

* cited by examiner

| PRIORITY ORDER | OPERATION INPUT SYSTEM |
|---|---|
| 1 | TOUCH INPUT SYSTEM |
| 2 | VOICE/SOUND INPUT SYSTEM |
| 3 | EXPECTATION INPUT SYSTEM |

| FIRST DICTIONARY | | | |
| --- | --- | --- | --- |
| BRAIN WAVE TYPE | OPERATION TYPE | BRAIN WAVE TYPE | OPERATION TYPE |
| P1 | POINTER MOVING UP | T1 | TAP |
| P2 | POINTER MOVING DOWN | T2 | DOUBLE TAP |
| P3 | POINTER MOVING LEFT | N1 | LONG PRESS |
| P4 | POINTER MOVING RIGHT | J1 | PINCH IN |
| S1 | SWIPE UP | J2 | PINCH OUT |
| S2 | SWIPE DOWN | C001 | INPUT "A" |
| S3 | SWIPE LEFT | C002 | INPUT "B" |
| S4 | SWIPE RIGHT | ⋮ | ⋮ |
| F1 | FLICK UP | C026 | INPUT "Z" |
| F2 | FLICK DOWN | E000 | INPUT "0" |
| F3 | FLICK LEFT | E001 | INPUT "1" |
| F4 | FLICK RIGHT | ⋮ | ⋮ |
| D1 | DRAG UP | E009 | INPUT "9" |
| DRAG | DRAG | M001 | INPUT "#" |
| D3 | DRAG LEFT | M002 | INPUT "@" |
| D4 | DRAG RIGHT | ⋮ | ⋮ |

Figure 6:
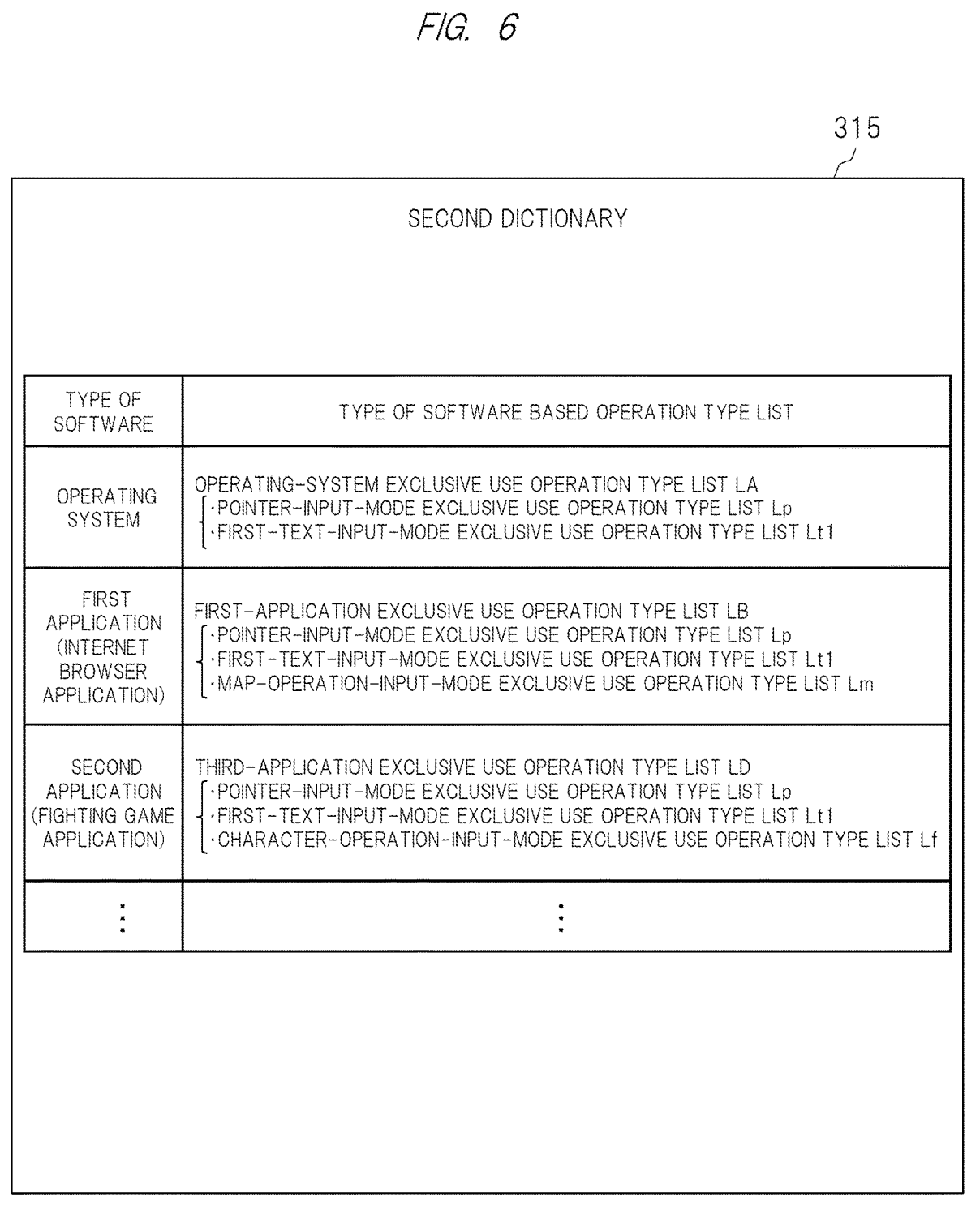

| TYPE OF SOFTWARE | TYPE OF SOFTWARE BASED OPERATION TYPE LIST |
|---|---|
| OPERATING SYSTEM | OPERATING-SYSTEM EXCLUSIVE USE OPERATION TYPE LIST LA<br>⌈ ·POINTER-INPUT-MODE EXCLUSIVE USE OPERATION TYPE LIST Lp<br>⌊ ·FIRST-TEXT-INPUT-MODE EXCLUSIVE USE OPERATION TYPE LIST Lt1 |
| FIRST APPLICATION (INTERNET BROWSER APPLICATION) | FIRST-APPLICATION EXCLUSIVE USE OPERATION TYPE LIST LB<br>⌈ ·POINTER-INPUT-MODE EXCLUSIVE USE OPERATION TYPE LIST Lp<br>{ ·FIRST-TEXT-INPUT-MODE EXCLUSIVE USE OPERATION TYPE LIST Lt1<br>⌊ ·MAP-OPERATION-INPUT-MODE EXCLUSIVE USE OPERATION TYPE LIST Lm |
| SECOND APPLICATION (FIGHTING GAME APPLICATION) | THIRD-APPLICATION EXCLUSIVE USE OPERATION TYPE LIST LD<br>⌈ ·POINTER-INPUT-MODE EXCLUSIVE USE OPERATION TYPE LIST Lp<br>{ ·FIRST-TEXT-INPUT-MODE EXCLUSIVE USE OPERATION TYPE LIST Lt1<br>⌊ ·CHARACTER-OPERATION-INPUT-MODE EXCLUSIVE USE OPERATION TYPE LIST Lf |
| ⋮ | ⋮ |

SECOND DICTIONARY

FIG. 7

| TYPE OF INPUT MODE | TYPE OF INPUT-MODE BASED OPERATION TYPE LIST |
|---|---|
| POINTER INPUT MODE | POINTER-INPUT-MODE EXCLUSIVE USE OPERATION TYPE LIST Lp |
| FIRST TEXT INPUT MODE (INPUT BY VIRTUAL KEYBOARD) | FIRST-TEXT-INPUT-MODE EXCLUSIVE USE OPERATION TYPE LIST Lt1 |
| SECOND TEXT INPUT MODE (DIRECTLY INPUT FROM BRAIN WAVE) | SECOND-TEXT-INPUT-MODE EXCLUSIVE USE OPERATION TYPE LIST Lt2 |
| MAP OPERATION INPUT MODE | MAP-OPERATION-INPUT-MODE EXCLUSIVE USE OPERATION TYPE LIST Lm |
| CHARACTER OPERATION INPUT MODE | CHARACTER-OPERATION-INPUT-MODE EXCLUSIVE USE OPERATION TYPE LIST Lf |
| ⋮ | ⋮ |

FIG. 8

| INPUT-MODE BASED OPERATION TYPE LIST | OPERATION TYPE | |
|---|---|---|
| POINTER-INPUT EXCLUSIVE USE OPERATION TYPE LIST Lp | POINTER MOVING UP<br>POINTER MOVING DOWN<br>POINTER MOVING LEFT<br>POINTER MOVING RIGHT<br>SWIPE UP<br>SWIPE DOWN<br>SWIPE LEFT<br>SWIPE RIGHT | DRAG UP<br>DRAG DOWN<br>DRAG LEFT<br>DRAG RIGHT<br>TAP<br>LONG PRESS |
| FIRST-TEXT-INPUT EXCLUSIVE USE OPERATION TYPE LIST Lt1 | POINTER MOVING UP<br>POINTER MOVING DOWN<br>POINTER MOVING LEFT<br>POINTER MOVING RIGHT<br>DRAG UP<br>DRAG DOWN | FLICK UP<br>FLICK DOWN<br>FLICK LEFT<br>FLICK RIGHT<br>TAP |
| SECOND-TEXT-INPUT EXCLUSIVE USE OPERATION TYPE LIST Lt2 | INPUT "A"<br>INPUT "B"<br>INPUT "C"<br>⋮<br>INPUT "Z" | INPUT "0"<br>⋮<br>INPUT "9"<br>INPUT "#"<br>⋮ |
| MAP-OPERATION-INPUT EXCLUSIVE USE OPERATION TYPE LIST Lm | POINTER MOVING UP<br>POINTER MOVING DOWN<br>POINTER MOVING LEFT<br>POINTER MOVING RIGHT<br>SWIPE UP<br>SWIPE DOWN<br>SWIPE LEFT<br>SWIPE RIGHT | DRAG UP<br>DRAG DOWN<br>DRAG LEFT<br>DRAG RIGHT<br>PINCH IN<br>PINCH OUT<br>TAP<br>DOUBLE TAP |
| CHARACTER-OPERATION-INPUT EXCLUSIVE USE OPERATION TYPE LIST Lf | POINTER MOVING RIGHT<br>POINTER MOVING LEFT<br>FLICK UP<br>FLICK DOWN<br>FLICK LEFT | TAP<br>DOUBLE TAP |

OPERATING-SYSTEM EXCLUSIVE USE
OPERATION TYPE LIST

POINTER-INPUT-MODE EXCLUSIVE USE
OPERATION TYPE LIST

| | | |
|---|---|---|
| POINTER MOVING UP | SWIPE UP | DRAG UP |
| POINTER MOVING DOWN | SWIPE DOWN | DRAG DOWN |
| POINTER MOVING LEFT | SWIPE LEFT | DRAG LEFT |
| POINTER MOVING RIGHT | SWIPE RIGHT | DRAG RIGHT |
| TAP | LONG PRESS | |

Lt1

FIRST-TEXT-INPUT-MODE EXCLUSIVE
USE OPERATION TYPE LIST

POINTER MOVING UP

POINTER MOVING DOWN

POINTER MOVING LEFT

POINTER MOVING RIGHT

DRAG UP

DRAG DOWN

FLICK UP

FLICK DOWN

FLICK LEFT

FLICK RIGHT

TAP

FIRST-APPLICATION EXCLUSIVE USE OPERATION TYPE LIST
(FOR BROWSER APPLICATION)

Lp

POINTER-INPUT-MODE EXCLUSIVE USE
OPERATION TYPE LIST

| POINTER MOVING UP | SWIPE UP | DRAG UP |
|---|---|---|
| POINTER MOVING DOWN | SWIPE DOWN | DRAG DOWN |
| POINTER MOVING LEFT | SWIPE LEFT | DRAG LEFT |
| POINTER MOVING RIGHT | SWIPE RIGHT | DRAG RIGHT |
| TAP | LONG PRESS | |

Lt1

FIRST-TEXT-INPUT-MODE
EXCLUSIVE USE OPERATION
TYPE LIST

- POINTER MOVING UP
- POINTER MOVING DOWN
- POINTER MOVING LEFT
- POINTER MOVING RIGHT
- DRAG UP
- DRAG DOWN
- FLICK UP
- FLICK DOWN
- FLICK LEFT
- FLICK RIGHT
- TAP

Lm

MAP-OPERATION-INPUT-MODE
EXCLUSIVE USE OPERATION TYPE LIST

| POINTER MOVING UP | DRAG UP |
|---|---|
| POINTER MOVING DOWN | DRAG DOWN |
| POINTER MOVING LEFT | DRAG LEFT |
| POINTER MOVING RIGHT | DRAG RIGHT |
| SWIPE UP | PINCH IN |
| SWIPE DOWN | PINCH OUT |
| SWIPE LEFT | TAP |
| SWIPE RIGHT | DOUBLE TAP |
| TAP | |

SECOND-APPLICATION EXCLUSIVE USE OPERATION
TYPE LIST (FOR FIGHTING GAME APPLICATION)

Lp

POINTER-INPUT-MODE EXCLUSIVE USE
OPERATION TYPE LIST

| | | |
|---|---|---|
| POINTER MOVING UP | SWIPE UP | DRAG UP |
| POINTER MOVING DOWN | SWIPE DOWN | DRAG DOWN |
| POINTER MOVING LEFT | SWIPE LEFT | DRAG LEFT |
| POINTER MOVING RIGHT | SWIPE RIGHT | DRAG RIGHT |
| TAP | LONG PRESS | |

Lt1

FIRST-TEXT-INPUT-MODE EXCLUSIVE
USE OPERATION TYPE LIST

POINTER MOVING UP

POINTER MOVING DOWN

POINTER MOVING LEFT

POINTER MOVING RIGHT

DRAG UP

DRAG DOWN

FLICK UP

FLICK DOWN

FLICK LEFT

FLICK RIGHT

TAP

Lf

CHARACTER-OPERATION-
INPUT-MODE EXCLUSIVE USE
OPERATION TYPE LIST

POINTER MOVING RIGHT
(MOVING FORWARD)

POINTER MOVING LEFT
(MOVING BACKWARD)

FLICK UP (JUMP)

FLICK DOWN (LYING DOWN)

FLICK LEFT (GUARD)

TAP (PUNCH)

DOUBLE TAP (KICK)

| TYPE OF INPUT MODE | TYPE OF OPERATION TYPE LIST |
|---|---|
| POINTER INPUT MODE | POINTER-INPUT-MODE EXCLUSIVE USE OPERATION TYPE LIST Lp |
| FIRST TEXT INPUT MODE | FIRST-TEXT-INPUT-MODE EXCLUSIVE USE OPERATION TYPE LIST Lt1 |
| SECOND TEXT INPUT MODE | SECOND-TEXT-INPUT-MODE EXCLUSIVE USE OPERATION TYPE LIST Lt2 |
| MAP OPERATION INPUT MODE | MAP-OPERATION-INPUT-MODE EXCLUSIVE USE OPERATION TYPE LIST Lm |
| CHARACTER OPERATION INPUT MODE | CHARACTER-OPERATION-INPUT-MODE EXCLUSIVE USE OPERATION TYPE LIST Lf |
| ⋮ | ⋮ |

THIRD DICTIONARY (IN SMARTPHONE)

*FIG. 23B*

INFORMATION PROCESSING SYSTEM, INFORMATION PROCESSING TERMINAL, AND EXPECTED-OPERATION RECOGNITION METHOD

This application is the U.S. National Phase under 35 U.S.C. § 371 of International Patent Application No. PCT/JP2021/024418, filed on Jun. 28, 2021, the entire disclosures of which Application is incorporated by reference herein.

TECHNICAL FIELD

The present invention relates to an information processing system, an information processing terminal, and an expected-operation recognition method.

BACKGROUND ART

A Patent Document 1 discloses a method for changing a state of an application on basis of detected user's neurological intention data.

RELATED ART DOCUMENT

Patent Document

Patent Document 1: U.S. Pat. No. 9,864,431

SUMMARY OF THE INVENTION

Problems to be Solved by the Invention

Meanwhile, in recent years, there has been extremely increased in opportunities for users to operate information processing terminals such as a smartphone, a tablet terminal, and a notebook-type personal computer with a touch panel.

However, the Patent Document 1 does not take a case of recognition and application of a user's expected operation to an operation of an information processing terminal into consideration. That is, regarding a method for recognizing and applying the user's expected operation to the operation of the information processing terminal, the Patent Document 1 does not describe any specific or feasible method at all.

In particular, demand for the method for recognizing and applying the user's expected operation to the operation of the information processing terminal is very high for users who have difficulty in operating with their own hands/fingers.

Under such circumstances, a technique capable of recognizing and applying the user's expected operation to the operation of the information processing terminal has been desired.

Means for Solving the Problems

The outline of the typical aspects of the inventions disclosed in the present application will be briefly described as follows.

An information processing system according to a typical embodiment of the present invention is an information processing system including a brain wave detector and an information processing terminal, in which the brain wave detector includes: a detector configured to detect a brain wave of a user; a first storage configured to store a conversion dictionary for converting characteristics of the detected brain wave into data processable in the information processing terminal; a first processor configured to convert the brain wave detected by the detector into data, in accordance with the conversion dictionary; and a first communication device configured to transmit/receive data to/from the information processing terminal, the information processing terminal includes: a second communication device configured to transmit/receive data to/from the brain wave detector; and a second processor configured to execute a corresponding processing corresponding to data, in accordance with the data received by the second communication device, the second processor transmits a group of data for instruction input used in software in operation in the information processing terminal to the brain wave detector via the second communication device, during or after execution of a cooperation processing of achieving a cooperation operation between the information processing terminal and the brain wave detector, and the first processor stores the group of data received via the first communication device into the first storage, and executes a conversion processing by use of the group of data.

Effects of the Invention

The effects obtained by the typical aspects of the invention disclosed in the present application will be briefly described below.

According to the typical embodiment of the present invention, the user's expected operation can be recognized and applied to the operation of the information processing terminal.

BRIEF DESCRIPTIONS OF THE DRAWINGS

FIG. 4 is a diagram illustrating an exemplary priority order of operation input systems.

FIG. 5 is a diagram illustrating an exemplary first dictionary.

FIG. 6 is a diagram illustrating an exemplary second dictionary.

FIG. 7 is a diagram illustrating exemplary input-mode based operation lists.

FIG. 8 is a diagram illustrating exemplary input-mode based operation type lists.

FIG. 11 is an imaginary diagram of an operating-system operation type list.

FIG. 13 is an imaginary diagram of a first-application operation type list.

FIG. 20 is an imaginary diagram of a second-application operation type list.

FIG. 22 is a diagram illustrating an exemplary third dictionary.

FIG. 23B is a flowchart of processings in the first example of the information processing system according to the second embodiment.

DETAILED DESCRIPTION OF PREFERRED EMBODIMENTS

Embodiments of the present invention will be described below. Note that the respective embodiments described below are exemplary for achieving the present invention and do not intend to limit the technical scope of the present invention.

In the following respective embodiments, components having the same function are denoted by the same reference signs, and the repetitive description thereof will be omitted unless otherwise particularly required.

First Embodiment

An information processing system according to a first embodiment of the present invention will be described.
<Outline of Information Processing System>

The information processing system according to the first embodiment is a system directed for causing an information processing terminal used by a user to recognize and execute an operation expected in the brain of the user by detecting a brain wave of the user. The operation described here is referred to as an operation in an expectation input system. The information processing system previously prepares and stores a dictionary which is a table corresponding a type of the operation (which will be also referred to as operation type below) received by the information processing terminal with a type of the user's brain wave (which will be also referred to as brain wave type below) occurring when the user expects the operation type. Further, the information processing system also previously prepares and stores an operation type list which limitedly lists the operation types probably required under a condition of each software and each input mode in use in the information processing terminal. When the software and the input mode in use are detected, the operation type list corresponding to the condition is selected and is applied to the dictionary, and the operation types to be recognized are narrowed to the required ones at that time. Such a function reduces loads on a processing of determining the brain wave type, improves operation recognition accuracy, and enhances the usefulness of the operation in the expectation input system.
<Appearance and Hardware Configuration>

An appearance and a hardware configuration of the information processing system according to the first embodiment will be described.

Figure 1:
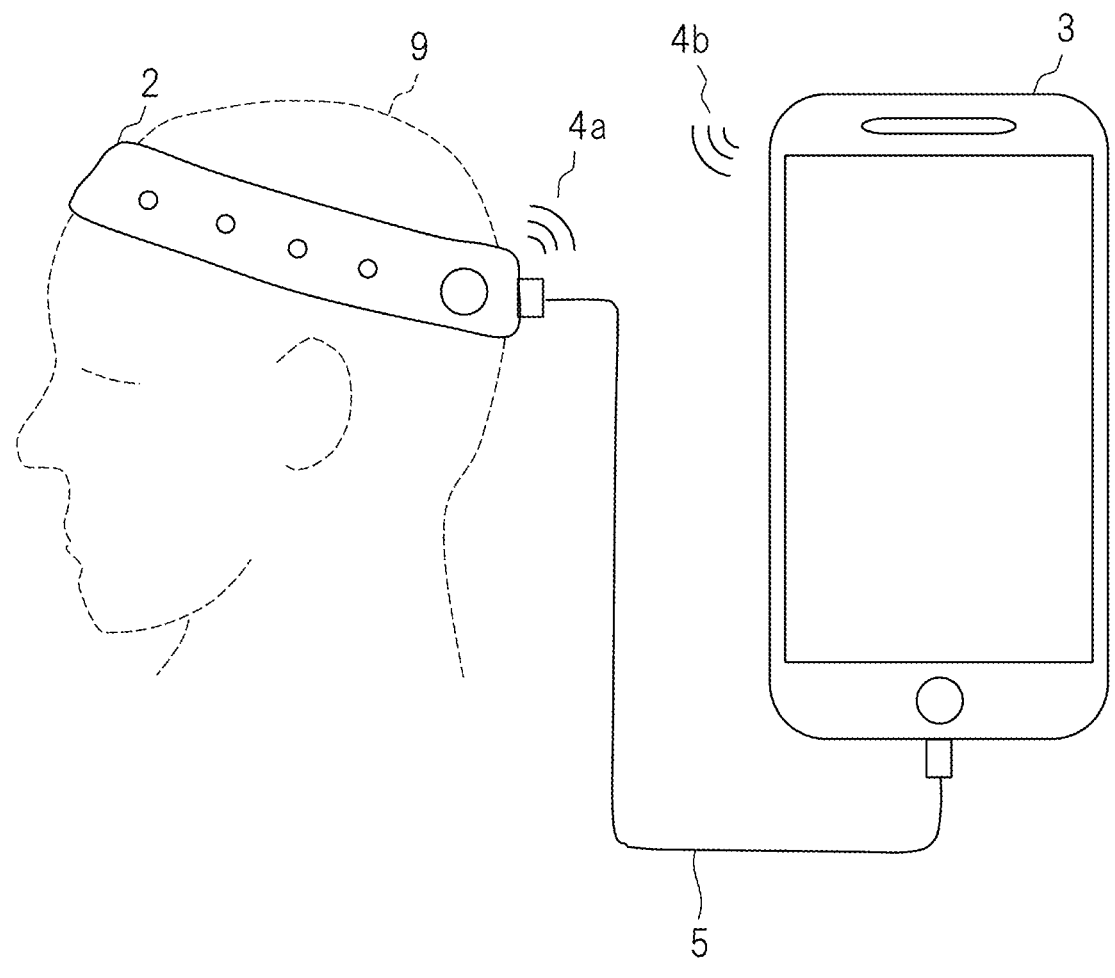
FIG. 1 is an appearance view of an information processing system according to a first embodiment.

FIG. 1 is an appearance view of the information processing system according to the first embodiment. As illustrated in FIG. 1, an information processing system 1 according to the first embodiment includes a headset (brain wave detector) 2 and a smartphone (information processing terminal) 3. The headset 2 is mounted on a head of a user 9. The smartphone 3 is an information processing terminal operated by the user 9.

The headset 2 and the smartphone 3 are configured to be bidirectionally communicable via wireless connection using an electric wave 4a and an electric wave 4b. That is, the headset 2 and the smartphone 3 can cooperate with each other. Note that the headset 2 and the smartphone 3 may be configured to be bidirectionally communicable via wired connection using a connector cable 5.

Figure 2:
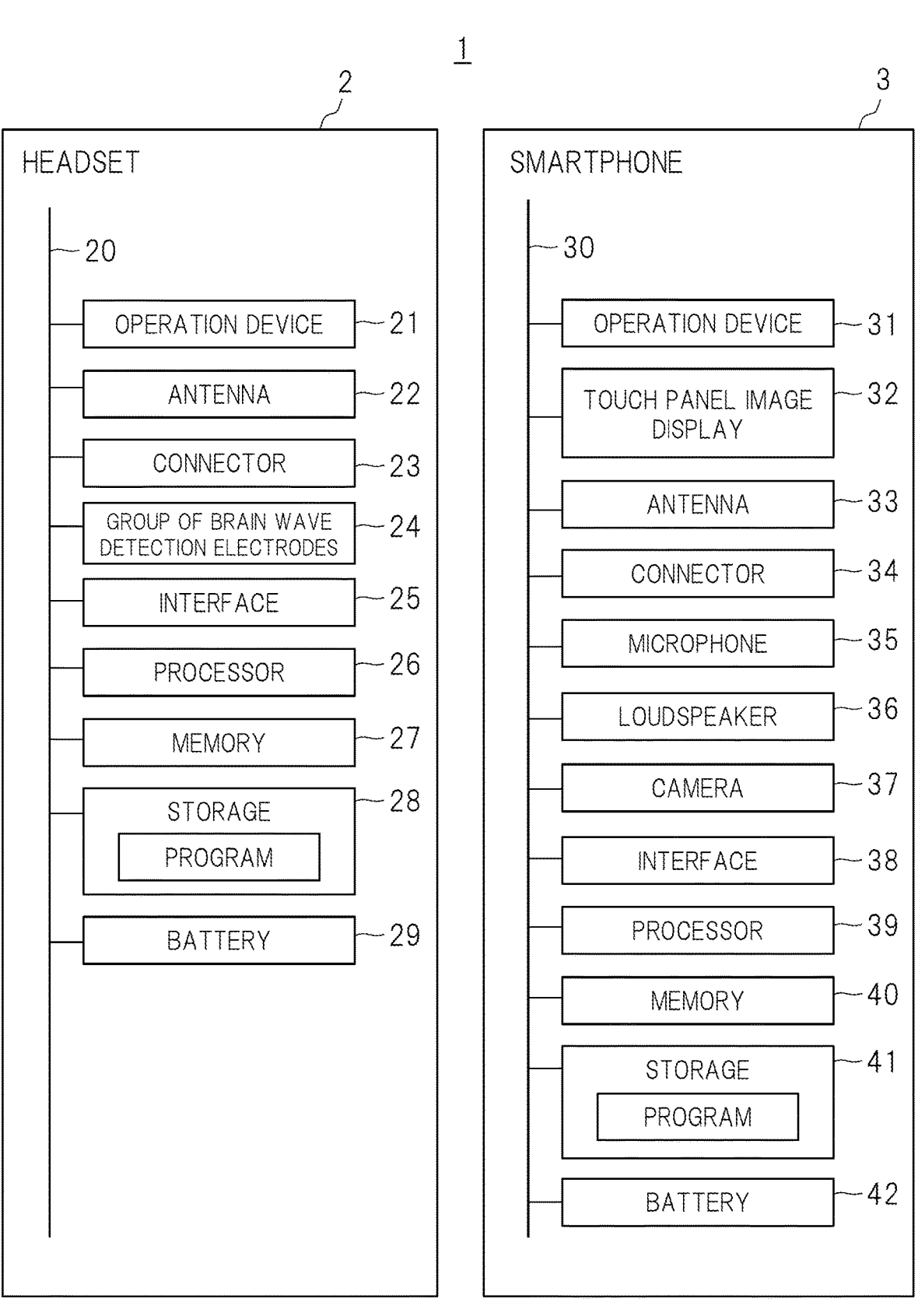
FIG. 2 is a diagram illustrating an exemplary hardware configuration of a headset and a smartphone in the information processing system.

FIG. 2 is a diagram illustrating an exemplary hardware configuration of the headset and the smartphone in the information processing system.

As illustrated in FIG. 2, the headset 2 includes an operation device 21, an antenna 22, a connector 23, a brain-wave detection electrode device 24, an interface 25, a processor 26, a memory 27, a storage 28, and a battery 29. These are mutually connected via a bus 20, and can transmit/receive electric signals or data. Note that the headset 2 may receive a power supply via an AC adapter or the like from a commercial power supply instead of the battery 29.

The smartphone 3 includes an operation device 31, a touch panel image display 32, an antenna 33, a connector 34, a microphone 35, a loudspeaker 36, a camera 37, an interface 38, a processor 39, a memory 40, a storage 41, and a battery 42. These are mutually connected via a bus 30, and can transmit/receive electric signals or data.

The connectors 23 and 34 are used to make the wired connection between the headset 2 and the smartphone 3. The antennas 22 and 33 are used to make the wireless connection between the headset 2 and the smartphone 3. The brain-wave detection electrode device 24 receives a signal indicative of the user's brain wave used for recognizing the user's expected operation. The interface 25 converts an electric signal output from the operation device 21, the antenna 22, the connector 23, the brain-wave detection electrode device 24, or the like into data, and transmits the data to the processor 26 or the like, and converts data output from the processor 26, the memory 27, the storage 28, or the like into an electric signal, and transmits the electric signal to the connector 23 or the antenna 22. The interface 38 converts an electric signal output from the operation device 31, the touch panel image display 32, the antenna 33, the connector 34, the microphone 35, the camera 37, or the like into data, and transmits the data to the processor 39 or the like, and converts data output from the processor 39, the memory 40, the storage 41, or the like into an electric signal, and transmits the electric signal to the connector 34, the loudspeaker 36, or the antenna 33.

The processors 26 and 39 are devices configured to execute arithmetic processings or data processings, and each are made of, for example, a central processing unit (CPU), a micro processing unit (MPU), or the like. The memories 27 and 40 are devices configured to temporarily store data, and each are made of, for example, a semiconductor storage such as a random access memory (RAM). The storages 28 and 41 are devices configured to store data or various items of data, and each are made of, for example, a non-volatile storage such as a solid state drive (SSD), a hard disk drive (HDD), or a flash memory.

<Functional Configuration>

A functional configuration of the information processing system 1 according to the first embodiment will be described.

Figure 3:
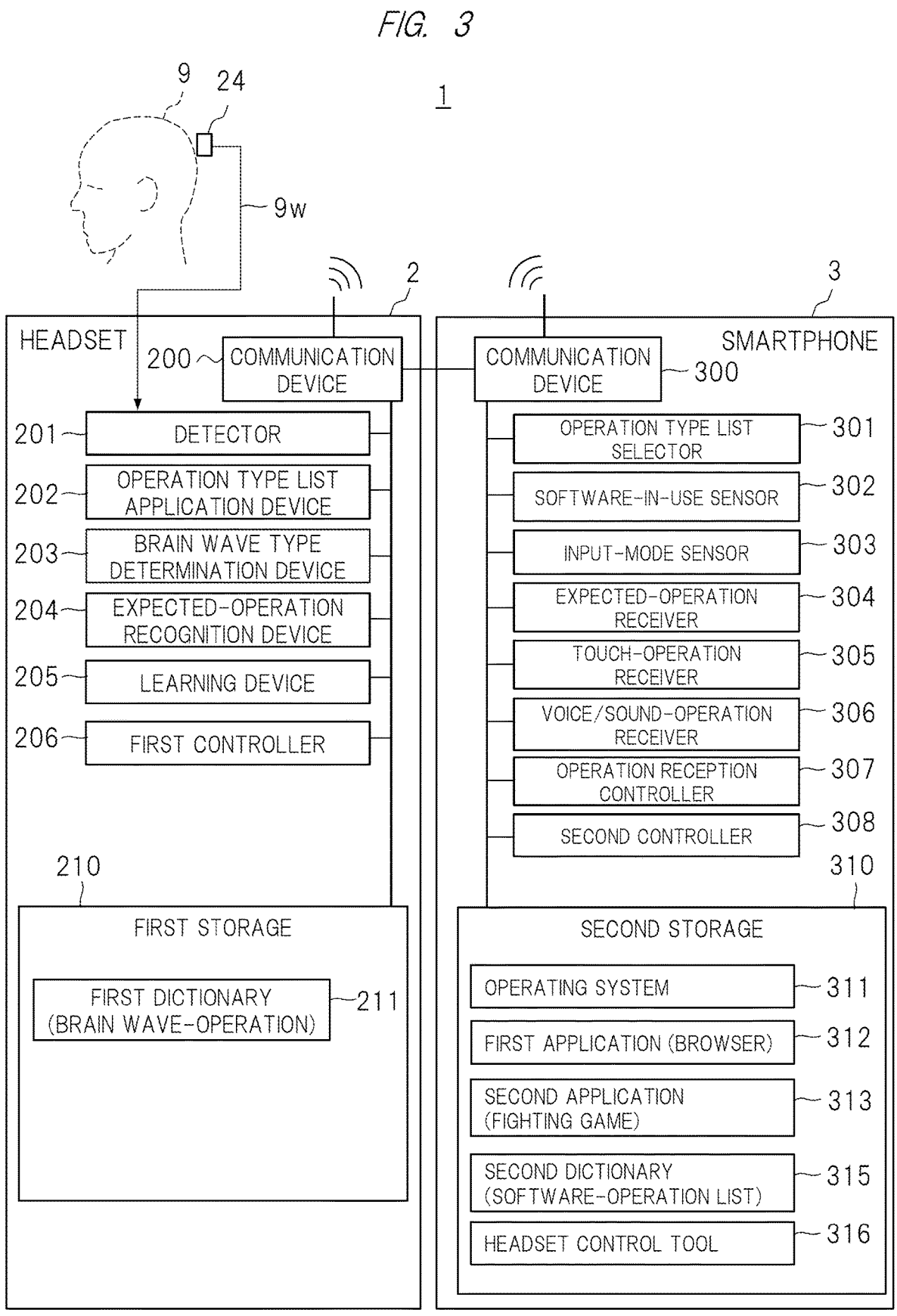
FIG. 3 is a diagram illustrating a configuration of functional blocks of the headset and the smartphone in the information processing system.

FIG. 3 is a diagram illustrating a configuration of functional blocks of the headset and the smartphone in the information processing system. Note that the respective functional blocks of the headset 2 are achieved by executing predetermined programs stored in the storage 28 under use of the processor 26, the memory 27, and the like in cooperation with hardware. Further, the respective functional blocks of the smartphone 3 are also achieved by executing predetermined programs stored in the storage 41 under use of the processor 39, the memory 40, and the like in cooperation with hardware.

As illustrated in FIG. 3, as the functional blocks, the headset 2 includes a communication device (first communication device) 200, a detector (detection device) 201, an operation type list application device 200, a brain wave type determination device 203, an expected-operation recognition device 204, a learning device (learning device) 205, a first controller 206, and a first storage (first storage device) 210. Note that the operation type list application device 202, the brain wave type determination device 203, the expected-operation recognition device 204, and the first controller 206 are exemplary first processors according to the present invention.

As illustrated in FIG. 3, as the functional blocks, the smartphone 3 includes a communication device (second communication device) 300, an operation type list selector 301, a software-in-use sensor 302, an input mode sensor 303, an expected-operation receiver 304, a touch operation receiver 305, a voice/sound-operation receiver 306, an operation reception controller 307, a second controller 308, and a second storage (second storage, third storage) 310. Note that the operation type list selector 301, the software-in-use sensor 302, the input mode sensor 303, the expected-operation receiver 304, the touch operation receiver 305, the voice/sound-operation receiver 306, the operation reception controller 307, and the second controller 308 are exemplary second processors according to the present invention.

<<Functional Blocks of Headset>>

The respective functional blocks of the headset 2 will be described.

The first storage 210 stores therein data required to properly operate the headset 2. In the present embodiment, the first storage 210 stores therein a first dictionary (conversion dictionary, first table) 211. The first dictionary 211 is made of a table corresponding the operation type received by the smartphone 3 to the brain wave type corresponding to the operation type for each operation type.

The communication device 200 is connected to the communication device 300 in the smartphone 3 in wireless or wired to make bidirectional communication. A signal to be communicated is data to be input or output in each functional block configuring the headset 2. As the wireless communication standards, for example, Bluetooth (registered trademark) may be used.

The detector 201 detects the brain wave $9w$ of the user 9 on the basis of the electric signal received by the brain-wave detection electrode device 24 mounted on the head of the user.

The operation type list application device 202 limits the operation type to be recognized by the expected-operation recognition device 204 in accordance with the type of software or the input mode in use in the smartphone 3 from among the operation types included in the first dictionary 211. More specifically, the operation type list application device 202 receives information indicative of the operation type list (group of data) from the smartphone 3, and applies the operation type list as the operation type to be limitedly recognized. In the present embodiment, a software-based operation type list created for each software to be used is previously prepared as the operation type list. Further, the software-based operation type list includes single or plural input-mode based operation type lists created for each input mode to be used. As the operation types to be limitedly recognized, the operation type list application device 202 applies an input-mode based operation type list corresponding to an input mode on the basis of information indicative of this input mode in use in the smartphone 3.

The brain wave type determination device 203 determines a brain wave type corresponding to the brain wave detected by the detector 201 from among the brain wave types included in the first dictionary 211. At this time, this determines the brain wave type corresponding to the detected brain wave from among the brain wave types corresponding to the operation types limited by the operation type list application device 202. More specifically, the brain wave type determination device 203 determines which one of the plural brain wave types previously registered in the first dictionary 211 the brain wave detected by the detector 201 corresponds to or whether the detected brain wave does not correspond to any brain wave type. At this time, the brain wave type to be determined is limited to the brain wave types corresponding to the operation types included in the applied operation type list.

The expected-operation recognition device 204 recognizes the operation expected by the user 9 with reference to the first dictionary 211 on the basis of the brain wave type determined by the brain wave type determination device 203. More specifically, the expected-operation recognition device 204 recognizes the operation type corresponding to the determined brain wave type as the operation type input in the expectation input system, and outputs information on the recognized operation type to the smartphone 3.

The leaning device 205 has a learning function in order to improve recognition accuracy in recognizing the operation type from the brain wave. The learning device 205 receives an evaluation made by the user 9 for the operation recognized by the expected-operation recognition device 204, and adjusts a waveform of the brain wave type corresponding to the operation type of the operation included in the first dictionary 211 on the basis of the operation to be evaluated and the brain wave used for recognizing the operation. More specifically, for example, when the operation exactly expected by the user is executed in the smartphone 3, the user inputs an evaluation indicative of the fact into the learning device 205. The learning device 205 adjusts the waveform or pattern of the brain wave of the brain wave type in the first dictionary 211 on the basis of the detected brain wave and the input evaluation in order to improve the determination accuracy of the brain wave type. Further, the leaning device 205 sequentially displays a plurality of types of pointers as a pointer to be a reference or origination of the operation in the expectation input system, displayed on the screen of the smartphone 3, and outputs an operation instruction. The user expects the user's instruction operation. The learning device 205 receives the user's evaluation for the recognized and executed operation, and ranks the types of pointers in descending order of the operation recognition accuracy on the basis of the evaluation.

The first controller 206 totally controls the respective devices or the respective functional blocks so that the headset 2 properly operates.

<<Functional Blocks of Smartphone>>

The respective functional blocks of the smartphone 3 will be described.

The second storage 310 stores therein data required to properly operate the smartphone 3. In the present embodiment, the second storage 310 stores therein an operating system 311, a first application 312, a second application 313, a second dictionary (second table) 315, and a headset control tool 316. The first and second applications are various items of application software operating on the operating system 311. The first application 312 is an Internet Browser application, and the second application 313 is a fighting game application. Note that the headset control tool 316 is software for controlling the headset. Thus, it is not included in the software used by the smartphone 3.

The second dictionary 315 is made of a table corresponding the software used by the smartphone 3 to the operation type list corresponding to the software for each software. The operation type list is a list which limitedly lists the operation types to be recognized during use of software. The second dictionary 315 will be described in detail later.

The communication device 300 is connected to the communication device 200 in the headset 2 in wireless or wired, and makes bidirectional communication.

The software-in-use sensor 302 senses software in use in the smartphone 3. In the present embodiment, as examples of the software to be used, the operating system 311, the first application 312, and the second application 313 described above are assumed. The operating system is, for example, "Android" (registered trademark), "iOS" (registered trademark of Apple Inc.), or the like. Further, the first and second applications are application software corresponded to, for example, icons displayed on the screen of the smartphone 3.

The operation type list selector 301 selects the operation type list corresponding to the sensed software in use with reference to the second dictionary 315. The operation type list is an operation type list defined to limit only the operation types to be recognized for each software.

The input mode sensor 303 senses an input mode in use in the smartphone 3, and outputs, to the headset 2, input mode specification information as information for specifying the sensed input mode. Note that the input mode is selected by the software in use in accordance with an execution state of the software. In the present embodiment, a pointer input mode, a first text input mode, a second text input mode, a map operation input mode, and a character operation input mode are assumed as exemplary input modes.

The pointer input mode is an input mode for moving the pointer and executing an operation or the like with a position of the pointer as a reference or origination. The first text input mode is an input mode for inputting text including a letter, a number, a symbol, and the like by use of a virtual keyboard. The second text input mode is an input mode for a directly specifying and inputting text including a letter, a number, a symbol, and the like on the basis of the brain wave of the user. The map operation input mode is an input mode for executing an operation on a displayed map (geographical map). The character operation input mode is an input mode for executing an operation on a (mascot) character appearing in a game or the like.

When information (data) of the operation type recognized by the expected-operation recognition device 204 in the headset 2 is transmitted to the expected-operation receiver 304, the expected-operation receiver 304 receives the operation type as an operation in an expectation input system (which will be also referred to as expected operation below) (corresponding processing).

When the touch operation made by the user 9 is detected on the touch panel image display 32, the touch-operation receiver 305 receives the operation type corresponding to the touch operation as an operation in a touch input system (which will be also referred to as touch operation below).

When a voice/sound made by the user 9 is detected via the microphone 35, the voice/sound-operation receiver 306 receives the operation type corresponding to the voice/sound as an operation in a voice/sound input system (which will be also referred to as voice/sound operation below).

When receiving the overlapping operations in the respective operation input systems, the operation reception controller 307 controls the receptions of the operations to apply and execute an operation in an operation input system with the highest priority.

FIG. 4 is a diagram illustrating an exemplary priority order of the operation input systems. In the present embodiment, as illustrated in FIG. 4, the touch input system, the voice/sound input system, and the expectation input system in this order are in descending priority order. In this example, when the touch input system and the voice/sound input system have not been executed, the operation reception controller 307 executes the operation in the expectation input system, in other words, the operation recognized by the expected-operation recognition device 204. At this time, the operation is executed so that the pointer displayed on the screen of the smartphone 3 is used as the reference or origination.

The second controller 308 totally controls the respective devices or the respective functional blocks so that the smartphone 3 properly operates.

<<First Dictionary and Second Dictionary>>

FIG. 5 is a diagram illustrating an example of the first dictionary.

As illustrated in FIG. 5, the first dictionary 211 is made of a table corresponding the operation type used by the user who is using the smartphone 3 to the brain wave type of the user's brain wave probably occurring when the user expects the operation of the operation type for each operation type.

A brain wave type is, for example, a brain wave pattern having characteristic waveform, amplitude, time length, and the like. As illustrated in FIG. 5, the operation types include, for example, pointer moving up, pointer moving down, pointer moving left, pointer moving right, swipe up, swipe down, swipe left, swipe right, flick up, flick down, flick left, flick right, drag up, drag down, drag left, drag right, tap, double tap, long press, pinch in, pinch out, direct input of text that is a letter type, and the like. The letter type is, for example, alphabets, hiragana, numbers, symbols, and the like.

Note that swipe, flick, drag, tap, double tap, long press, pinch in, and pinch out are executed in a state in which the position of the pointer is used as the reference or origination.

The meanings of the respective operation types will be briefly described herein. The tap is an operation of touching the screen with one finger, and is a similar operation to clicking in a personal computer. The double tap is an operation of quickly touching the screen twice with one finger, and is a similar operation to double clicking in the personal computer. The long press is an operation of touching the screen with one finger for a while, and causes an action corresponding to long press. The pinch in is an operation of narrowing a width between the fingers while touching the screen with two fingers, and is mainly used to downsize the screen. The pinch out is an operation of widening the width between the fingers while touching the screen with two fingers, and is mainly used to enlarge the screen. The drag is an operation of moving one finger up, down, left, or right while touching the screen with the finger, and causes an action corresponding to a movement of the finger. The swipe is an operation of sliding a finger up, down, left, or right while touching the screen with the finger, and is mainly used for scrolling the screen. The flick is an operation of quickly slipping a finger up, down, left, or right while touching the screen with the finger, and is often used in an input method called flick input at the time of the input of the text by use of a software keyboard.

Note that the initial setting of the brain wave patterns of the respective brain wave types included in the first dictionary 211 is determined by previously made neurological researches, experiments and analyses of the brain waves, and the like.

FIG. 6 is a diagram illustrating an example of the second dictionary. As illustrated in FIG. 6, the second dictionary 315 is made of a table corresponding the type of software executed in the smartphone 3 to the software based operation type list limitedly listing the operation types used in the execution of the software for each type of software. The software based operation type list is further made of single or plural input-mode based operation type lists. The input-mode based operation type list is prepared for each input mode selected in accordance with the execution state of the software. The input-mode based operation type list limitedly lists the operation types used in the input mode in use.

As illustrated in FIG. 6, in the present embodiment, an operating-system exclusive use operation type list LA corresponded to the operating system 311, a first-application exclusive use operation type list LB corresponded to the first application 312, and a second-application exclusive use operation type list LC corresponded to the second application 313 are prepared as the software based operation type lists.

FIG. 7 is a diagram illustrating exemplary input-mode based operation type lists. As illustrated in FIG. 7, in the present embodiment, the pointer input mode, the first text input mode, the second text input mode, the map operation input mode, the character operation input mode, and the like are assumed as the input mode types. The pointer input mode is a mode of receiving input of various operations with respect to the position of the pointer. The first text input mode is a mode of receiving input of various operations for inputting text by use of a virtual keyboard. The second text input mode is a mode of receiving input of various operations for inputting text directly from the brain wave. The map operation input mode is a mode of receiving input of operations of moving or enlarging/reducing a displayed map region or various operations for causing an action on the map. The character operation input mode is a mode of receiving input of various operations for moving a character such as an avatar on the screen or causing an action. Further, a pointer-input-mode exclusive use operation type list Lp, a first-text-input-mode exclusive use operation type list Lt1, a second-text-input-mode exclusive use operation type list Lt2, a map-operation-input-mode exclusive use operation type list Lm, and a character-operation-input-mode exclusive use operation type list Lf are prepared as the input-mode based operation type lists.

As illustrated in FIG. 6, in the present embodiment, the operating-system exclusive use operation type list LA includes the pointer-input-mode exclusive use operation type list Lp and the first-text-input-mode exclusive use operation type list Lt1. The first-application exclusive use operation type list LB includes the pointer-input-mode exclusive use operation type list Lp, the first-text-input-mode exclusive use operation type list Lt1, and the map-operation-input-mode exclusive use operation type list Lm. The second-application exclusive use operation type list LC includes the pointer-input-mode exclusive use operation type list Lp, the first-text-input-mode exclusive use operation type list Lt1, and the character-operation-input-mode exclusive use operation type list Lf.

FIG. 8 is a diagram illustrating exemplary input-mode based operation type lists. As illustrated in FIG. 8, as the operation types, the pointer-input-mode exclusive use operation type list Lp includes, for example, pointer moving up, pointer moving down, pointer moving left, pointer moving right, swipe up, swipe down, swipe left, swipe right, drag up, drag down, drag left, drag right, tap, long press, and the like. The first-text-input-mode exclusive use operation type list Lt1 includes, for example, pointer moving up, pointer moving down, pointer moving left, pointer moving right, drag up, drag down, flick up, flick down, flick left, flick right, tap, and the like. The second-text-input-mode exclusive use operation type list Lt2 includes, for example, operations of directly inputting individual alphabets, numbers, symbols and the like. The map-operation-input-mode exclusive use operation type list Lm includes, for example, pointer moving up, pointer moving down, pointer moving left, pointer moving right, swipe up, swipe down, swipe left, swipe right, drag up, drag down, drag left, drag right, pinch in, pinch out, tap, double tap, and the like. The character-operation-input-mode exclusive use operation type list Lf includes, for example, pointer moving right, pointer moving left, flick up, flick down, flick left, tap, double tap, and the like.

<<Operations of Information Processing System>>

First Example

Operations of the information processing system according to the first embodiment will be described below. In a first example, it is assumed that software and an input mode in use in the smartphone 3 are initially the operating system 311 and the pointer input mode, respectively, and then, change to the first application 312 (browser) and the first text input mode halfway, respectively.

Figure 9:
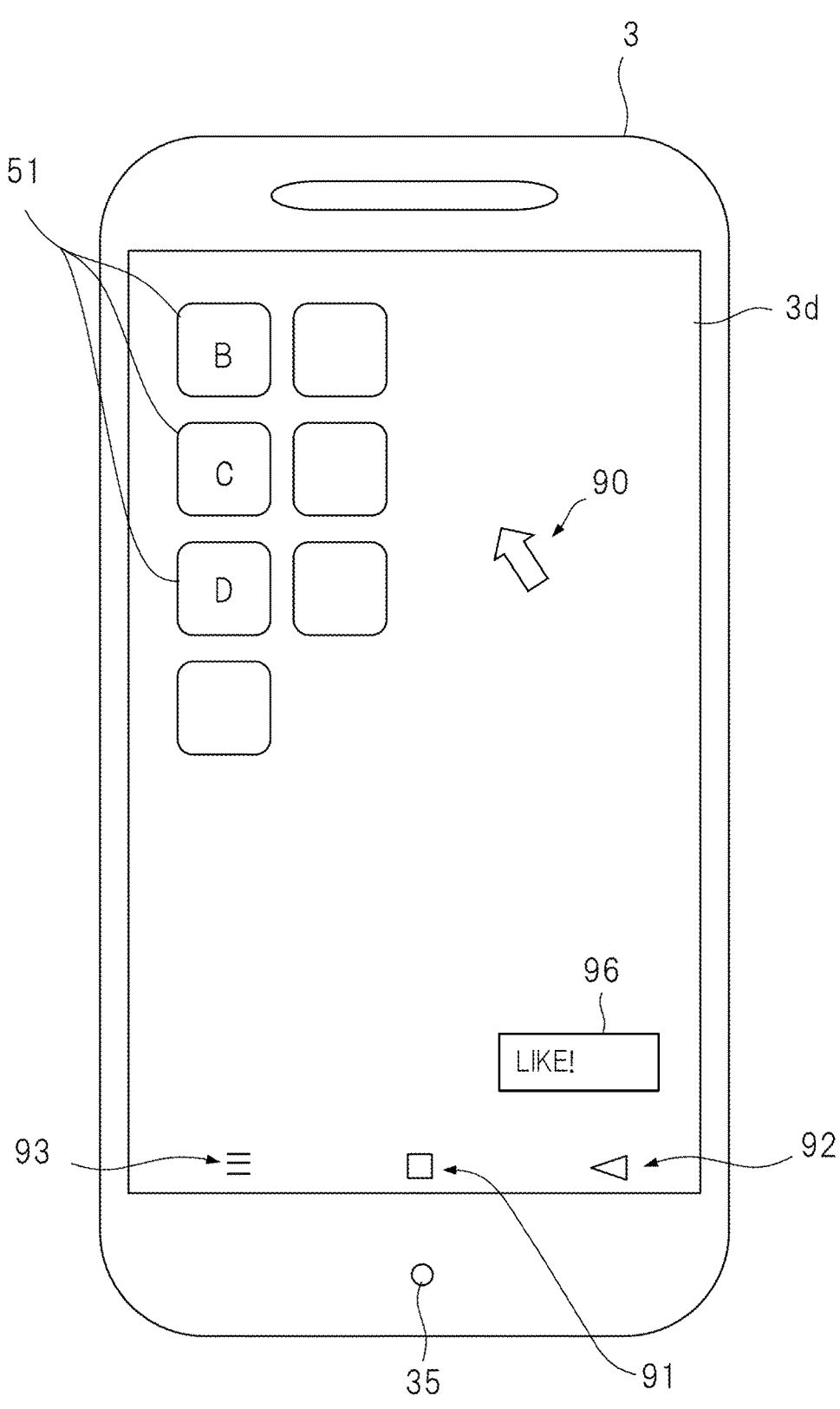
FIG. 9 is a diagram illustrating exemplary display of a smartphone under use of only an operating system.

FIG. 9 is a diagram illustrating exemplary display of the smartphone under use of only the operating system. As illustrated in FIG. 9, the smartphone 3 includes a touch panel display screen 3d and the microphone 35.

A plurality of icons 51 corresponding to individual applications and a pointer 90 are displayed on the touch panel display screen 3d. Inside of the pointer 90 is transparent or semi-transparent to make an image in a region overlapping with the pointer 90 visible. Further, an icon 91 for returning to a home screen, an icon 92 for returning a state to its previous state, and an icon 93 for displaying a menu screen and the like are displayed at the bottom of the touch panel display screen 3d. Still further, a "Like!" button 96 is displayed on the touch panel display screen 3d. When the expected operation has been successfully executed, in other words, when the operation exactly expected by the user has been executed, the user presses the "Like!" button. By this process, an evaluation indicating that the expected operation at this time has been successfully executed is input, and the evaluation information is utilized for improving the accuracy in the operation type recognition, in other words, the brain wave type determination.

Note that the user can execute the touch operation by touching the touch panel display screen 3d. Further, the user can execute the voice/sound operation by inputting his/her voice/sound via the microphone 35. If, for example, the favorable expected operation cannot be temporarily executed or a quick operation is required, the user can use the touch operation or the voice/sound operation as needed.

FIGS. 10A to 10D are flowcharts of processings of the information processing system according to the first embodiment. Note that the flowcharts of FIGS. 10A to 10D are illustrated so that one flow is divided into four.

Figure 10A:
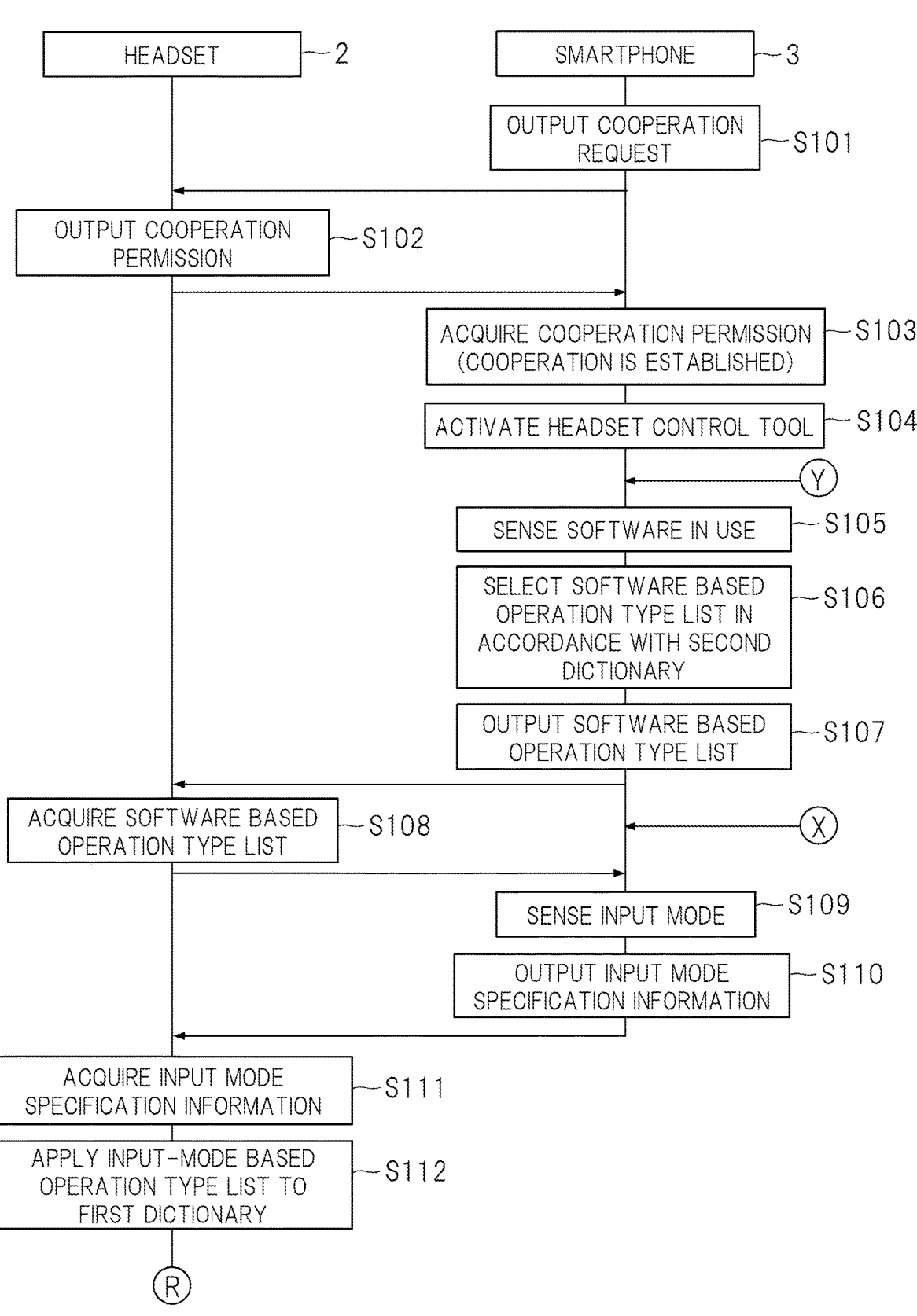
FIG. 10A is a flowchart of processings of the information processing system according to the first embodiment.

FIG. 10A mainly illustrates a flow of processings for preparing the expected operation. The flow of processings includes a processing of establishing the cooperation between the headset 2 and the smartphone 3. It further includes a processing of limiting the operation types to be recognized in the expected operation in accordance with the software and the input mode in use in the smartphone 3.

Figure 10B:
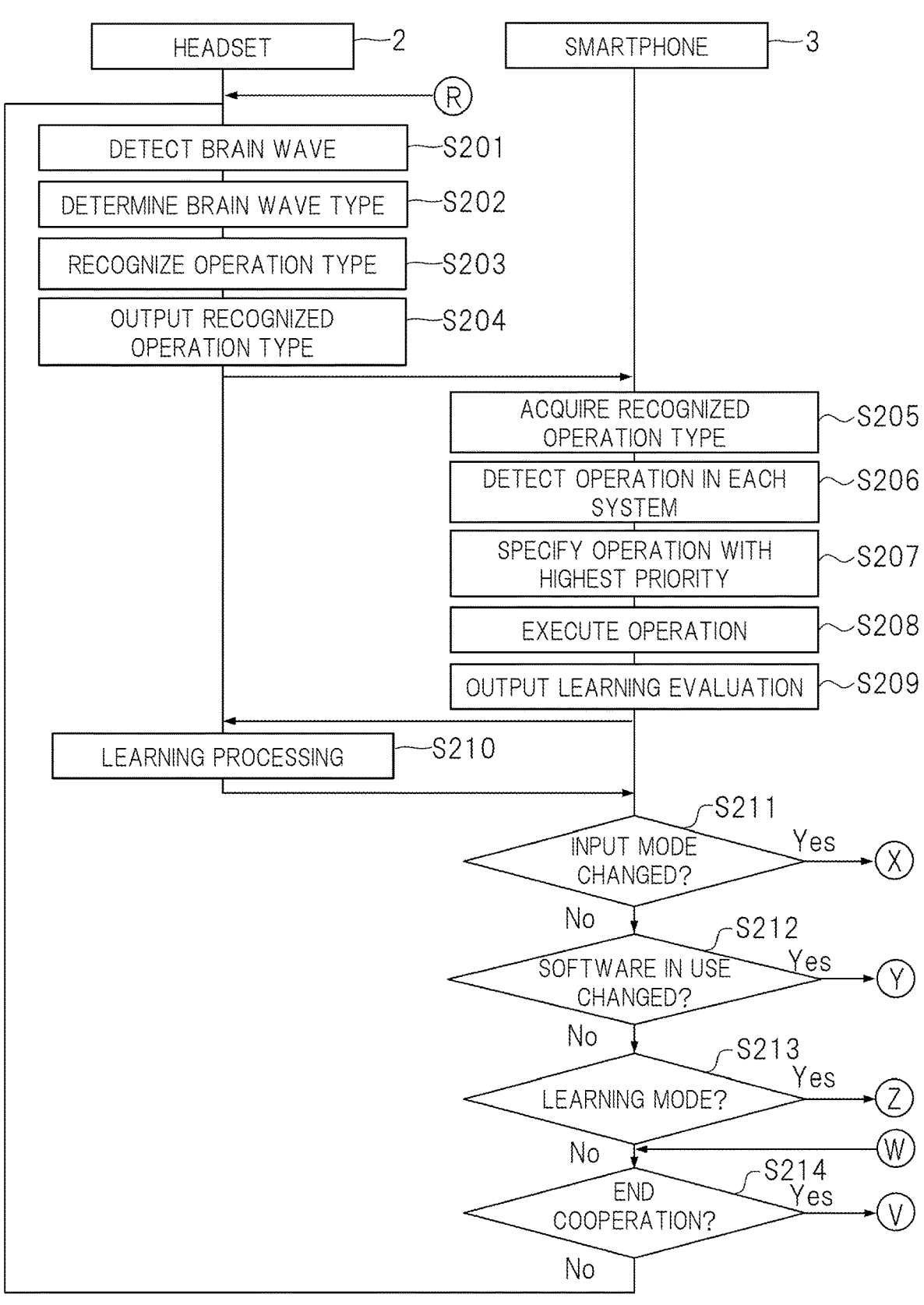
FIG. 10B is a flowchart of processings of the information processing system according to the first embodiment.

FIG. 10B mainly illustrates a flow of processings for executing the expected operation. The flow of processings includes a processing of recognizing the operation type in the headset 2 by detecting the brain wave of the user and outputting the result to the smartphone 3. It further includes a processing of receiving the operation in each operation input system in the smartphone 3 and applying and executing the high-priority operation.

Figure 10C:
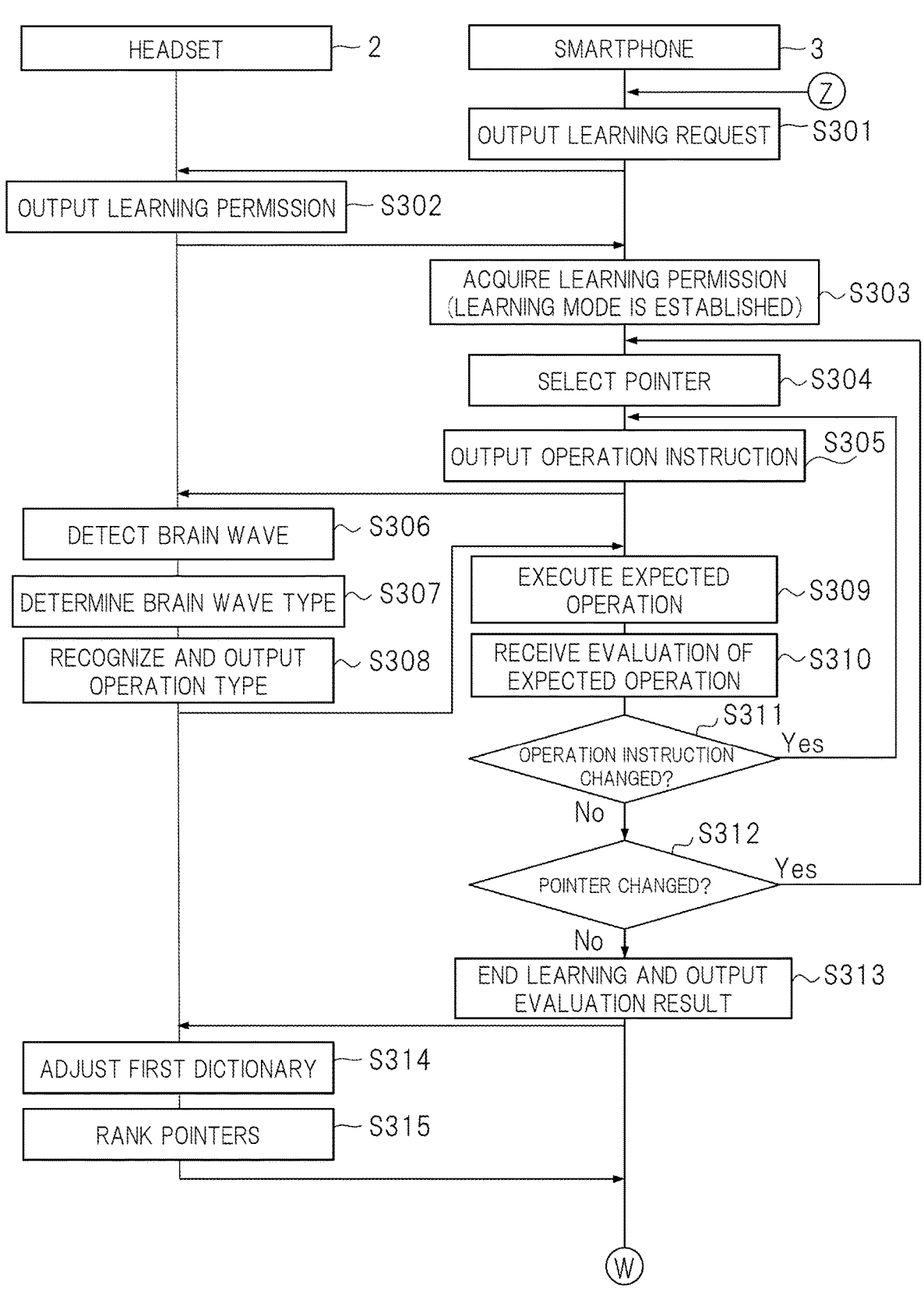
FIG. 10C is a flowchart of processings of the information processing system according to the first embodiment.

FIG. 10C mainly illustrates a flow of processings in a learning mode. The flow of processings includes a processing of learning a form of a pointer displayed on the screen of the smartphone 3, the form improving the expected-operation recognition accuracy.

Figure 10D:
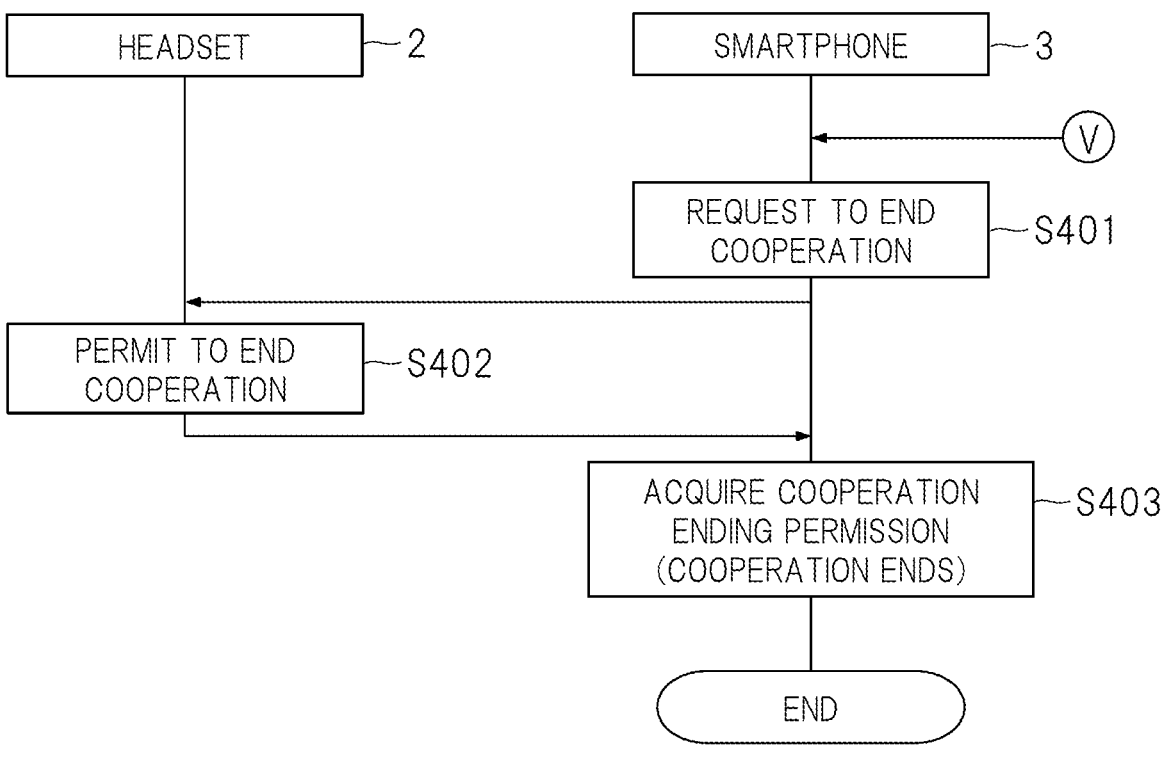
FIG. 10D is a flowchart of processings of the information processing system according to the first embodiment.

FIG. 10D mainly illustrates a flow of processings for ending the cooperation. The flow of processings includes a processing for a procedure of ending the cooperation between the headset 2 and the smartphone 3.

<<Flow of Processings for Preparing Expected Operation>>

First, a flow of a processing of establishing the cooperation between the headset 2 and the smartphone 3 and a processing of limiting the operation types to be recognized in the expected operation in accordance with the software and the operation input mode in use in the smartphone 3 will be described.

As illustrated in FIG. 10A, first, the second controller 308 outputs a cooperation request signal to the headset 2 (S101). The first controller 206 outputs a cooperation permission signal to the smartphone 3 in response to the cooperation request signal (S102). The second controller 308 acquires the cooperation permission signal (S103). In the manner, the cooperation between the headset 2 and the smartphone 3 is established.

After the cooperation is established, the second controller 308 activates the headset control tool 316 stored in the second storage 310 (S104) to achieve transmission/reception of data to/from the headset 2 or control for the operation.

Next, the software-in-use sensor 302 senses the software in use in the smartphone 3 (S105). The operation type list selector 301 selects a software based operation type list corresponded to the sensed software with reference to the second dictionary 315 illustrated in FIG. 6 (S106).

It is assumed herein that the operating system 311 is in use, and thus, the operating system 311 is sensed as the software in use, and the operating-system exclusive use operation type list LA is selected as the software based operation type list.

FIG. 11 is an imaginary diagram of the operating-system exclusive use operation type list. The operating-system exclusive use operation type list LA is made of the pointer-input-mode exclusive use operation type list Lp and the first-text-input-mode exclusive use operation type list Lt1 as illustrated in FIG. 11.

When the software based operation type list is selected, the second controller 308 outputs the selected software based operation type list to the headset 2 (S107). Here, the operating-system exclusive use operation type list LA is output.

When the selected software based operation type list is output to the headset 2, the first controller 206 in the headset 2 acquires the software based operation type list (S108).

The input mode sensor 303 in the smartphone 3 senses the input mode in use in the smartphone 3 at this time (S109). The second controller 308 outputs input mode specification information indicative of the sensed input mode to the headset 2 (S110).

It is assumed herein that the pointer input mode is in use, and thus, input mode specification information for specifying the pointer input mode is output to the headset 2.

The first controller 206 in the headset 2 acquires the input mode specification information (S111). The operation type list application device 202 selects the input-mode based operation type list corresponding to the input mode specified by the acquired input mode specification information from among the software based operation type lists, and applies the selected input-mode based operation type list to the first dictionary 211 (S112). That is, setting is executed so that the operation types to be recognized from the brain wave are limited to the operation types included in the applied input-mode based operation type list from among the operation types registered in the first dictionary 211.

Here, the pointer-input-mode exclusive use operation type list Lp is selected from the operating-system exclusive use operation type list LA. Then, setting is executed so that the operation types to be recognized are limited to the operation types included in this list. Consequently, the operation types to be recognized from the brain wave are narrowed to only the operation types probably required in the pointer input mode. That is, the operation types probably unrequired in the pointer input mode, specifically the operations such as flick, pinch in, pinch out, or double tap are excluded from the operation types to be recognized. Thus, the number of the operation types to be recognized decreases, the operation types are suppressed from being erroneously recognized, and the recognition accuracy is improved.

<<Flow of Processings of Executing Expected Operation>>

Next, a processing of detecting the brain wave of the user and recognizing the operation type in the headset 2 and outputting the result to the smartphone 3 and a processing of executing an operation in consideration of a priority order of each operation input system in the smartphone 3 will be described below.

As illustrated in FIG. 10B, the detector 201 detects the brain wave of the user (S201), and temporarily records its waveform into the first storage 210. The brain wave type determination device 203 determines the brain wave type based on the recorded waveform of the brain wave and the like (S202). At this time, the brain wave type is determined while being limited to either any of the brain wave types corresponding to the operation types included in the input-mode based operation type list applied at this time or other brain wave types from among the brain wave types registered in the first dictionary 211.

For example, it is assumed that the user expects the operation of moving the pointer left. Then, the detector 201 detects and records the brain wave corresponding to the operation of moving the pointer left. The brain wave type determination device 203 compares the waveform of the recorded brain wave with only the brain wave types corresponding to the operation types included in the pointer-input-mode exclusive use operation type list Lp limited from among the brain wave types registered in the first dictionary 211. At this time, the brain wave types corresponding to the operation types not included in the pointer-input-mode exclusive use operation type list Lp are excluded from the comparison target. For example, brain wave types Si to S4 corresponding to the swipe and the like as illustrated in FIG. 5 are excluded from the comparison target. As a result of the comparison, a brain wave type with the highest similarity, likelihood, or correlation value is then specified from the recorded brain wave. If the brain wave type is excellently determined, a brain wave type P3 corresponding to the pointer moving left is specified from among the brain wave types of FIG. 5.

In the present example, the brain wave type is determined while being limited to the brain wave types corresponding to the operation types included in the pointer-input-mode exclusive use operation type list Lp as illustrated in FIG. 8.

If the detected brain wave has not been determined as any of the limited brain wave types, the expected-operation recognition device 204 recognizes that the expected operation has not been executed. The brain wave type is determined by selecting, for example, the brain wave type with the highest similarity with the recorded brain wave.

The expected-operation recognition device 204 specifies the operation type corresponding to the determined brain wave type with reference to the first dictionary 211, and recognizes that the specified operation type is the user's expected operation type (S203). When the operation type is recognized, the first controller 206 outputs, to the smartphone 3, the recognized operation type information indicative of the recognized operation type (S204).

The second controller 308 acquires the recognized operation type information indicative of the recognized operation type (S205). Here, the expected-operation receiver 304 receives the operation type indicated by the acquired recognized operation type information, as the operation in the expectation input system. Further, the touch operation receiver 305 receives the operation in the touch input system, and the voice/sound operation receiver 306 receives the operation in the voice/sound input system (S206).

The operation reception controller 307 detects whether the operation in each operation input system is present in accordance with a situation of receiving the operation in each operation input system. Specifically, it is detected whether the respective operations in the touch input system, the voice/sound input system, and the expectation input system are present. The operation in the operation input system with the highest priority among the detected operations is then specified (S207), and the specified operation is executed (S208).

Here, the second controller 308 outputs a learning evaluation for the expected operation to the headset 2 (S209). The learning evaluation includes information on, for example, whether user's pressing of the "Like!" button has been detected. The learning device 205 executes the learning processings in order to improve the expected-operation recognition accuracy on the basis of the information (S210). For example, if the detection of the pressing of the "Like!" button has been recognized based on the information, the expected operation has been probably properly executed, and the characteristics of the brain wave detected at this time are fed back to the first dictionary 211, and are reflected on the brain wave pattern corresponding to the brain wave type to be determined.

When the learning processing is executed, the second controller 308 determines whether the input mode in use has changed (S211). Here, if it is determined that the input mode in use has changed (S211: Yes), the processing returns to step S109. If it is determined that the input mode has not changed (S211: No), the processing proceeds to the next determination. The second controller 308 determines whether the software in use has changed (S212). Here, if it is determined that the software in use has changed (S212: Yes), the processing returns to step S105. If it is determined that the software in use has not changed (S212: No), the processing proceeds to the next determination. The second controller 308 determines whether the leaning mode has been selected by the user (S213). Here, if it is determined that the learning mode has been selected (S213: Yes), the processing proceeds to step S301. If it is determined that the learning mode has not been selected (S213: No), the processing proceeds to the next determination. The second controller 308 determines whether to end the cooperation (S214). As situations in which the cooperation is to be ended, a case of input of an instruction for the end of the cooperation, a case of occurrence of a failure in part of the cooperation, a case of low battery and the like are exemplified. Here, if it is determined that the cooperation is to be ended (S214: Yes), the processing proceeds to step S401. If it is determined that the cooperation is not to be ended (S214: No), the processing returns to step S201.

It is assumed herein that, for example, the user executes the operation of tapping an icon B corresponding to the first application (Internet browser application) 312 to change the software in use in the smartphone 3 from only the operating system 311 to the first application 312. In this case, when the processing in step S212 is executed, it is determined that the software in use has changed (S212: Yes), and the processing returns to step S105.

Figure 12:
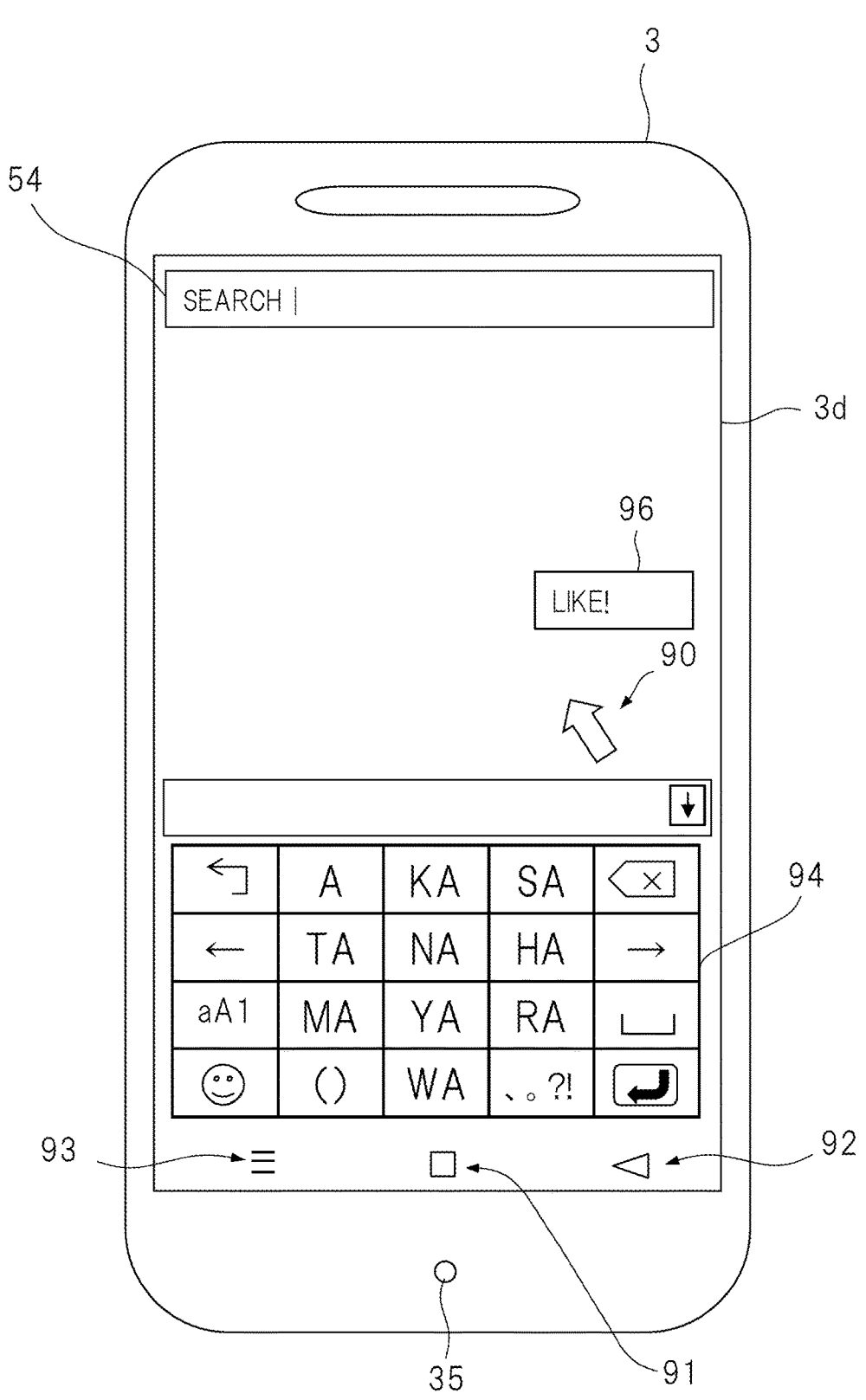
FIG. 12 is a diagram illustrating exemplary display of a smartphone under use of a first application.

FIG. 12 is a diagram illustrating exemplary display of the smartphone under use of the first application. As illustrated in FIG. 12, a text box 54 for inputting a search keyword to be used for Web searching and a software keyboard 94 for inputting text are displayed on the touch panel display screen 3d of the smartphone 3.

The software-in-use sensor 302 senses the first application 312 after the changing (S105). The operation type list selector 301 selects the first-application exclusive use operation type list LB corresponding to the first application 312 with reference to the second dictionary 315 illustrated in FIG. 6 (S106).

FIG. 13 is an imaginary diagram of the first-application exclusive use operation type list LB. As illustrated in FIG. 13, the first-application exclusive use operation type list LB is made of the pointer-input-mode exclusive use operation type list Lp, the first-text-input-mode exclusive use operation type list Lt1, and the map-operation-input-mode exclusive use operation type list Lm.

The second controller 308 outputs the selected first-application exclusive use operation type list LB to the headset 2 (S107). The first controller 206 in the headset 2 acquires this first-application exclusive use operation type list LB (S108).

The input mode sensor 303 in the smartphone 3 senses the input mode selected in the smartphone 3 at this time (S109). Since it is assumed herein that the first text input mode is selected, the first text input mode is sensed. The second controller 308 outputs input mode specification information for specifying the sensed first text input mode to the headset 2 (S110).

The first controller 206 in the headset 2 acquires this input mode specification information (S111). The operation type list application device 202 specifies the first-text-input-mode exclusive use operation type list Lt1 corresponding to the first text input mode specified by the acquired input mode specification information, and applies this first-text-input-mode exclusive use operation type list Lt1 to the first dictionary 211 (S112). That is, setting is executed so that the operation types to be recognized from the brain wave are limited to the operation types included in the first-text-input-mode exclusive use operation type list Lt1 from among the operation types included in the first dictionary 211.

Consequently, the operation types to be recognized from the brain wave are narrowed to only the operation types probably required in the first text input mode. That is, the operation types probably unrequired in the first text input mode, specifically the operations such as swipe, pinch in, pinch out, long press, and double tap are excluded from the operation types to be recognized.

In these processings, unless the learning mode is selected or the cooperation ends, a cycle of detecting the brain wave to recognize the expected operation and executing the recognized expected operation is continued. The user can achieve the desired operation by operating the pointer 90 displayed on the screen of the smartphone 3 under the expected operation. However, the touch operation or the voice/sound operation is preferentially executed if any. Further, for every change of the software or the input mode in use, a new operation type list is applied to the first dictionary 211. That is, the operation types to be recognized, that is, the brain wave types to be determined are always properly narrowed.

<<Flow of Processings in Learning Mode>>

Next, processings in the learning mode, that is, learning processings in order to improve the operation type recognition accuracy in the expected operation will be described.

As illustrated in FIG. 10C, when the learning mode is selected, the second controller 308 outputs a learning request signal to the headset 2 (S301). The learning device 205 outputs a learning permission signal to the smartphone 3 in response to the learning request signal (S302). The second controller 308 acquires this learning permission signal. When the learning permission signal is acquired, the learning mode is established.

The second controller 308 selects one of a plurality of types of pointers previously prepared (S304), and displays the selected pointer on the screen. Further, the second controller 308 outputs an operation instruction for the user (S305). As the operation instruction, an image or text may be displayed, or voice/sound may be output.

Figure 14:
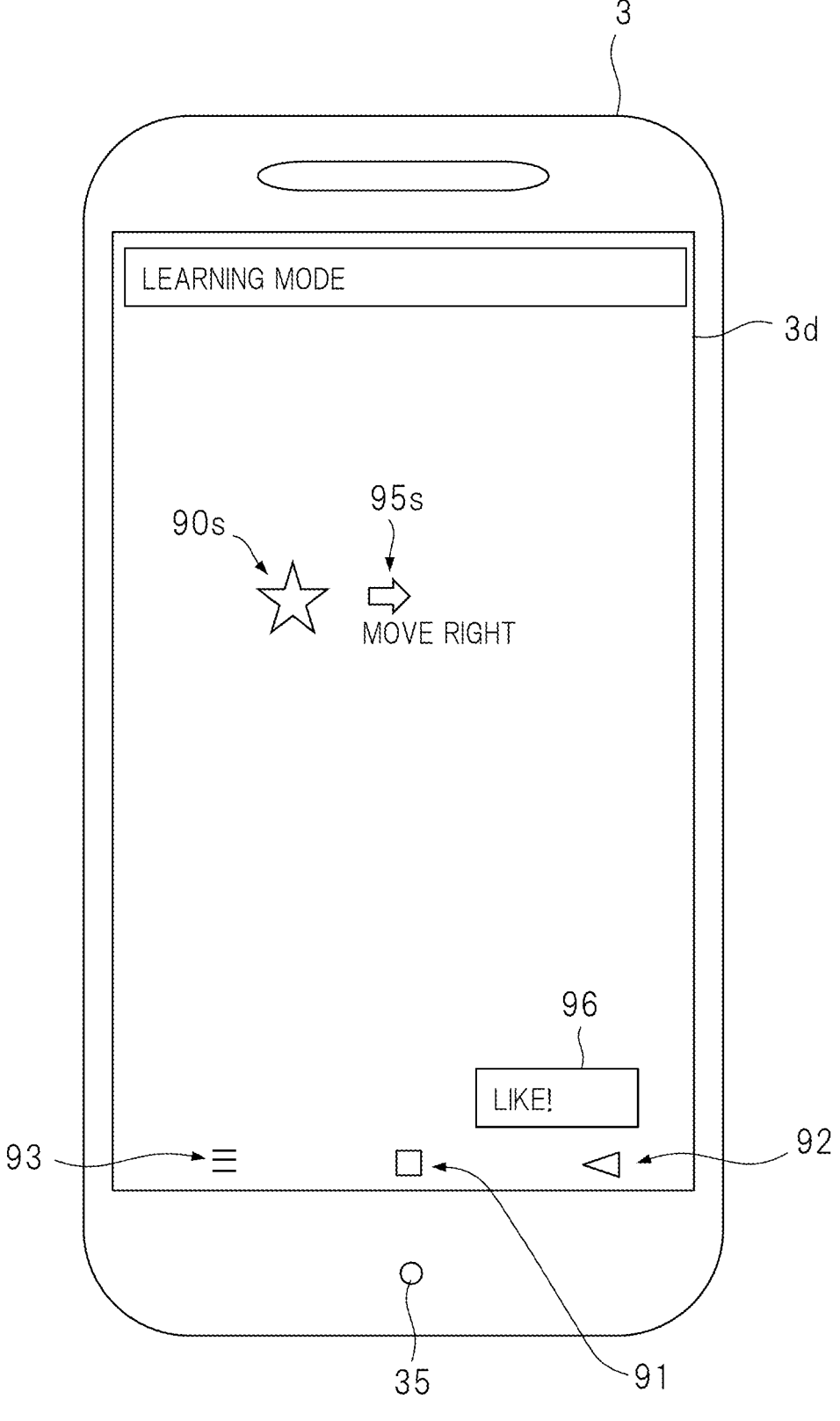
FIG. 14 is a diagram illustrating exemplary display of a smartphone under selection of a learning mode.

FIG. 14 is a diagram illustrating exemplary display of the smartphone under selection of the learning mode. As illustrated in FIG. 14, on the touch panel display screen 3d, for example, a star-shaped pointer 90s is displayed, and an instruction image 95s indicating the operation instruction of moving the pointer right is displayed. Further, the "Like!" button 96 to be pressed by the user when the expected operation has been successfully executed is also displayed. Here, the user expects the operation exactly following the output operation instruction.

When the pointer is displayed while the operation instruction is output, the learning device 205 controls the detector 201, the brain wave type determination device 203, and the expected-operation recognition device 204, detects the brain wave of the user (S306), determines the brain wave type based on the detected brain wave (S307), and recognizes and outputs the operation type with reference to the first dictionary 211 and the applied operation type list on the basis of the determined brain wave type (S308). Further, the learning device 205 stores the brain wave detected in the learning mode into the first storage 210 to be corresponded to its detection timing. The second controller 308 receives the operation type output from the headset 2, and executes the operation corresponding to the operation type (S309).

If the executed operation is the operation exactly expected by the user, he/she presses the "Like!" button 96, and inputs the evaluation indicating that the expected operation has been successfully executed. If the evaluation indicating that the expected operation has been successfully executed is input, the second controller 308 receives the evaluation (S310), and stores, into the second storage 310, evaluation result information making correspondence among the type of the operation instruction, the timing, and the evaluation at this time.

The second controller 308 determines whether to change the operation instruction (S311). This determination is made based on, for example, whether continuous output time of the operation instruction has been equal to or longer than a certain period of time, whether the number of times of the input of the evaluation indicating that the expected operation has been successfully executed has been equal to or more than a certain number of times, or the like. If it is determined that the operation instruction is to be changed (S311: Yes), the second controller 308 returns the processing to step S305, and changes and outputs the operation instruction. If it is determined that the operation instruction is not to be changed (S311: No), the second controller 308 determines whether to change the pointer to be displayed (S312). This determination is made based on, for example, whether the number of times of the change of the operation instruction has been equal to or more than a certain number of times, whether the number of times of the input of the evaluation indicating that the expected operation has been successfully executed has been equal to or more than a certain number of times, or the like.

If it is determined that the pointer to be displayed is to be changed (S312: Yes), the second controller 308 returns the processing to step S304, and selects another pointer.

Figure 15:
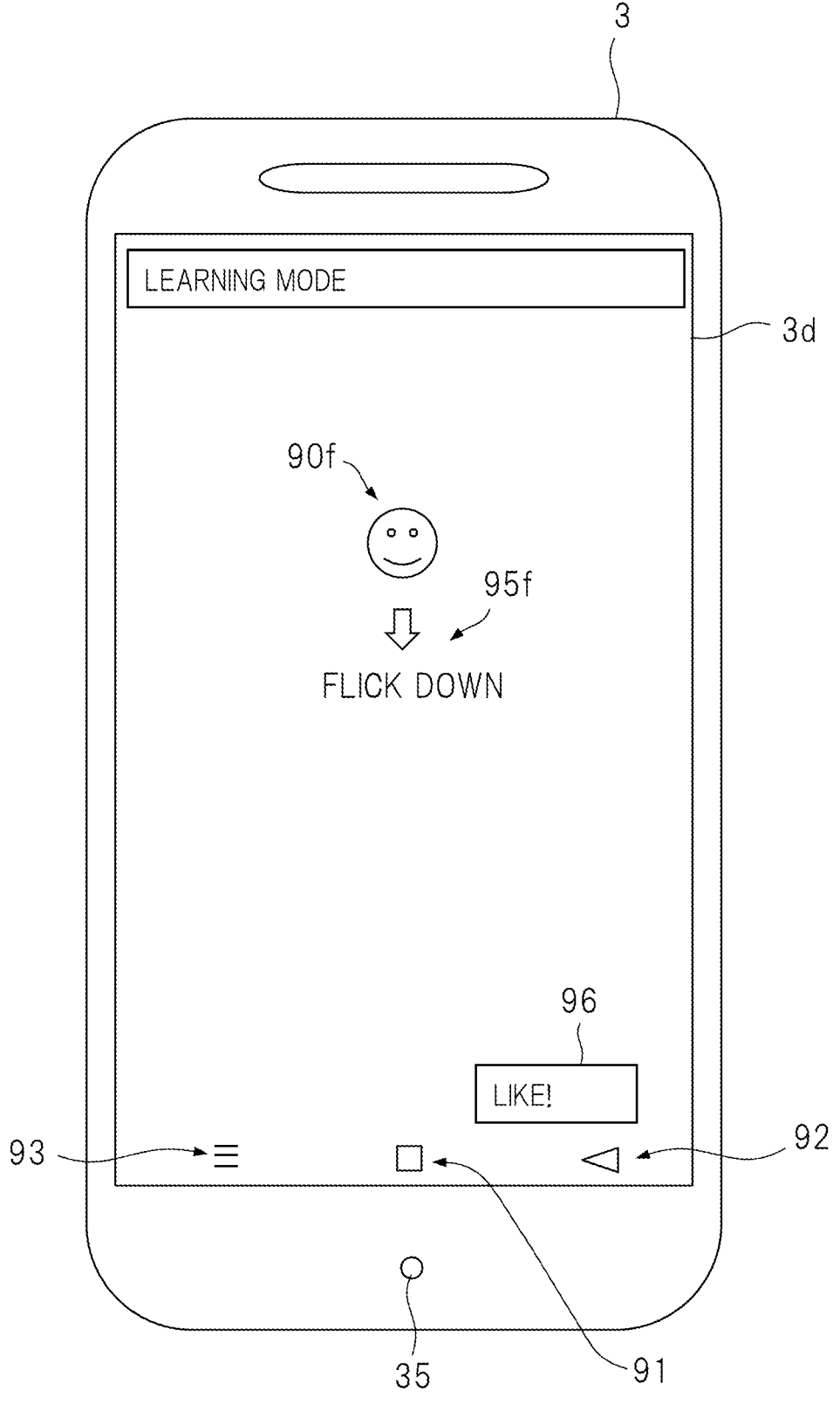
FIG. 15 is a diagram illustrating exemplary display under output of an operation instruction in which a pointer to be displayed is changed to another pointer.

FIG. 15 is a diagram illustrating exemplary display under change of the pointer to be displayed to another pointer and output of the operation instruction. In the example of FIG. 15, the pointer to be displayed is changed to a face-shaped pointer 90f, and an operation instruction image 95f meaning the "flick down" is displayed as the operation instruction.

Figure 16:
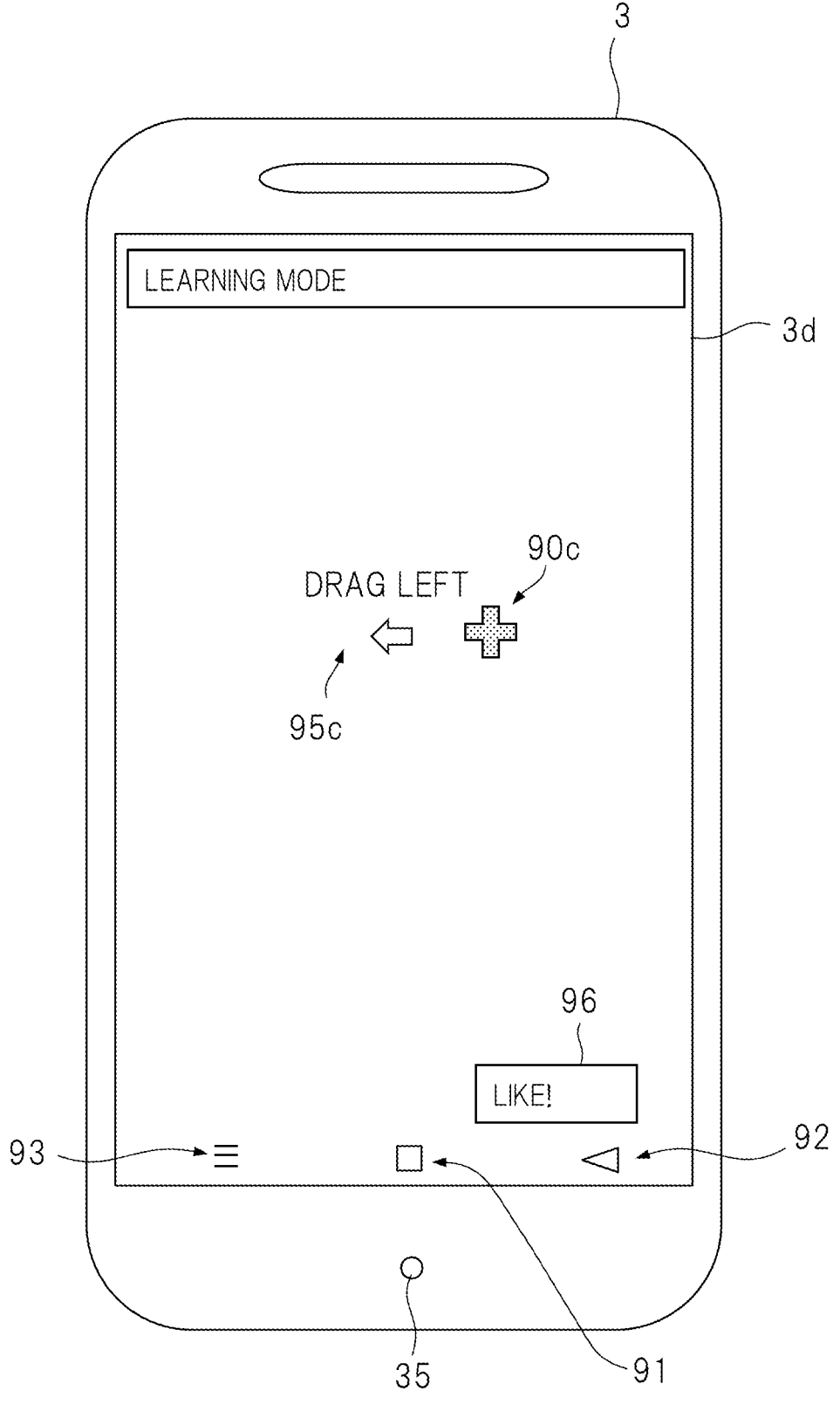
FIG. 16 is a diagram illustrating exemplary display under output of an operation instruction in which a pointer to be displayed is changed to still another pointer.

Further, FIG. 16 is a diagram illustrating exemplary display under change of the pointer to be displayed to still another pointer and output of the operation instruction. In the example of FIG. 16, the pointer to be displayed is changed to a cross-shaped pointer 90c with an eye-catching color such as red or blue, and an operation instruction image 95c meaning the "drag left" is displayed as the operation instruction.

If it is determined that the pointer to be displayed is not to be changed (S312: No), the second controller 308 ends the learning mode, and outputs the evaluation result information stored in the second storage 310 to the headset 2 (S313). The learning device 205 adjusts the first dictionary 211 on the basis of the acquired evaluation result information (S314). For example, the learning device 205 corrects and adjusts the brain wave pattern of the brain wave types registered in the first dictionary 211 on the basis of the operation type evaluated as the excellent expected operation and the waveform of the brain wave under this operation type to be a pattern to which the characteristics of the brain wave of the user is further reflected. By the adjustment of the first dictionary 211, the brain wave type determination accuracy in the expected operation is improved, and the operation type recognition accuracy is improved. Further, the learning device 205 analyzes which pointer improves the brain wave determination accuracy, and determines the order of the pointers in descending order of accuracy (S315). Information on the order of the pointers is output to the smartphone 3. The smartphone 3 is set so that the pointer of any type can be selected as the pointer to be displayed with reference to the order of this pointer. Alternatively, this is set so that the pointer of the type with the highest order can be automatically selected.

When the learning mode ends, the second controller 308 returns the step to be executed to S214, and continues the processing.

<<Flow of Processings of Ending Cooperation>>

If it is determined in step S214 that the cooperation is to be ended (S214: Yes), the second controller 308 outputs a cooperation ending request signal to the headset 2 (S401). Then, the first controller 206 outputs a cooperation ending permission signal to the smartphone 3 in response to the request signal (S402). The second controller 308 acquires this cooperation ending permission signal (S403), and the cooperation ends.

According to the first example, even if the software in use is changed halfway, the operation types to be recognized in the expected operation are properly limited, and therefore, the operation types are accurately suppressed from being erroneously recognized, and the recognition accuracy is improved.

Second Example

In a second example, it is assumed that the software in use is the first application (Internet browser application) 312 while the input mode is the pointer input mode first and then changes to the map operation input mode halfway.

Figure 17:
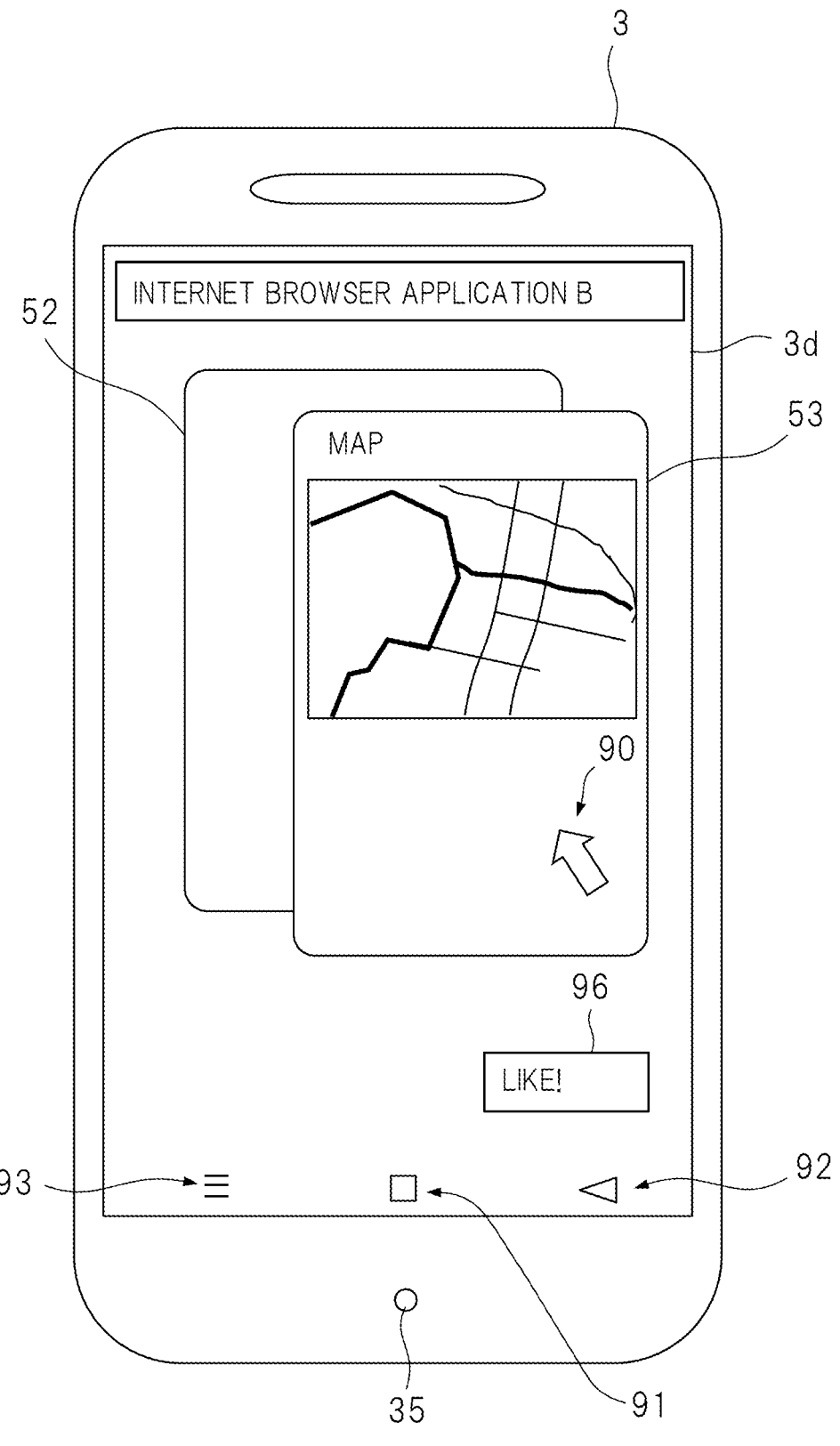
FIG. 17 is a diagram illustrating exemplary display of a smartphone under a second application as software in use and a pointer input mode as an input mode.

FIG. 17 is a diagram illustrating exemplary display of the smartphone under the second application as the software in use and the pointer input mode as the input mode. In the present example, for example, as illustrated in FIG. 17, a window 52 and a window 53 including a map are displayed in a partially overlapping manner on the touch panel display screen 3d. Further, the pointer 90 is displayed at any position on the touch panel display screen 3d.

In the present example, in step S105 in the flow of FIG. 10A, the second application 313 is sensed as the software in use. In step S106, the first-application exclusive use operation type list LB (see FIG. 13) is selected as the software based operation type list.

In step S107, the selected first-application exclusive use operation type list LB is output to the headset 2. In step S108, the first-application exclusive use operation type list LB is acquired by the headset 2. Further, in step S109, the pointer input mode is sensed as the input mode. In step S110, information for specifying the pointer input mode is output to the headset 2. In step S111, the information for specifying the pointer input mode is acquired by the headset 2. In step S112, the pointer-input-mode exclusive use operation type list Lp (see FIG. 13) in the first-application exclusive use operation type list LB is applied to the first dictionary 211.

Then, steps S201 to S214 are repeatedly executed to execute the expected operation. During the repeat execution of the steps S201 to S214, the user operates the pointer 90 on the touch panel display screen 3d to, for example, select and display a higher-interest background window on top or widen a foreground window. In order to display the background window on top or to widen the foreground window, for example, the window is tapped in a state in which the pointer 90 is moved onto the window by the expected operation.

Figure 18:
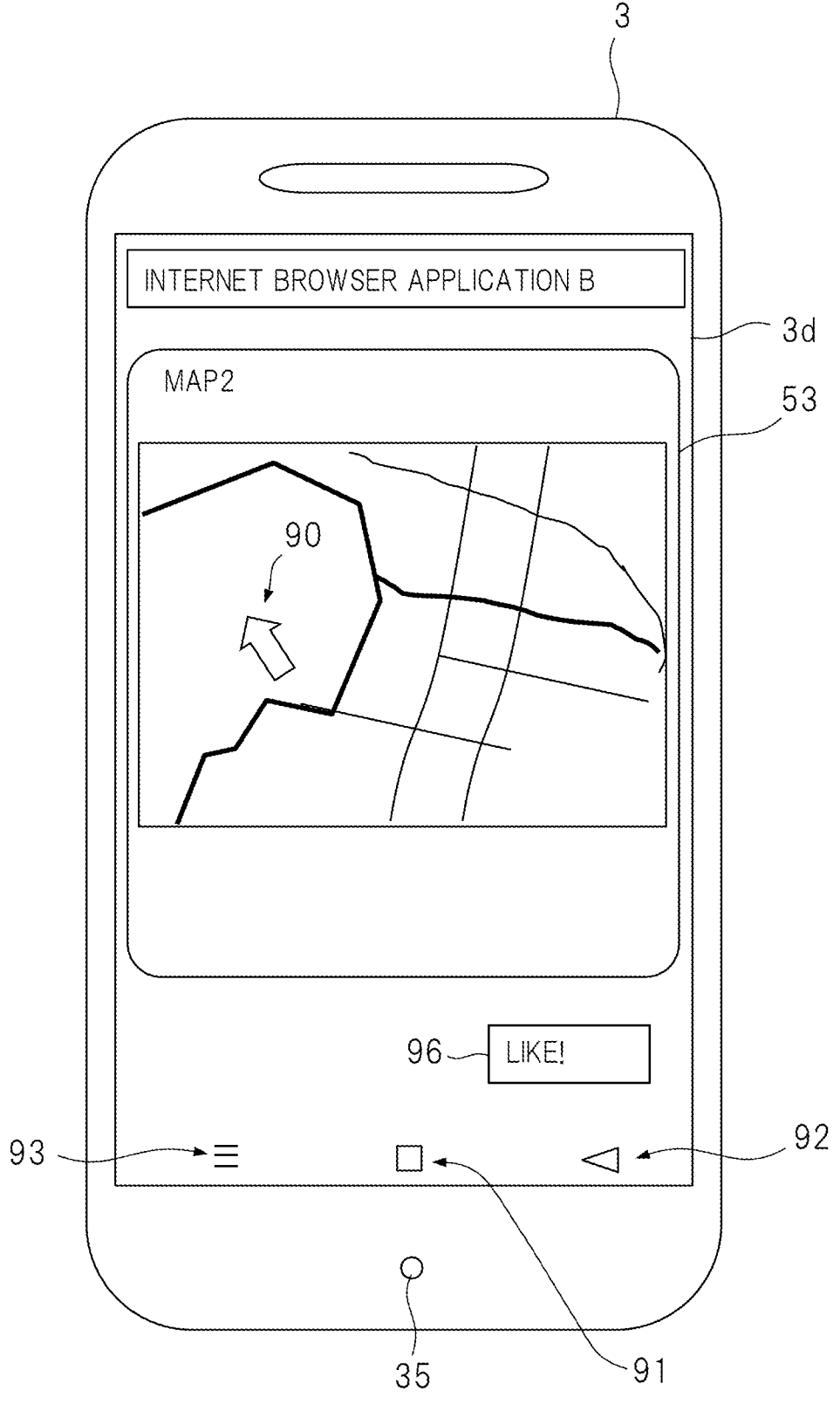
FIG. 18 is a diagram illustrating exemplary display under widening of a foreground window by tap.

FIG. 18 is a diagram illustrating exemplary display under widening of the foreground window by the tap. For example, as illustrated in FIG. 18, the window 53 is widened, and the map is enlarged and displayed. At this time, the input mode changes from the pointer input mode to the map operation input mode.

In this case, in step S211 in the flow of FIG. 10B, it is determined that the input mode has changed, and the processing returns to step S109. In step S109, the map operation input mode is sensed as the input mode. In step S110, information for specifying the map operation input mode is output to the headset 2. In step S111, the information for specifying the map operation input mode is acquired by the headset 2. In step S112, the map-operation-input-mode exclusive use operation type list Lm (see FIG. 13) in the first-application exclusive use operation type list LB is applied to the first dictionary 211.

Then, steps S201 to S214 are repeatedly executed to execute the expected operation. During the repeat execution of the steps S201 to S214, the user operates the pointer 90 on the touch panel display screen 3*d* to, for example, move the map display region or enlarge and display the map. In order to move the map display region, the map is, for example, dragged up/down/left/right by the pointer 90 in the expected operation. Further, in order to enlarge and display the map, the pointer 90 is moved to a position at which the map is to be enlarged and displayed, and then, the map is pinched out or double-tapped at this position by the expected operation.

According to the second example, even if the input mode in use is changed halfway, the operation types to be recognized in the expected operation are properly limited, and therefore, the operation types are accurately suppressed from being erroneously recognized, and the recognition accuracy is improved.

Third Example

Figure 19:
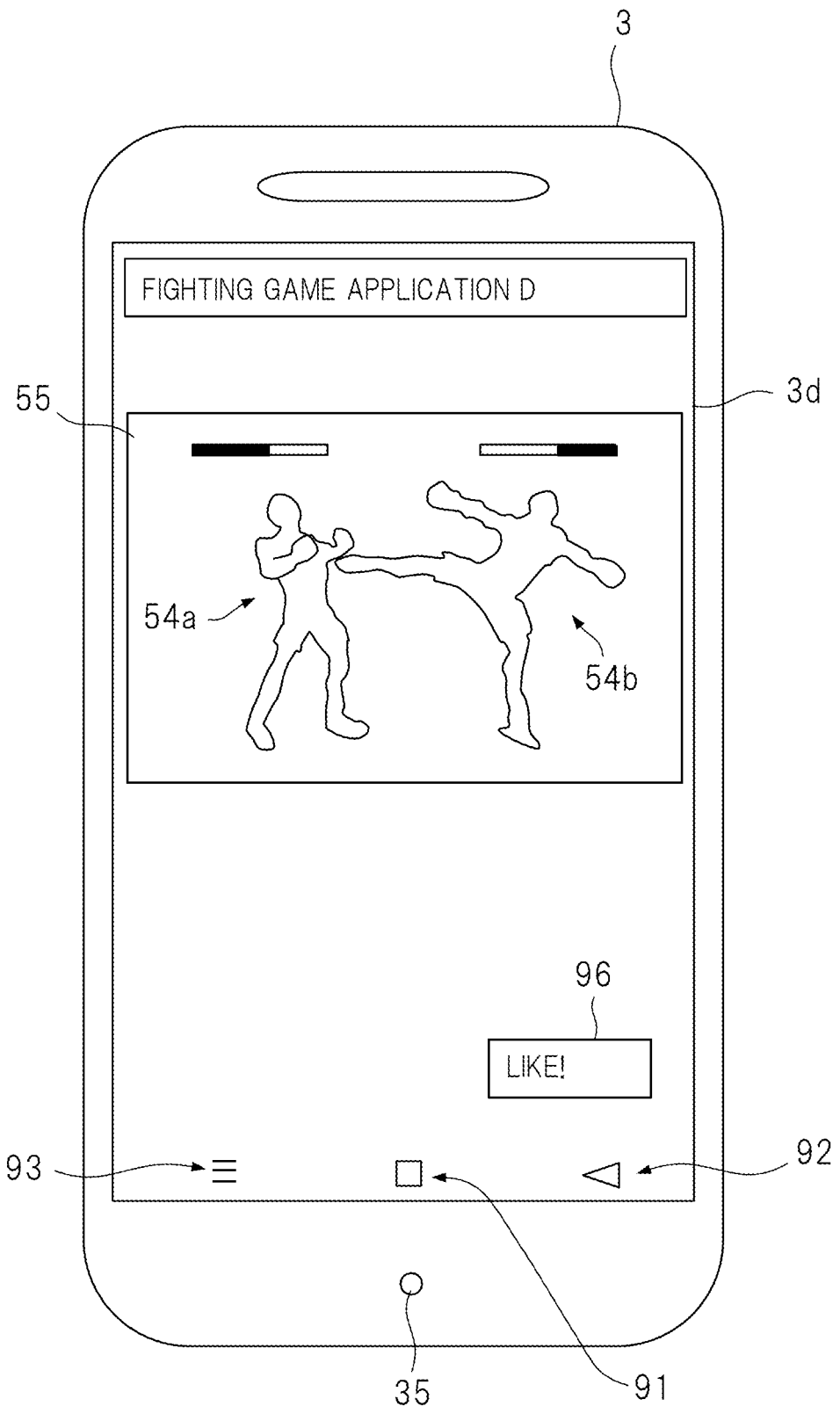
FIG. 19 is a diagram illustrating exemplary display of a smartphone under a second application as software in use and a (mascot) character operation input mode as an input mode.

In a third example, it is assumed that the software in use is the second application (fighting game application) 313 while the input mode is the character operation input mode. FIG. 19 is a diagram illustrating exemplary display of the smartphone under use of the second application as the software in use and the character operation input mode as the input mode. In the present example, for example, as illustrated in FIG. 19, an image 55 including a character 54*a* corresponding to the avatar of the user and a character 54*b* as his/her opponent is displayed on the touch panel display screen 3*d*. Note that the pointer may or may not be displayed.

In the present example, in step S105 in the flow of FIG. 10A, the second application 313 is sensed as the software in use. In step S106, the second-application exclusive use operation type list LC is selected as the software based operation type list.

FIG. 20 is an imaginary diagram of the second-application exclusive use operation type list. As illustrated in FIG. 20, the second-application exclusive use operation type list LC is made of the pointer-input-mode exclusive use operation type list Lp, the first-text-input-mode exclusive use operation type list Lt1, and the character-operation-input-mode exclusive use operation type list Lf.

In step S107, the selected second-application exclusive use operation type list LC is output to the headset 2. In step S108, the second-application exclusive use operation type list LC is acquired by the headset 2. Further, in step S109, the character operation input mode is sensed as the input mode. In step S110, information for specifying the character operation input mode is output to the headset 2. In step S111, the information for specifying the character operation input mode is acquired by the headset 2. In step S112, the character-operation-input-mode exclusive use operation type list Lf (see FIG. 20) in the second-application exclusive use operation type list LC is applied to the first dictionary 211.

As illustrated in FIG. 20, the character-operation-input-mode exclusive use operation type list Lf includes the pointer moving left/right, the flick up/down/left, the tap, and the double tap. The pointer moving right corresponds to the character moving forward, and the pointer moving left corresponds to the character moving backward. Further, the flick up corresponds to the character jump, the flick down corresponds to the character lying down, and the flick left corresponds to the character guard. Further, the tap corresponds to the character punch, and the double tap corresponds to the character kick.

By these processings, setting is made so that the operation types to be recognized are limited to the operation types included in the character-operation-input-mode exclusive use operation type list Lf. Consequently, the operation types to be recognized from the brain wave are narrowed to only the operation types probably required in the character operation input mode. That is, the operation types probably unrequired in the character operation input mode, specifically the operations such as the pointer moving up/down, the swipe up/down/left/right, the drag up/down, the pinch in, and the pinch out are excluded from the operation types to be recognized.

According to the third example, it is easily understood that the expected operation can be intuitively used since the operation directions, actions, and the like in the game application are highly similar to those of the intended actions in the game. Further, the number of operation types tends to be smaller than that of other applications. Thus, the information processing system according to the present embodiment is highly practical for such game applications, particularly for fighting, sports, rhythm, or card game applications.

If the expected operation has not been recognized for a certain period of time or longer, note that the second controller 308 may control the position of the pointer 90 to return to the center. By the control, the position of the pointer is reset, and a next expected operation is easily started.

According to the first embodiment described above, in accordance with the software in use in the smartphone 3, the software based operation type list corresponding to this software is applied to the first dictionary 211. Further, in accordance with the input mode in use in the smartphone 3, the input-mode based operation type list corresponding to this input mode is applied to the first dictionary 211. Thus, candidates of the brain wave types to be determined are narrowed to the brain wave types corresponded to the operation types used in the software or the input mode in use in the smartphone 3. That is, the operation types probably unrequired in the software or the input mode in use are excluded from the operation types to be recognized, and the brain wave types corresponding to these operation types are also excluded from the brain wave types to be determined. That is, the numbers of the brain wave types to be determined and the operation types to be recognized decrease, the brain wave types are easily determined, the operation types are suppressed from being erroneously recognized, and the recognition accuracy is improved. Consequently, a highly-feasible and highly-practical expected operation can be achieved by the operations of the information processing terminal. That is, the user's expected operation can be recognized and applied to the operations of the information processing terminal.

Second Embodiment

An information processing system according to a second embodiment is configured so that the operation type list is specified in accordance with only the input mode in the smartphone while the headset applies the operation type list to the first dictionary.

<Functional Configuration>

A functional configuration of the information processing system according to the second embodiment will be described.

Figure 21:
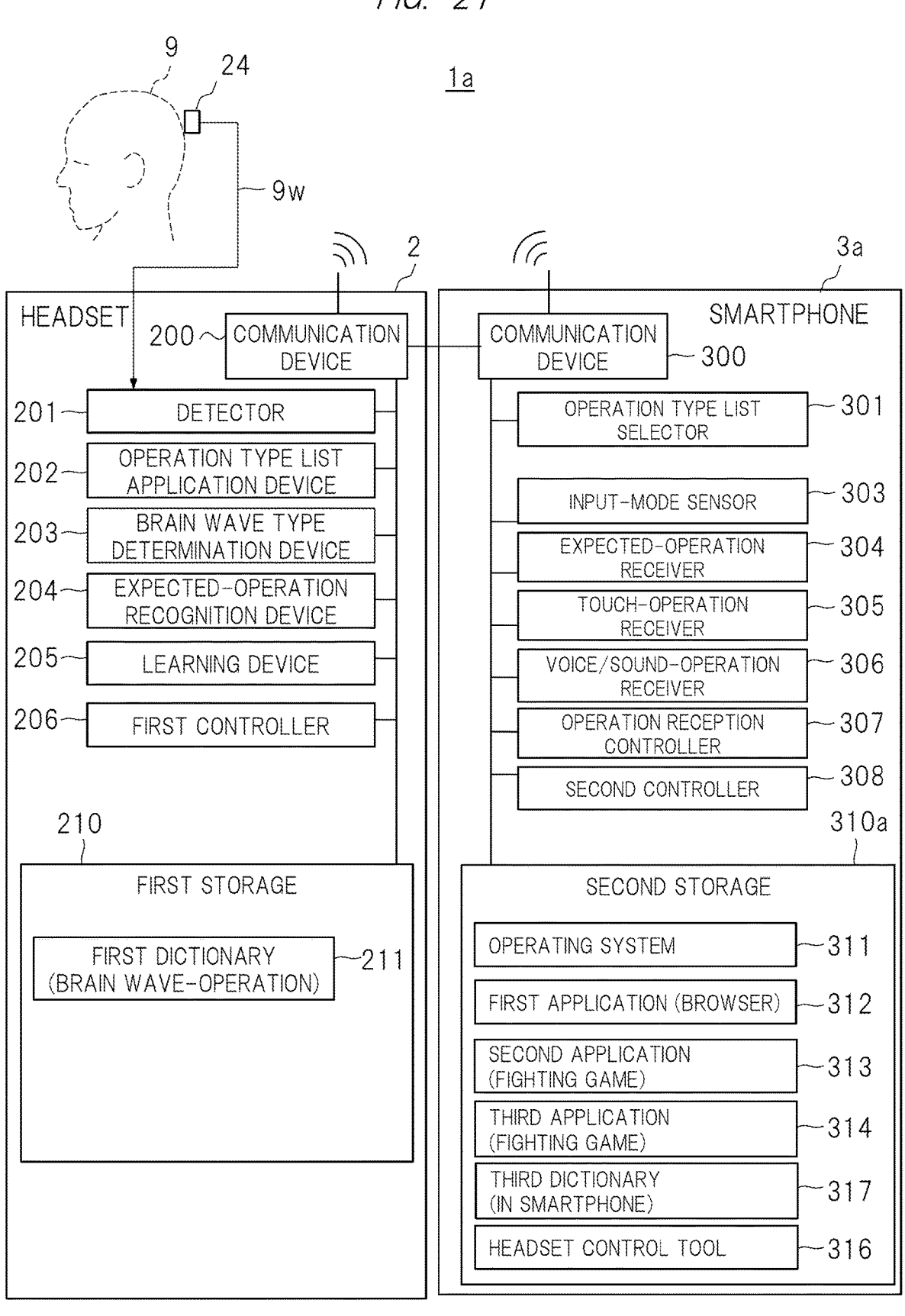
FIG. 21 is a diagram illustrating a configuration of functional blocks of a headset and a smartphone in an information processing system according to a second embodiment.

FIG. 21 is a diagram illustrating a configuration of functional blocks of the headset and the smartphone in the information processing system according to the second embodiment.

Although an information processing system 1*a* is based on the information processing system 1 according to the first embodiment, a second storage 310*a* in a smartphone 3*a* stores therein a third dictionary (third table) 317 instead of the second dictionary 315.

The third dictionary 317 is made of a table corresponding the input mode used in the smartphone 3*a* to the operation type list corresponding to the input mode for each input mode.

FIG. 22 is a diagram illustrating an example of the third dictionary. As illustrated in FIG. 22, the third dictionary 317 is made of a table corresponding the type of the input mode used in the smartphone 3*a* to the input-mode based list limitedly listing the operation types used under use of this input mode for each type of the input mode.

As illustrated in FIG. 22, in the present embodiment, the pointer-input-mode exclusive use operation type list Lp, the first-text-input-mode exclusive use operation type list Lt1, the map-operation-input-mode exclusive use operation type list Lm, and the character-operation-input-mode exclusive use operation type list Lf are prepared as the input-mode based operation type lists.

First Example

A first example is an example in which the headset acquires the input-mode based operation type list for every change of the input mode of the smartphone.

That is, in the first example, the smartphone 3*a* senses the input mode in use, and outputs, to the headset 2, the input-mode based operation type list corresponding to the sensed input mode. For every change of the input mode, the input mode is sensed, and the input-mode based operation type list corresponding to this input mode is applied to the first dictionary 211.

FIGS. 23A to 23D are flowcharts of processings in the first example of the information processing system according to the second embodiment. Differences from the flow of the first embodiment are included in the flow of processings of FIGS. 23A and 23B. Note that only the flow of processings related to the differences from the first embodiment will be described but others will not be described herein.

Figure 23A:
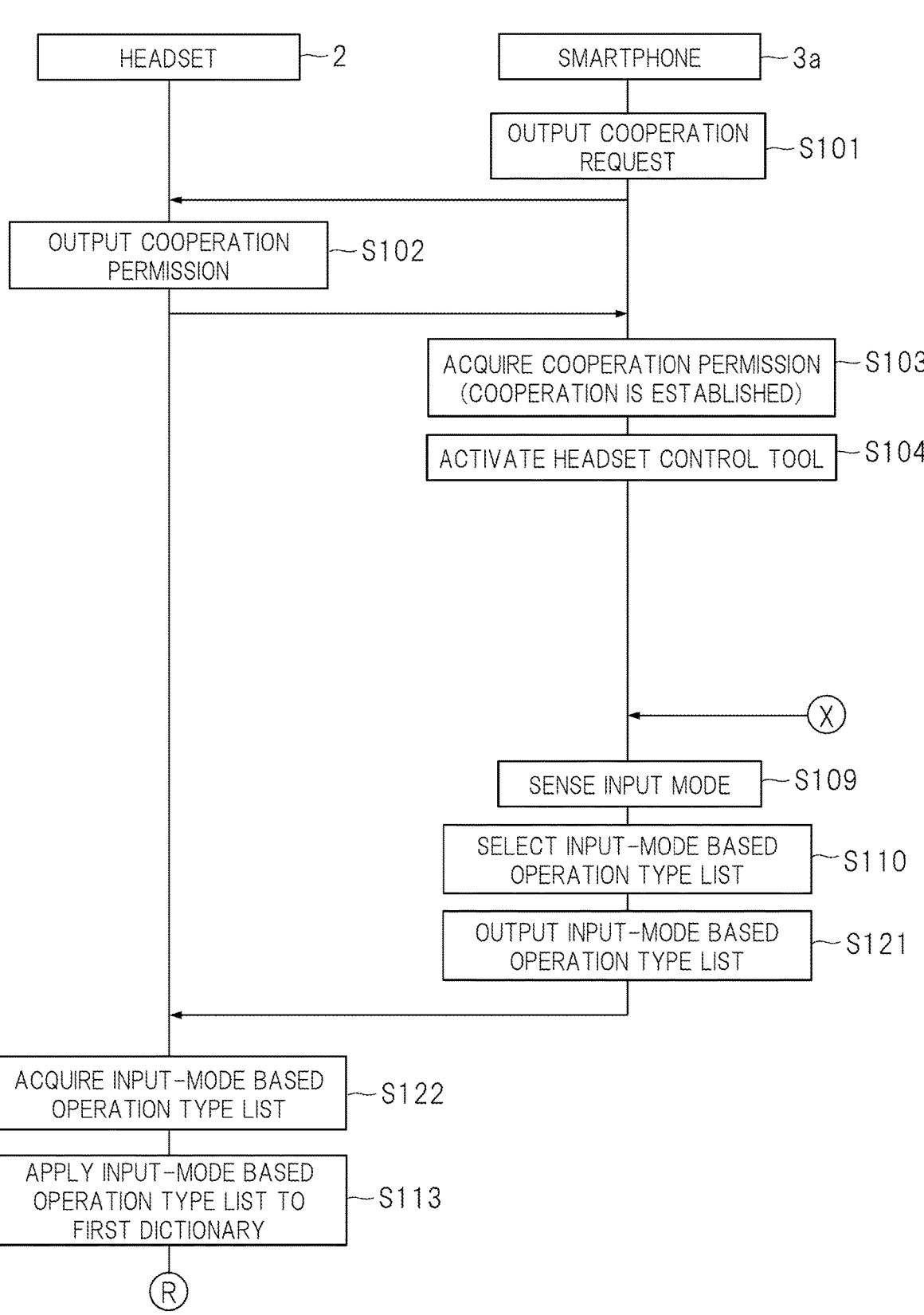
FIG. 23A is a flowchart of processings in a first example of the information processing system according to the second embodiment.
Figure 23B:
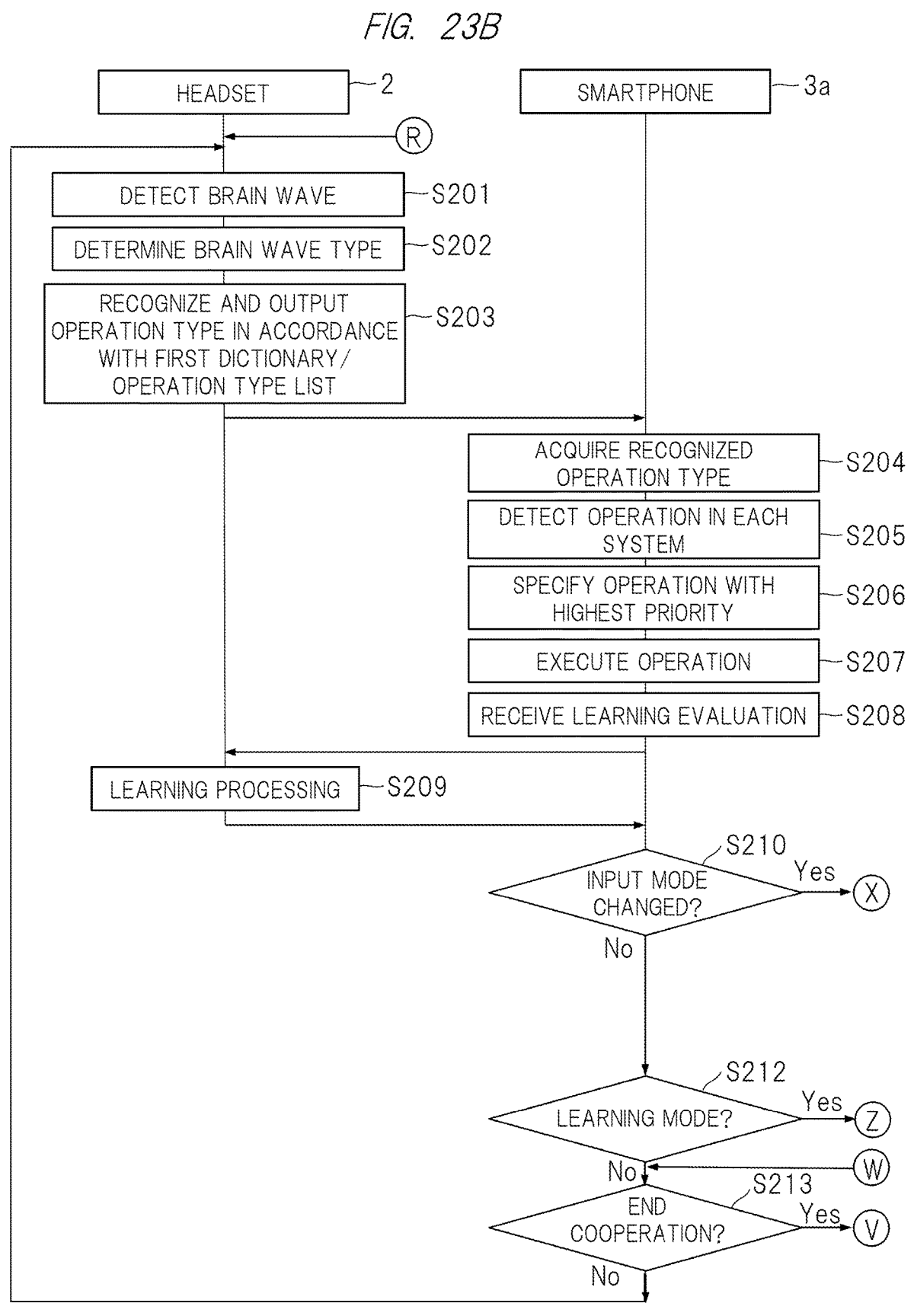
Figure 23C:
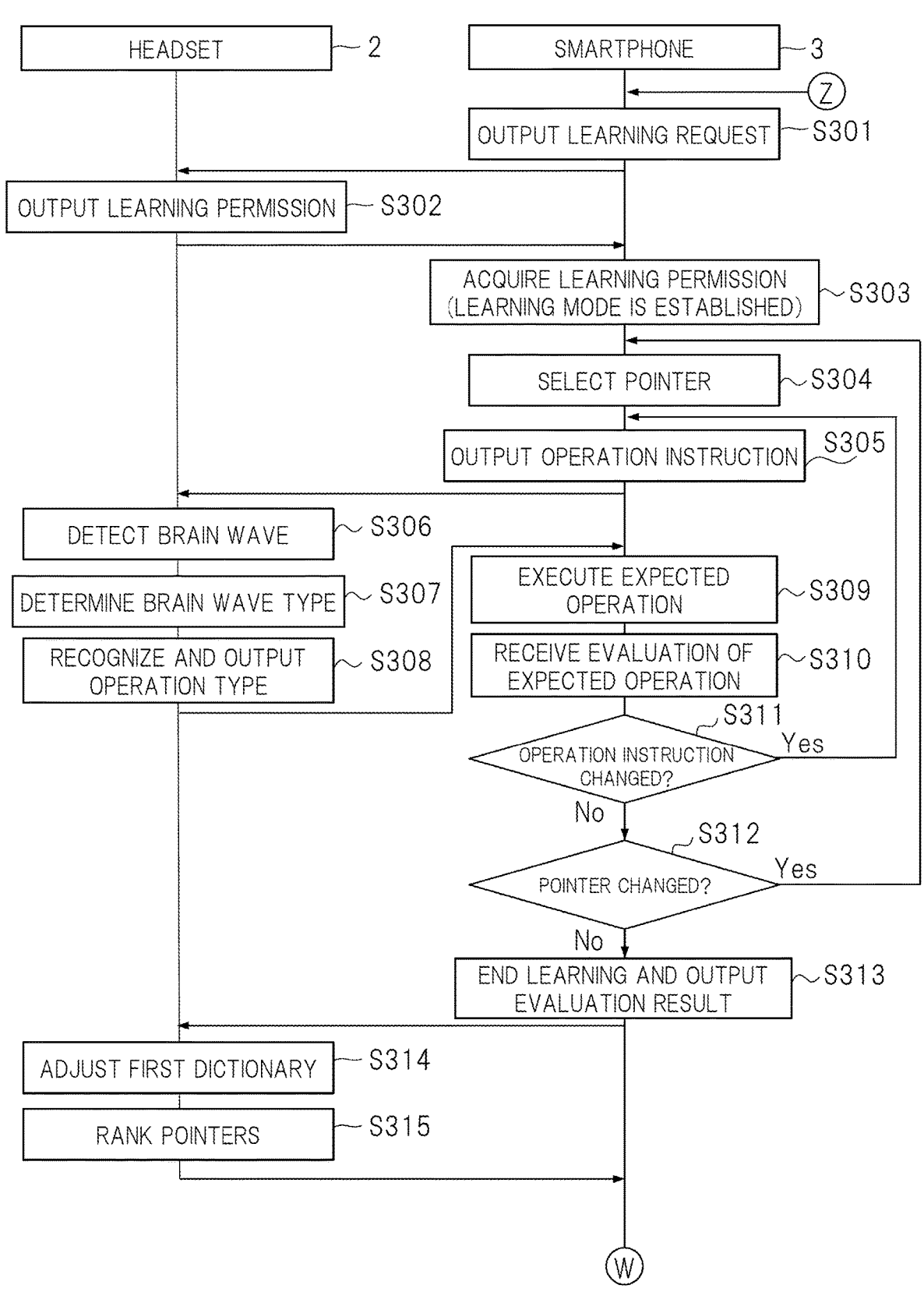
FIG. 23C is a flowchart of processings in the first example of the information processing system according to the second embodiment.
Figure 23D:
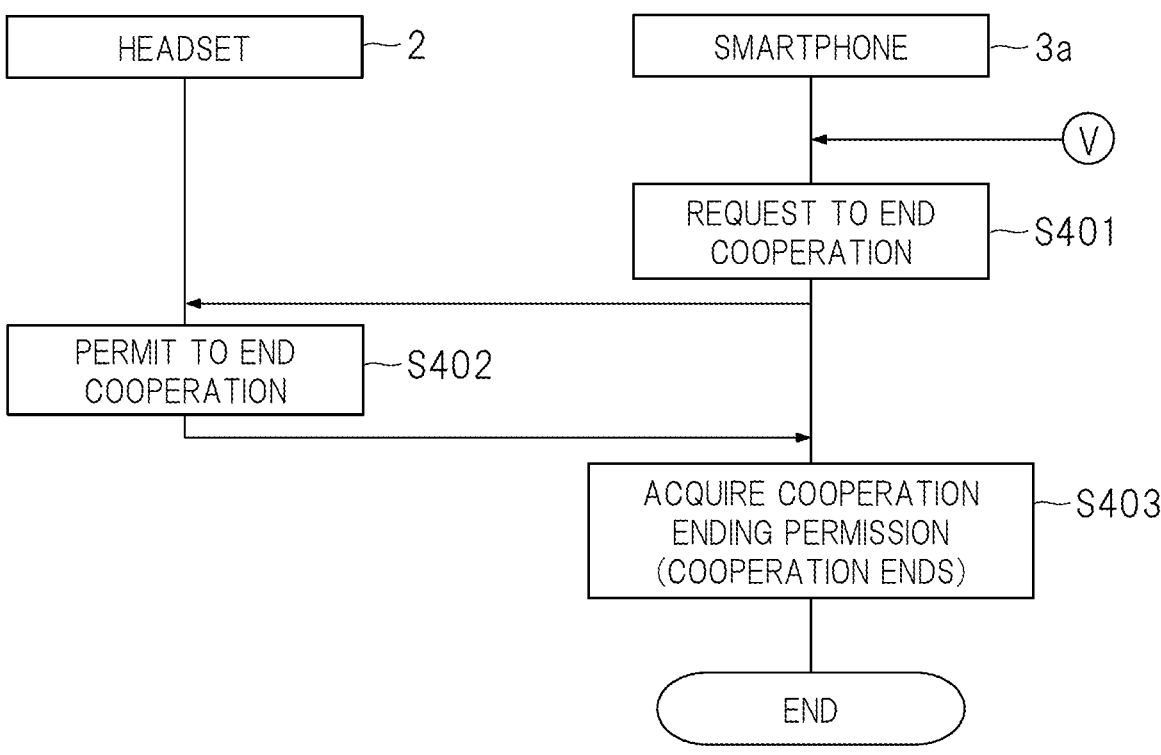
FIG. 23D is a flowchart of processings in the first example of the information processing system according to the second embodiment.

In the flowchart of processings of FIG. 23A, when cooperation between the smartphone 3*a* and the headset 2 is established (S103), the headset control tool 316 is activated in the smartphone 3*a* (S104), and then, the input mode is sensed (S109). When the input mode is sensed, the input-mode based operation type list corresponding to the sensed input mode is selected (S110). Then, the selected input-mode based operation type list is output to the headset 2 (S121). The input-mode based operation type list is acquired by the headset 2 (S122), and is applied to the first dictionary 211 (S113).

Further, in the flow of processings of FIG. 23B, it is determined whether the input mode has changed (S210). If it is determined that the input mode has not changed (S210:

No), it is not determined whether the software in use has changed while it is immediately determined whether the learning mode has been selected (S212). To the contrary, if it is determined that the input mode has changed (S210: Yes), the processing returns to step S109, and the input mode is sensed again.

Second Example

A second example is an example in which all the input-mode based operation type lists are previously acquired by the headset.

That is, in the second example, the smartphone outputs all the prepared input-mode based operation type lists to the headset first, and then, the headset acquires all the input-mode based operation type lists. Then, the smartphone senses the input mode, and outputs the input mode specification information to the headset. The headset acquires this input mode specification information, specifies the input mode based on the acquired input mode specification information, and applies the input-mode based operation type list corresponding to the specified input mode to the first dictionary 211. For every change of the input mode, the input mode is sensed, and the input-mode based operation type list corresponding to this input mode is applied to the first dictionary.

FIGS. 24A to 24D are flowcharts of processings in the second example of the information processing system according to the second embodiment. Differences from the flow of the first embodiment are included in the flow of processings of FIGS. 24A and 24B. Note that only the flow of processings related to the differences from the first embodiment will be described while others will not be described herein.

Figure 24A:
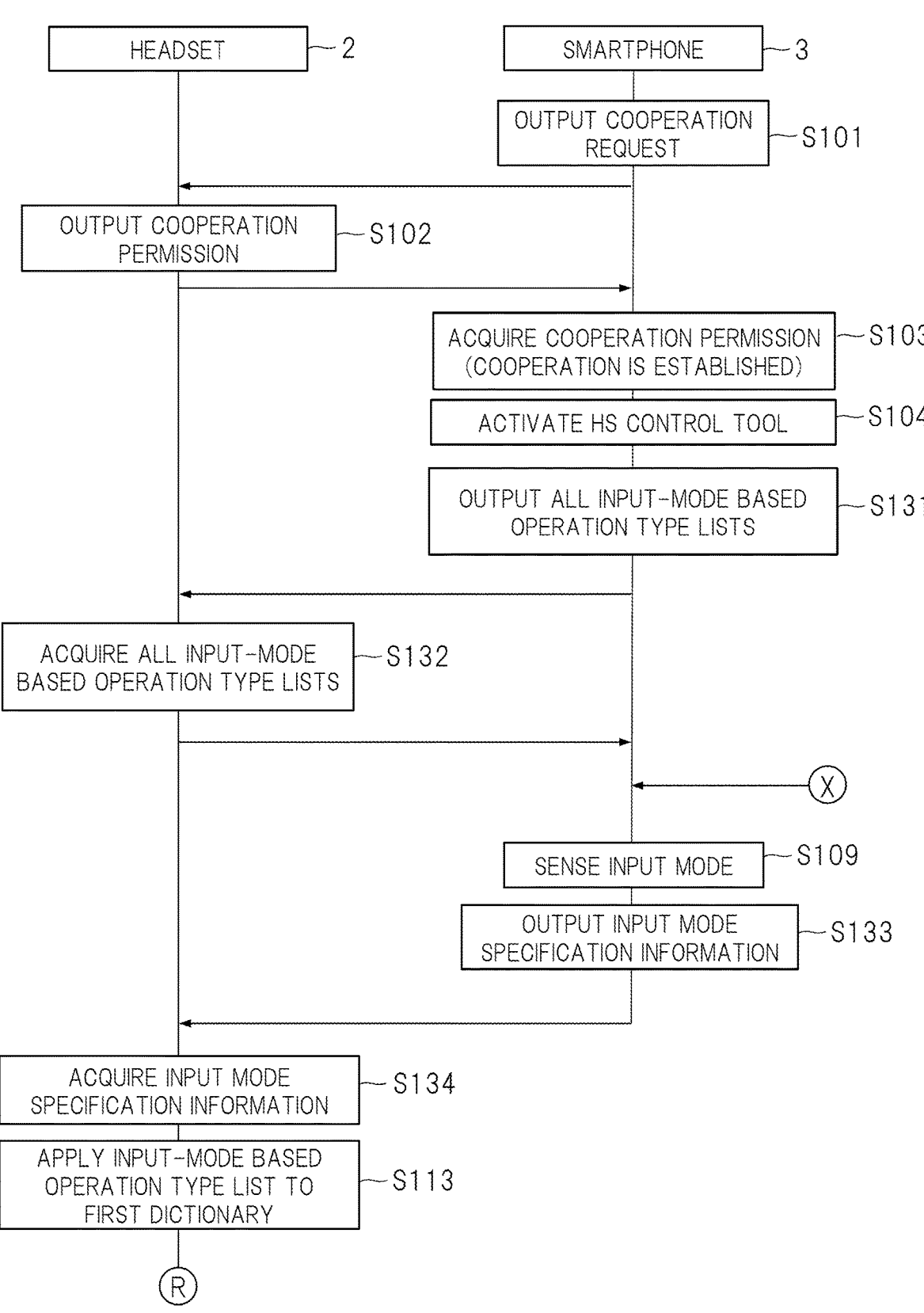
FIG. 24A is a flowchart of processings in a second example of the information processing system according to the second embodiment.

In the flow of processings of FIG. 24A, when the cooperation between the smartphone 3*a* and the headset 2 is established (S103), the headset control tool 316 is activated in the smartphone 3*a* (S104), and then, all the prepared input-mode based operation type lists are collectively output (S131). All the prepared input-mode based operation type lists are acquired by the headset 2. The input mode is sensed in the smartphone 3*a* (S109), and the input mode specification information is output to the headset 2 (S133). The input mode specification information is acquired by the headset 2 (S134), and the input-mode based operation type list corresponding to the input mode specified by this input mode specification information is applied to the first dictionary 211 (S113).

Figure 24B:
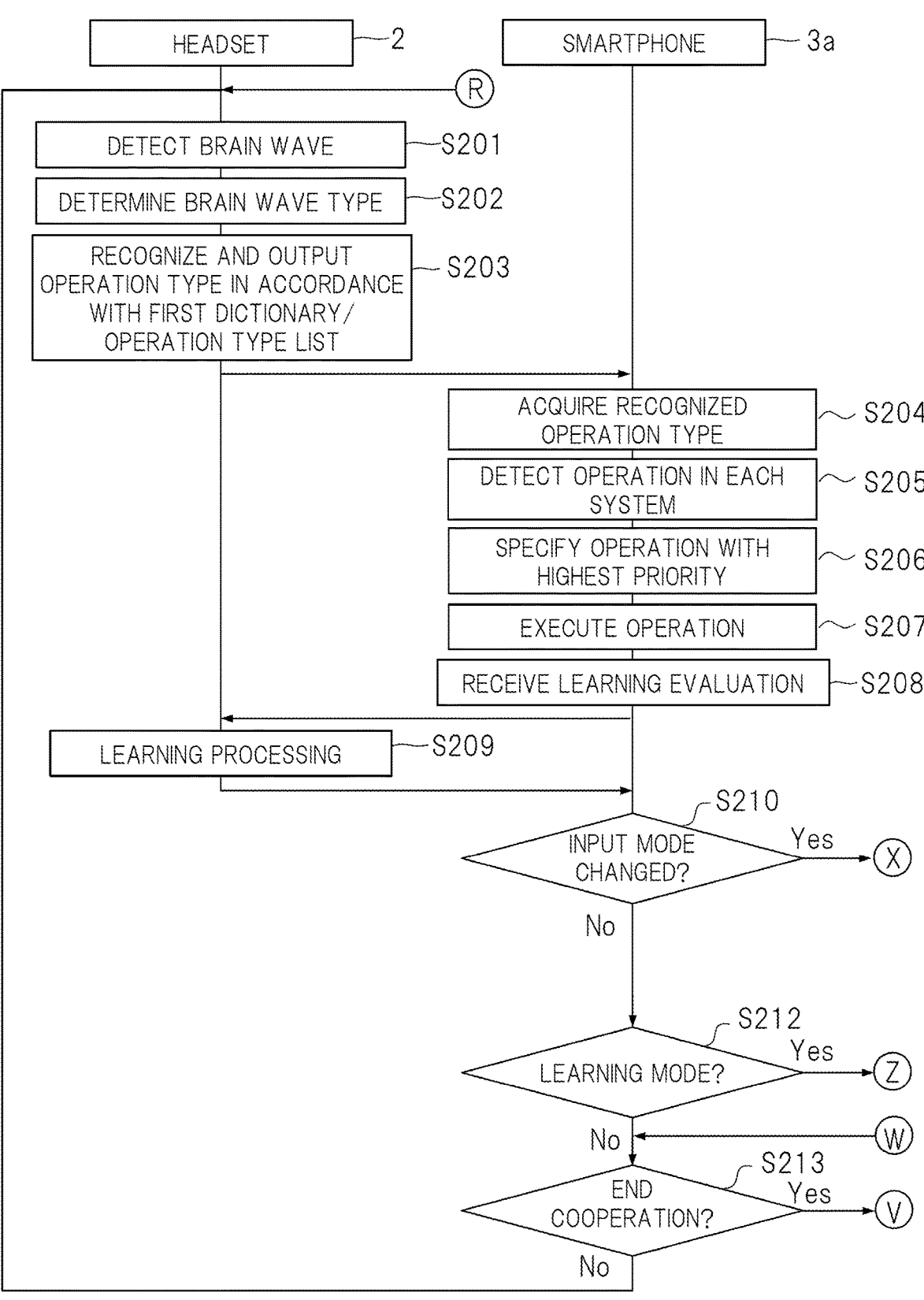
FIG. 24B is a flowchart of processings in the second example of the information processing system according to the second embodiment.
Figure 24C:
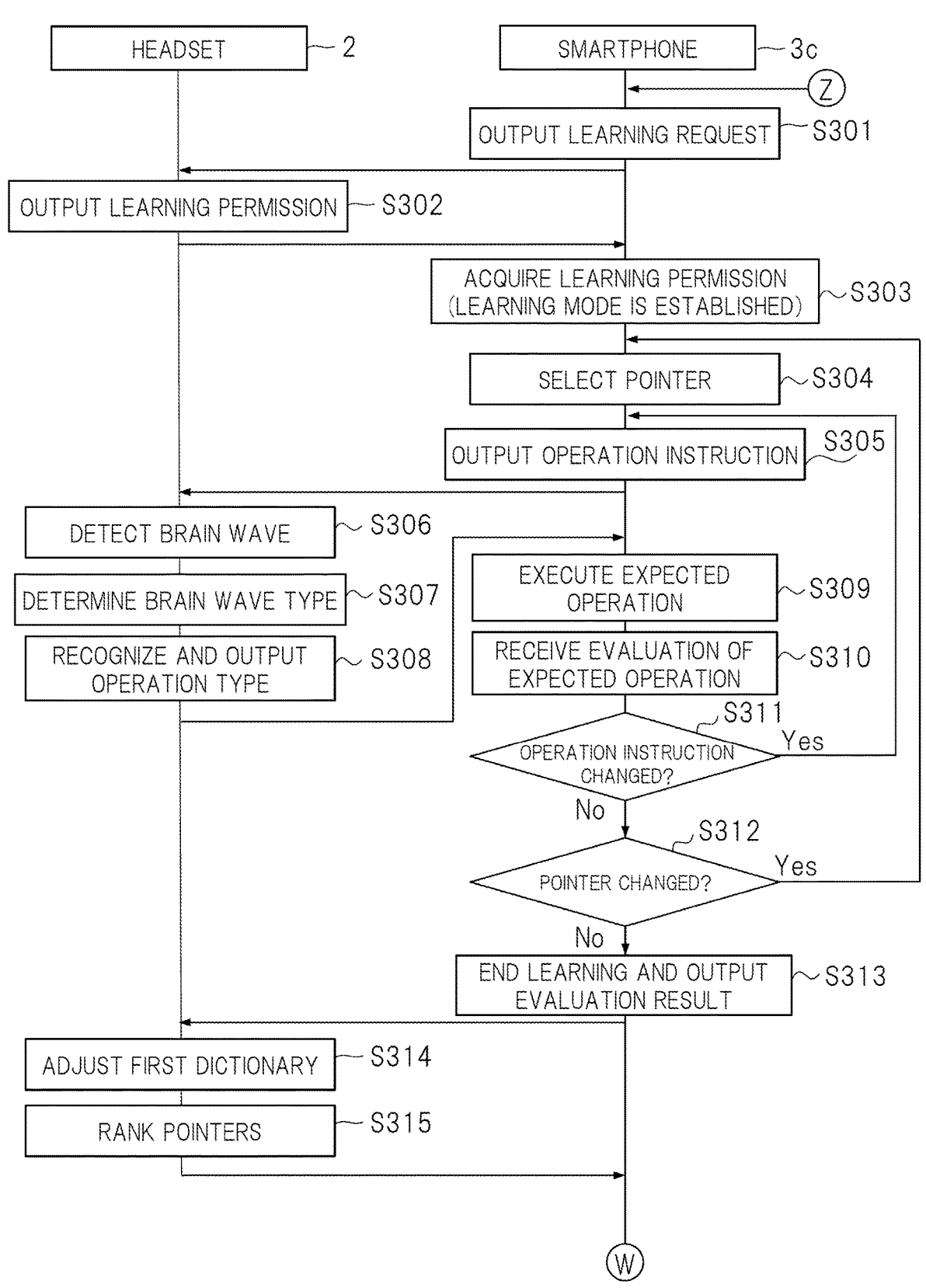
FIG. 24C is a flowchart of processings in the second example of the information processing system according to the second embodiment.
Figure 24D:
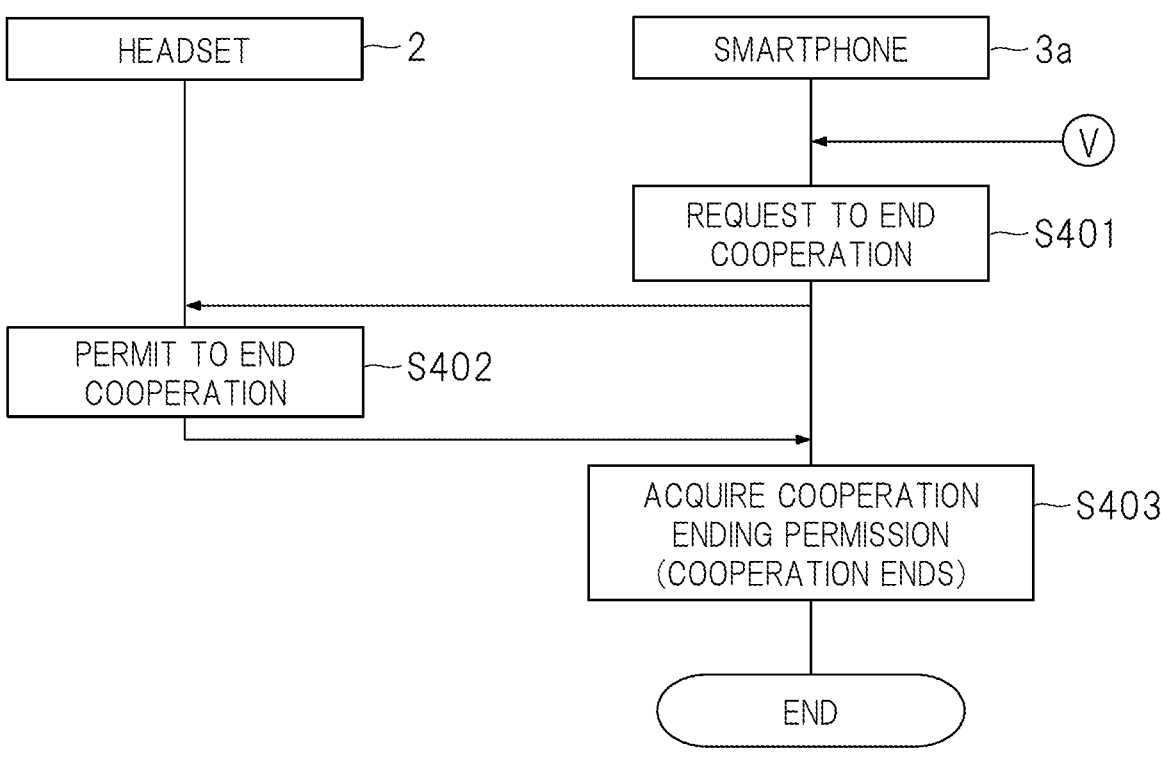
FIG. 24D is a flowchart of processings in the second example of the information processing system according to the second embodiment.

Further, in the flow of processings of FIG. 24B, it is determined whether the input mode has changed (S210). If it is determined that the input mode has not changed (S210: No), it is not determined whether the software in use has changed while it is immediately determined whether the learning mode has been selected (S212). To the contrary, if it is determined that the input mode has changed (S210: Yes), the processing returns to step S109, and the input mode is sensed again.

According to the second embodiment described above, in accordance with the input mode in use in the smartphone 3*a*, the input-mode based operation type list corresponding to this input mode is applied to the first dictionary 211. Thus, candidates of the brain wave types to be determined are narrowed to the brain wave types corresponded to the operation types used in the input mode in use in the smartphone 3. That is, the operation types probably unrequired in the input mode in use are excluded from the operation types to be recognized, and the brain wave types corresponding to these operation types are also excluded from the brain wave types to be determined. That is, the numbers of the brain wave types to be determined and the operation types to be recognized decrease, the brain wave types are easily determined, the operation types are suppressed from being erroneously recognized, and the recognition accuracy is improved. Consequently, as similar to the first embodiment, a highly-feasible and highly-practical expected operation can be achieved by the operations of the information processing terminal. That is, the user's expected operation can be recognized and applied to the operations of the information processing terminal.

Further, according to the second embodiment, it is not required to sense the software in use in the smartphone 3a and prepare the software based operation type list, and thus, the system can be more easily constructed.

Third Embodiment

An information processing system according to a third embodiment is configured so that the brain wave type determination, the operation type recognition, and the like are executed in not the headset but the smartphone.

<Functional Configuration>

A functional configuration of the information processing system according to the third embodiment will be described.

Figure 25:
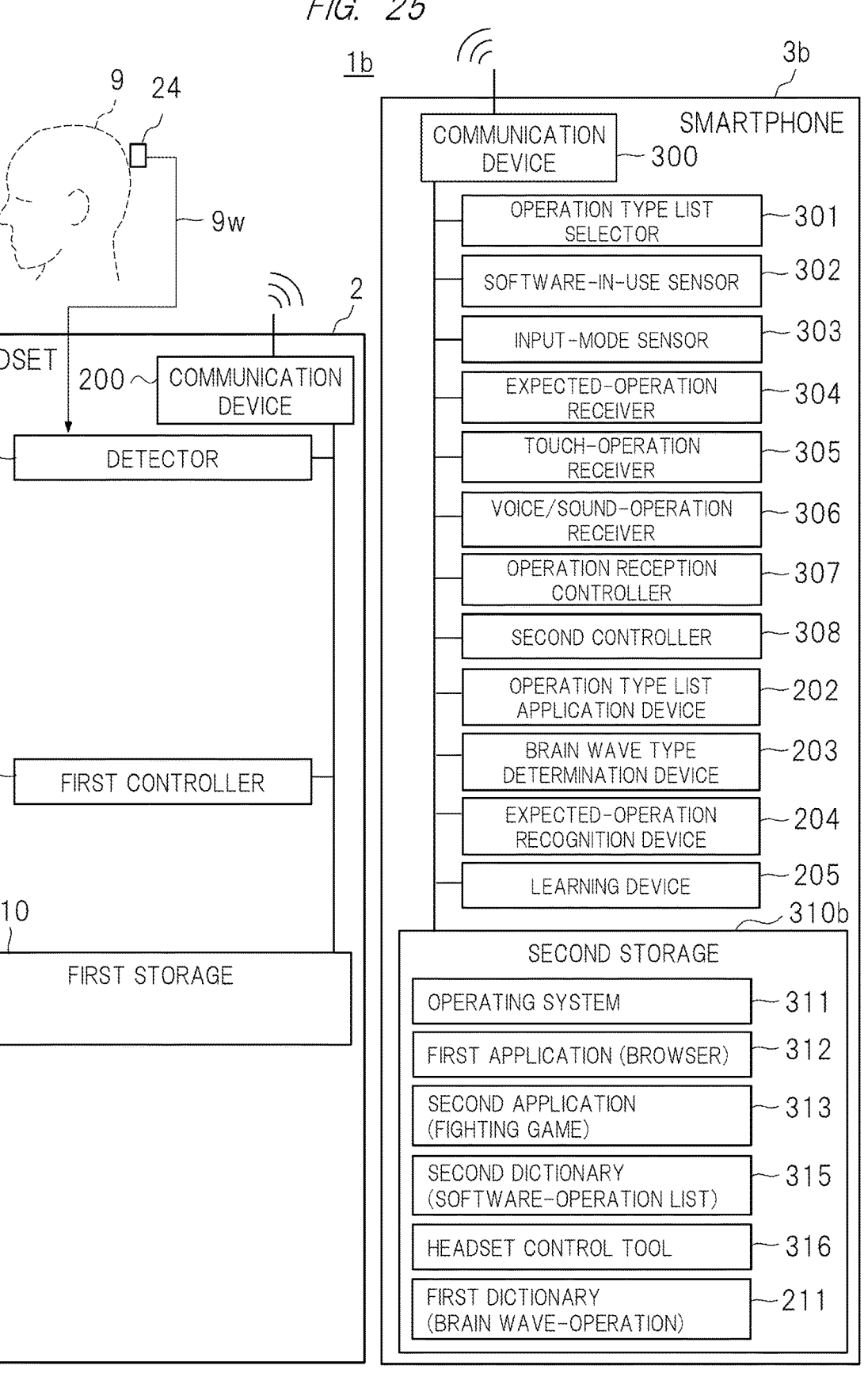
FIG. 25 is a diagram illustrating a configuration of functional blocks of a headset and a smartphone in an information processing system according to a third embodiment.

FIG. 25 is a diagram illustrating a configuration of functional blocks of the headset and the smartphone in the information processing system according to the third embodiment.

As illustrated in FIG. 25, an information processing system 1b according to the third embodiment includes a headset 2b and a smartphone 3b. The headset 2b includes the communication device 200, the detector 201, the first controller 206, and the first storage 210. The smartphone 3b includes the communication device 300, the operation type list selector 301, the software-in-use sensor 302, the input mode sensor 303, the expected-operation receiver 304, the touch operation receiver 305, the voice/sound operation receiver 306, the operation reception controller 307, the second controller 308, the operation type list application device 202, the brain wave type determination device 203, the expected-operation recognition device 204, the learning device 205, and a second storage 310b.

The second storage 310b includes the operating system 311, the first application 312, the second application 313, the second dictionary 315, the headset control tool 316, and the first dictionary 211.

In the third embodiment, the smartphone 3b senses the software and the input mode in use, and applies the input-mode based operation type list corresponding to the sensed software and input mode to the first dictionary 211. The headset 2b is in charge of a processing of detecting and outputting the brain wave of the user to the smartphone 3b. For every change of the software in use, the software in use is sensed, and the software based operation type list corresponding to this software in use is selected. Further, for every change of the input mode, the input mode is sensed and an input-mode based operation type list corresponding to the input mode is applied to the first dictionary 211.

FIGS. 26A to 26D are flowcharts of processings in the second example of the information processing system according to the third embodiment. Differences from the flow of processings in the first embodiment are included in the flow of processings of FIGS. 26A and 26B. Note that only the flow of processings related to the differences from the first embodiment will be described while others will not be described herein.

<<Flow of Processings of Preparing Expected Operation>>

Figure 26A:
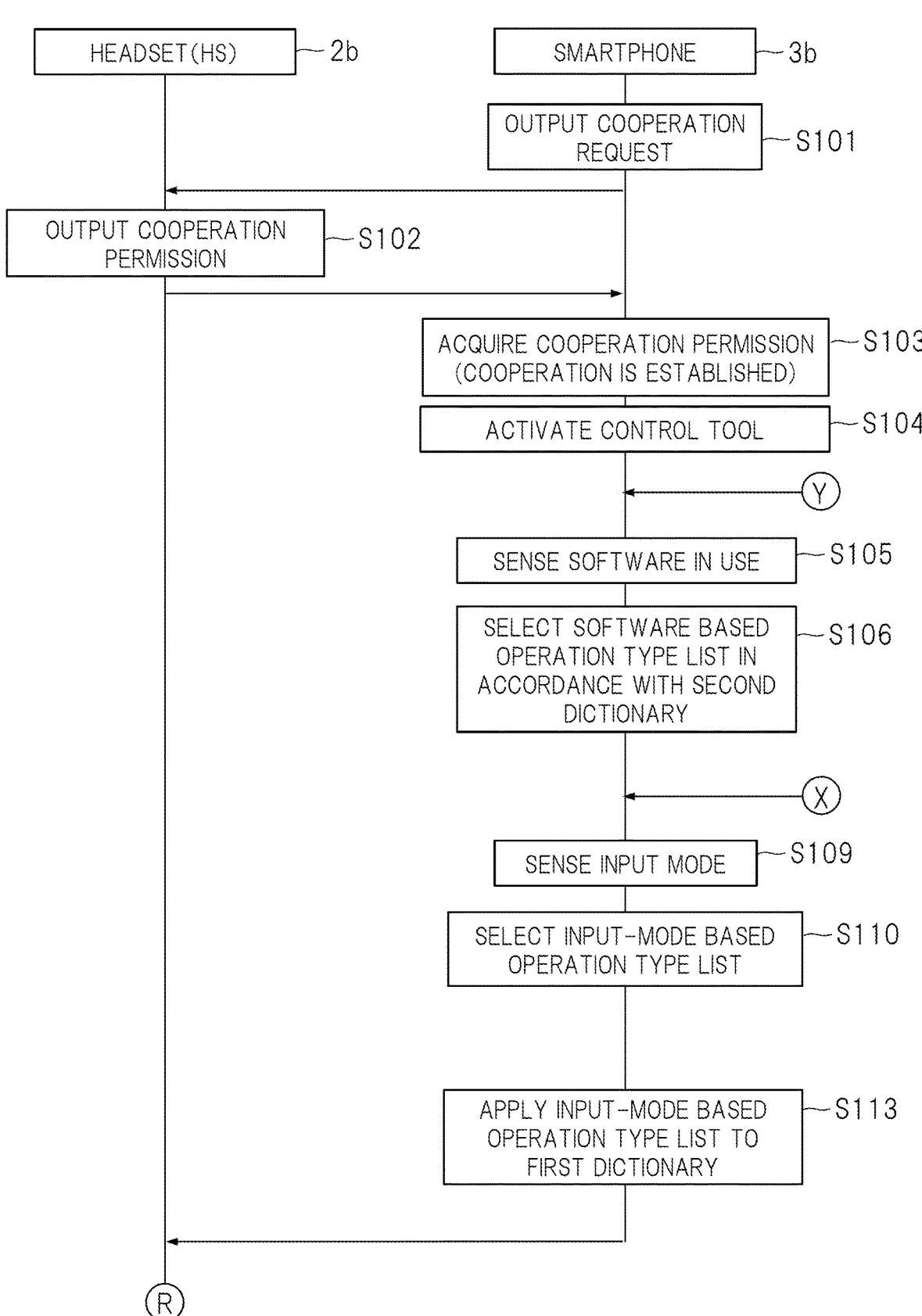
FIG. 26A is a flowchart of processings of the information processing system according to the third embodiment.

As illustrated in FIG. 26A, first, the second controller 308 outputs a cooperation request signal to the headset 2b (S101). The first controller 206 outputs a cooperation permission signal to the smartphone 3b in response to the cooperation request signal (S102). The second controller 308 acquires the cooperation permission signal (S103). In the manner, the cooperation between the headset 2b and the smartphone 3b is established.

After the cooperation is established, the second controller 308 activates the headset control tool 316 stored in the second storage 310b (S104) to achieve transmission/reception of data to/from the headset 2b or control for the operation.

Next, the software-in-use sensor 302 senses the software in use in the smartphone 3b (S105). The operation type list selector 301 selects the software based operation type list corresponded to the specified software with reference to the second dictionary 315 illustrated in FIG. 6 (S106).

In the present example, it is assumed that the software in use is the operating system 311. In this case, the operating system 311 is sensed as the software in use, and the operating-system exclusive use operation type list LA is selected as the software based operation type list.

When the software based operation type list is selected, the second controller 308 senses the input mode in use in the smartphone 3 at this time (S109), and selected the input-mode based operation type list corresponding to the sensed input mode (S110).

In the present example, it is assumed that the pointer input mode is selected as the input mode. Thus, the pointer-input-mode exclusive use operation type list Lp is selected here.

The expected-operation recognition device 204 applies the selected input-mode based operation type list to the first dictionary 211. That is, setting is made so that the operation types to be recognized are limited to the operation types included in the applied input-mode based operation type list from among the operation types registered in the first dictionary 211 (S113).

Here, the pointer-input-mode exclusive use operation type list Lp is applied to the first dictionary 211. Consequently, the operation types to be recognized are narrowed to only the operation types probably required in the pointer input mode.

<<Flow of Processings of Executing Expected Operation>>

Figure 26B:
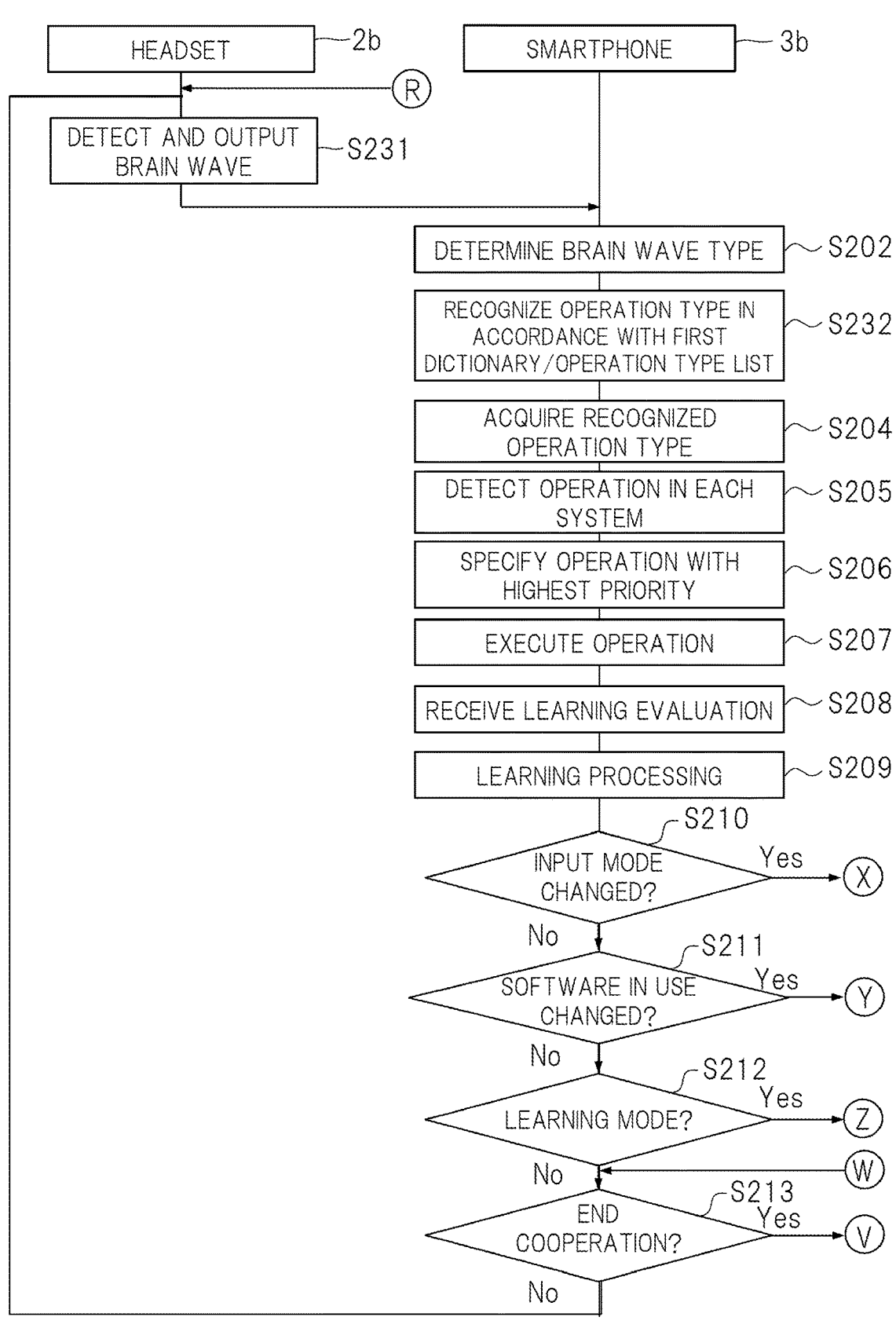
FIG. 26B is a flowchart of processings of the information processing system according to the third embodiment.

As illustrated in FIG. 26B, the detector 201 detects the brain wave of the user, and outputs the detected brain wave to the smartphone 3b (S231). The brain wave type determination device 203 in the smartphone 3b acquires this brain wave, and determines the brain wave type based on the waveform of the acquired brain wave and the like (S202). At this time, the brain wave type is determined while being limited to either any of the brain wave types corresponding to the operation types included in the input-mode based operation type list applied at this time or other brain wave types from among the brain wave types registered in the first dictionary 211. In the present example, the brain wave type is determined while being limited to the brain wave types corresponding to the operation types included in the pointer-input-mode exclusive use operation type list Lp as illustrated in FIG. 8.

The expected-operation recognition device 204 specifies the operation type corresponding to the determined brain wave type with reference to the first dictionary 211, and recognizes that the specified operation type is the user's expected operation type (S232). When the operation type is recognized, the second controller 308 acquires information indicative of the recognized operation type (S204). The operation reception controller 307 detects whether the operation in each operation input system is present (S205). Specifically, it is detected whether the respective operations in the touch input system, the voice/sound input system, and the expectation input system are present. Then, the operation reception controller 307 specifies the operation in the operation input system with the highest priority among the detected operations (S206), and executes the specified operation (S207).

Here, the learning device 205 receives a learning evaluation for the expected operation (S208). The learning evaluation includes information on, for example, whether user's pressing of the "Like!" button has been detected. The learning device 205 executes the learning processings in order to improve the expected-operation recognition accuracy on the basis of the information (S209).

When the learning processing is executed, the second controller 308 determines whether the input mode has changed (S210). Here, if it is determined that the input mode has changed (S210: Yes), the processing returns to step S109. If it is determined that the input mode has not changed (S210: No), the processing proceeds to the next determination. The second controller 308 determines whether the software in use has changed (S211). Here, if it is determined that the software in use has changed (S211: Yes), the processing returns to step S105. If it is determined that the software in use has not changed (S211: No), the processing proceeds to the next determination. The second controller 308 determines whether the leaning mode has been selected by the user (S212). Here, if it is determined that the learning mode has been selected (S212: Yes), the processing proceeds to step S331. If it is determined that the learning mode has not been selected (S212: No), the processing proceeds to the next determination. The second controller 308 determines whether to end the cooperation (S213). As situations in which the cooperation is to be ended, for example, a case of input of an instruction for the end of the cooperation, a case of occurrence of a failure in part of the cooperation, a case of low battery and the like are exemplified. Here, if it is determined that the cooperation is to be ended (S213: Yes), the processing proceeds to step S401. If it is determined that the cooperation is not to be ended (S213: No), the processing returns to step S231.

In this manner, unless the input mode in use has changed, the software in use has changed, the learning mode has been selected, or the cooperation is ended, a cycle of detecting the brain wave to recognize the expected operation and executing the recognized expected operation is continued. The user can achieve the desired operation by operating the pointer 90 displayed on the screen of the smartphone 3b under the expected operation.

<<Flow of Processings in Learning Mode>>

Next, processings in the learning mode will be described.

Figure 26C:
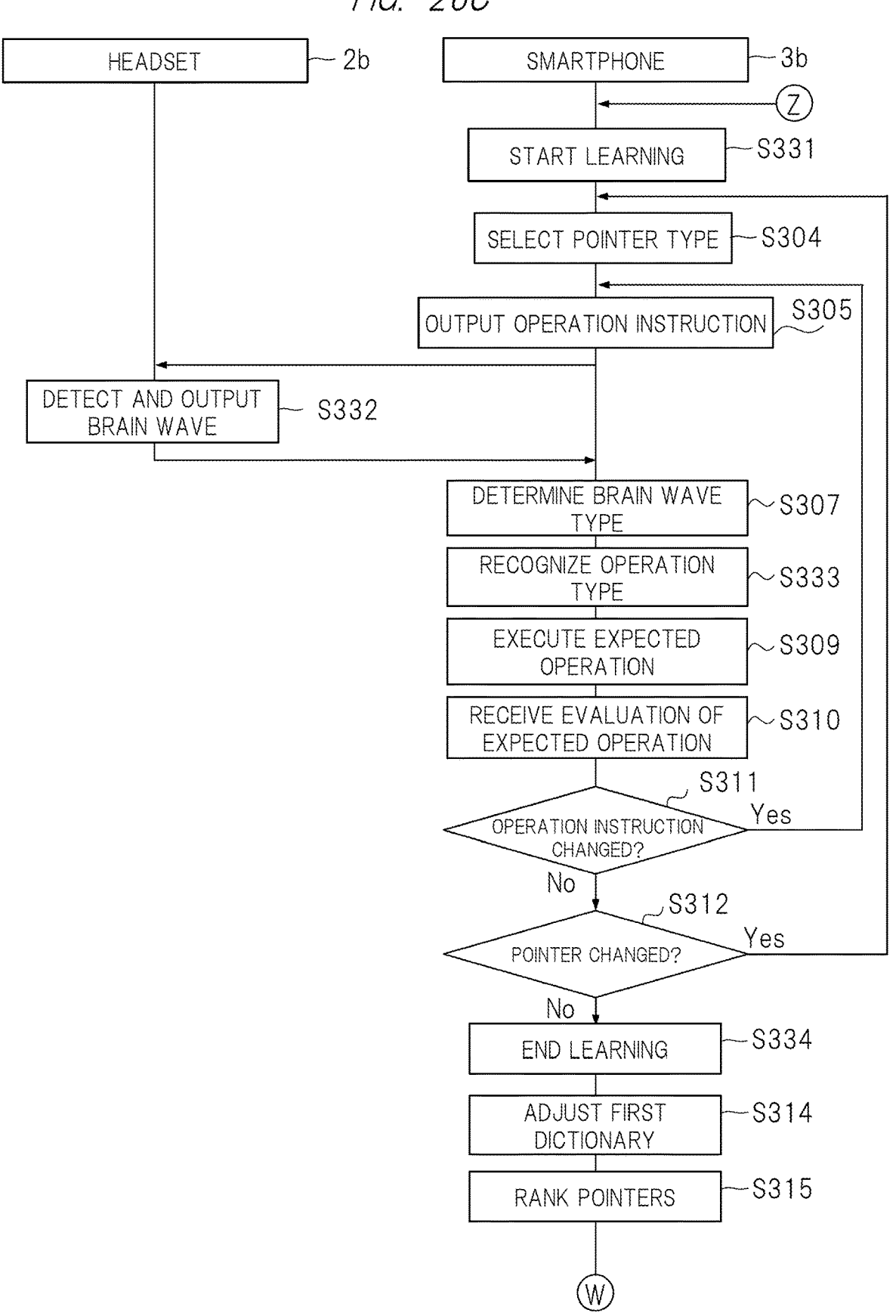
FIG. 26C is a flowchart of processings of the information processing system according to the third embodiment.
Figure 26D:
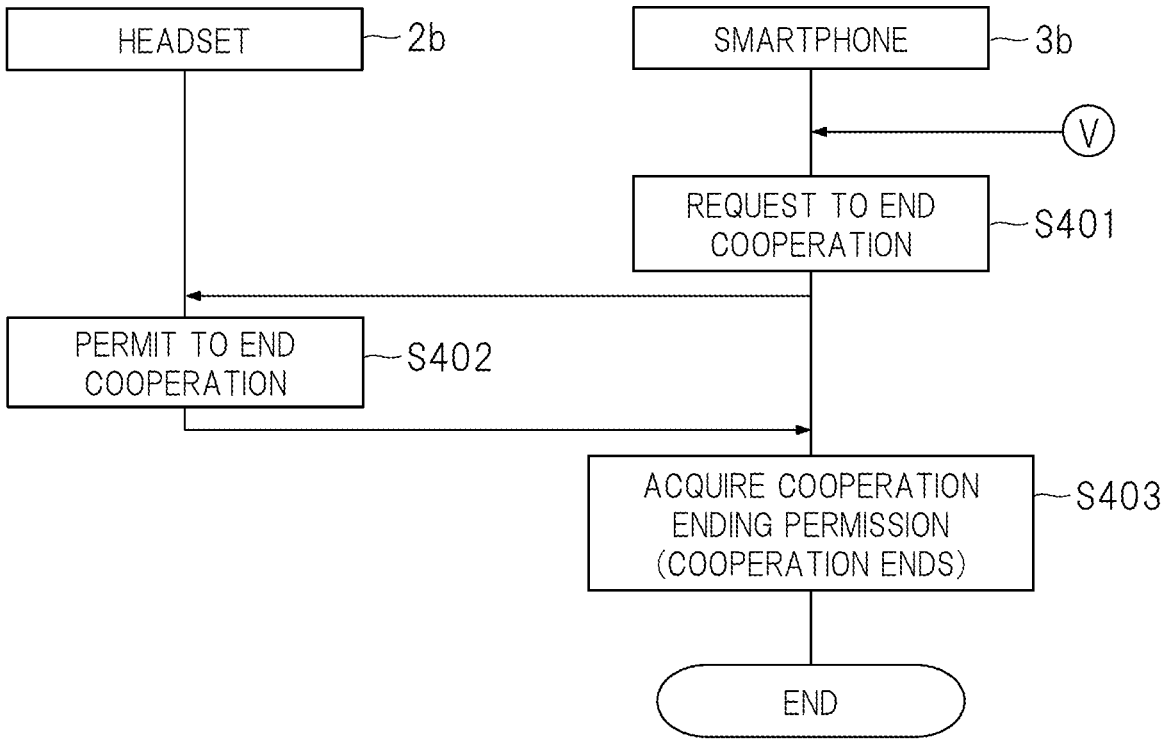
FIG. 26D is a flowchart of processings of the information processing system according to the third embodiment.

As illustrated in FIG. 26C, when the learning mode is selected, the second controller 308 outputs a learning request signal to the headset 2 (S301). The learning device 205 selects one of a plurality of types of pointers previously prepared (S304), and displays the selected pointer on the screen. Further, the learning device 205 outputs an operation instruction for the user (S305). As the operation instruction, an image or text may be displayed, or voice/sound may be output.

When the pointer is displayed while the operation instruction is output, the learning device 205 controls the detector

201 in the headset 2b to detect the brain wave of the user and output it to the smartphone 3b (S306). The brain wave type determination device 203 determines the brain wave type based on the detected brain wave (S307), and the expected-operation recognition device 204 recognizes the operation type with reference to the first dictionary 211 and the applied operation type list on the basis of the determined brain wave type (S333). Further, the learning device 205 stores the brain wave detected in the learning mode into the second storage 310b to be corresponded to its detection timing. The second controller 308 executes the operation corresponding to the recognized operation type (S309).

If the executed operation is the operation exactly expected by the user, he/she presses the "Like!" button, and inputs the evaluation indicating that the expected operation has been successfully executed. If the evaluation indicating that the expected operation has been successfully executed is input, the second controller 308 receives the evaluation (S310), and stores, into the second storage 310b, evaluation result information making correspondence among the type of the operation instruction, the timing, and the evaluation at this time.

The second controller 308 determines whether to change the operation instruction (S311). If it is determined that the operation instruction is to be changed (S311: Yes), the second controller 308 returns the processing to step S305, and changes and outputs the operation instruction. If it is determined that the operation instruction is not to be changed (S311: No), the second controller 308 determines whether to change the pointer (S312).

If it is determined that the pointer is to be changed (S312: Yes), the second controller 308 returns the processing to step S304, and selects another pointer as the pointer to be displayed.

If it is determined that the pointer is not to be changed (S312: No), the second controller 308 ends the learning mode, and outputs the evaluation result information stored in the second storage 310b to the headset 2 (S313). The learning device 205 adjusts the first dictionary 211 on the basis of the acquired evaluation result information (S314). For example, the learning device 205 corrects and adjusts the brain wave pattern of the brain wave types registered in the first dictionary 211 on the basis of the operation type evaluated as the excellent expected operation and the waveform of the brain wave under this operation type to be a pattern to which the characteristics of the brain wave of the user is further reflected. By the adjustment of the first dictionary 211, the brain wave type determination accuracy in the expected operation is improved, and the operation type recognition accuracy is improved. Further, the learning device 205 analyzes which pointer improves the brain wave determination accuracy, and determines the order of the pointers in descending order of accuracy (S315). Information on the order of the pointers is output to the smartphone 3b. The smartphone 3b is set so that the pointer of any type can be selected as the pointer to be displayed with reference to the order of this pointer. Alternatively, this is set so that the pointer of the type with the highest order can be automatically selected.

When the learning mode ends, the second controller 308 returns the step to be executed to S214, and continues the processing.

According to the third embodiment described above, similar effects as in the first embodiment can be obtained. Further, since the processings other than brain wave detection are executed in the smartphone, less processings are executed in the headset and the configuration of the headset can be simplified.

Fourth Embodiment

An information processing system according to a fourth embodiment is configured so that the brain wave type determination, the operation type recognition, and the like are executed in not the headset but the smartphone, and so that the operation type list is specified in response to the input mode of the smartphone and is applied to the first dictionary.

<Functional Configuration>

A functional configuration of the information processing system according to the fourth embodiment will be described.

Figure 27:
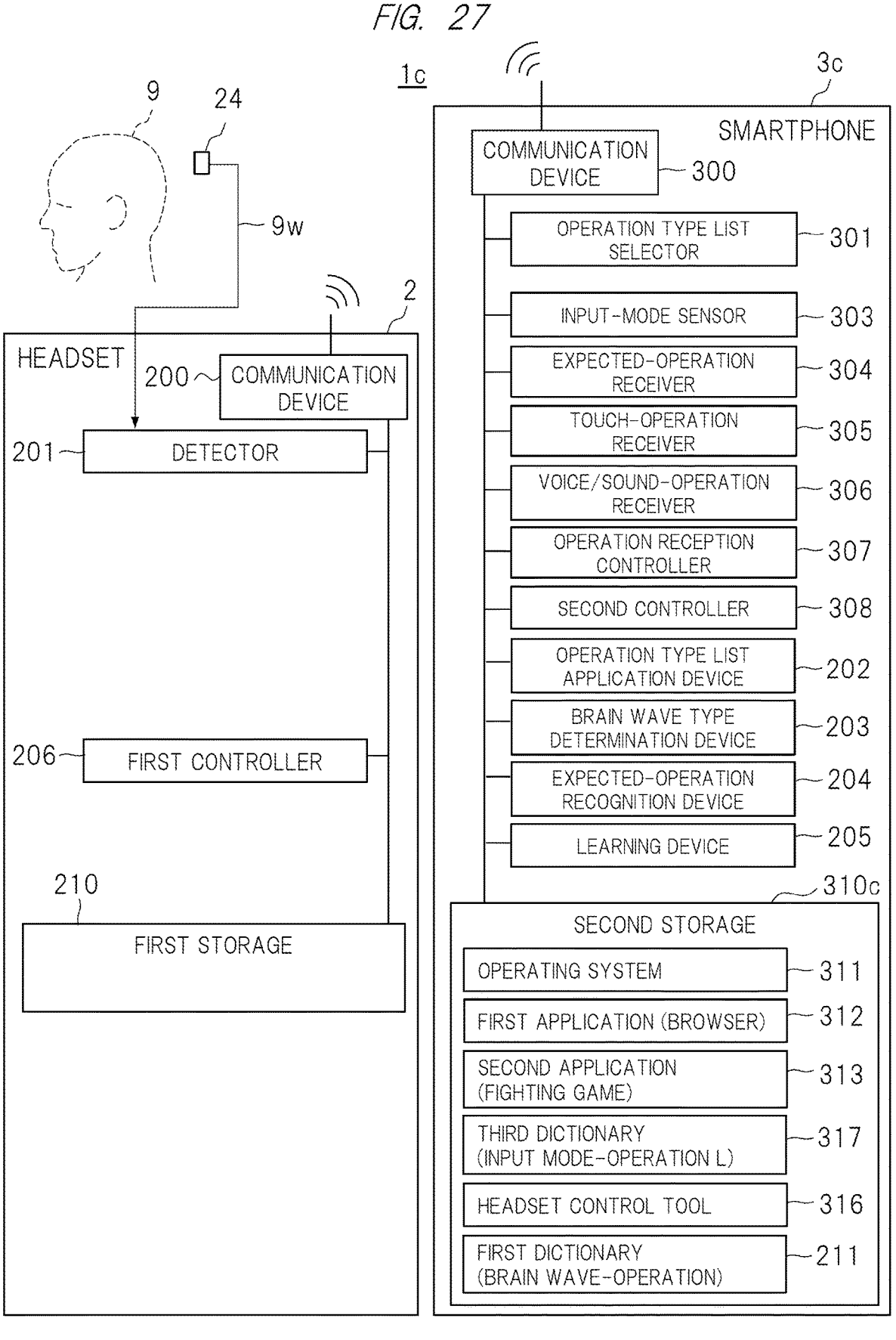
FIG. 27 is a diagram illustrating a configuration of functional blocks of a headset and a smartphone in an information processing system according to a fourth embodiment.

FIG. 27 is a diagram illustrating a configuration of functional blocks of the headset and the smartphone in the information processing system according to the fourth embodiment.

Although an information processing system 1c according to the fourth embodiment is based on the information processing system 1b according to the first embodiment as illustrated in FIG. 27, a second storage 310c in a smartphone 3c stores therein a third dictionary (third table) 317 instead of the second dictionary 315.

The third dictionary 317 is made of a table corresponding the input mode used in the smartphone 3c to the operation type list corresponding to the input mode for each input mode.

FIGS. 28A to 28D are flowcharts of processings in the information processing system according to the fourth embodiment. Differences from the flow of processings in the third embodiment are included in the flow of processings of FIGS. 26A and 26B. Note that only the flow of processings related to the differences from the third embodiment will be described while others will not be described herein.

Figure 28A:
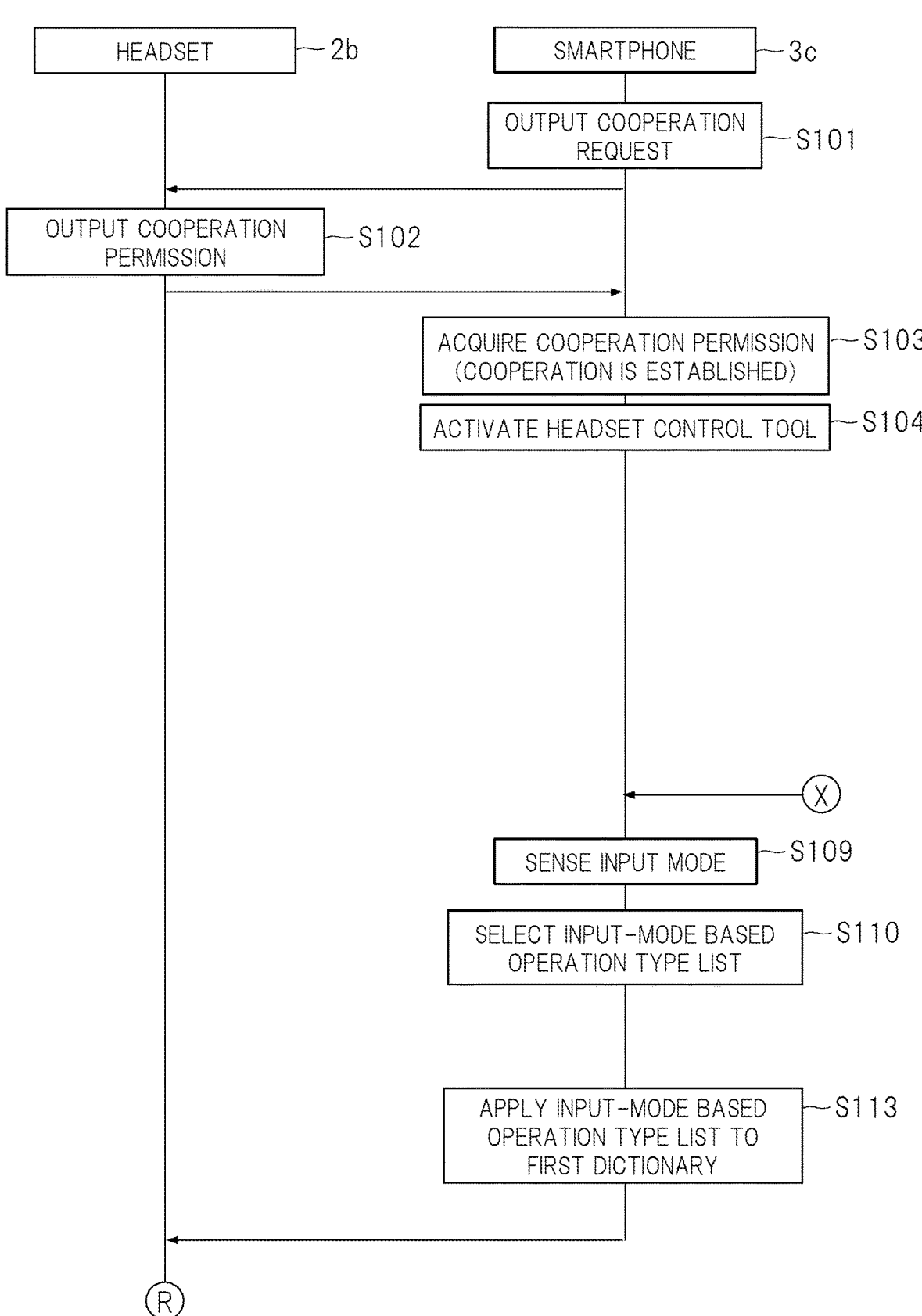
FIG. 28A is a flowchart of processings of the information processing system according to the fourth embodiment.

In the flowchart of processings of FIG. 28A, when cooperation between the smartphone 3c and the headset 2c is established (S103), the headset control tool is activated in the smartphone 3c (S104), and then, not eh software in use but the input mode is sensed (S109). When the input mode is sensed, the input-mode based operation type list corresponding to the sensed input mode is selected (S110), and is applied to the first dictionary 211 (S113).

Figure 28B:
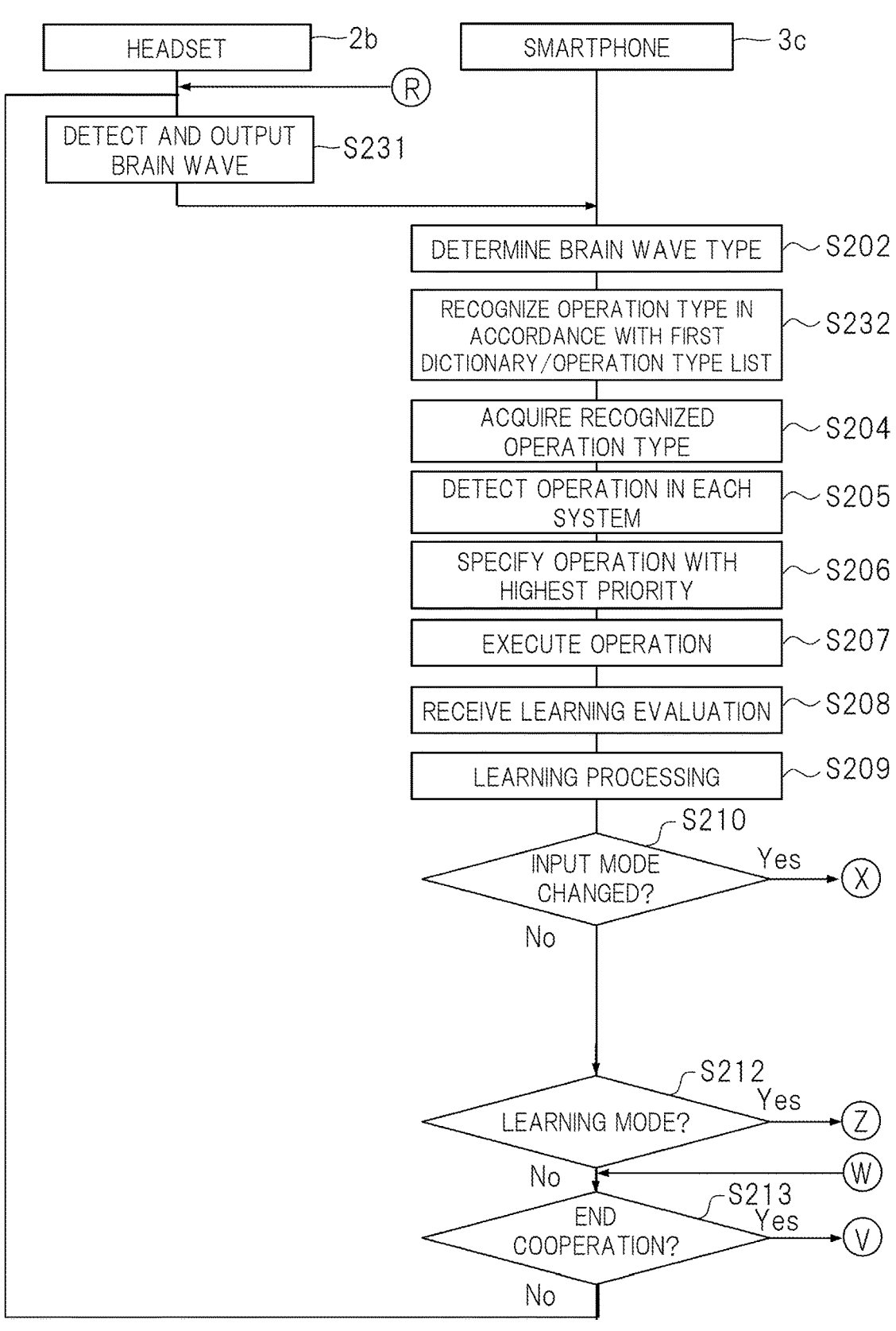
FIG. 28B is a flowchart of processings of the information processing system according to the fourth embodiment.
Figure 28C:
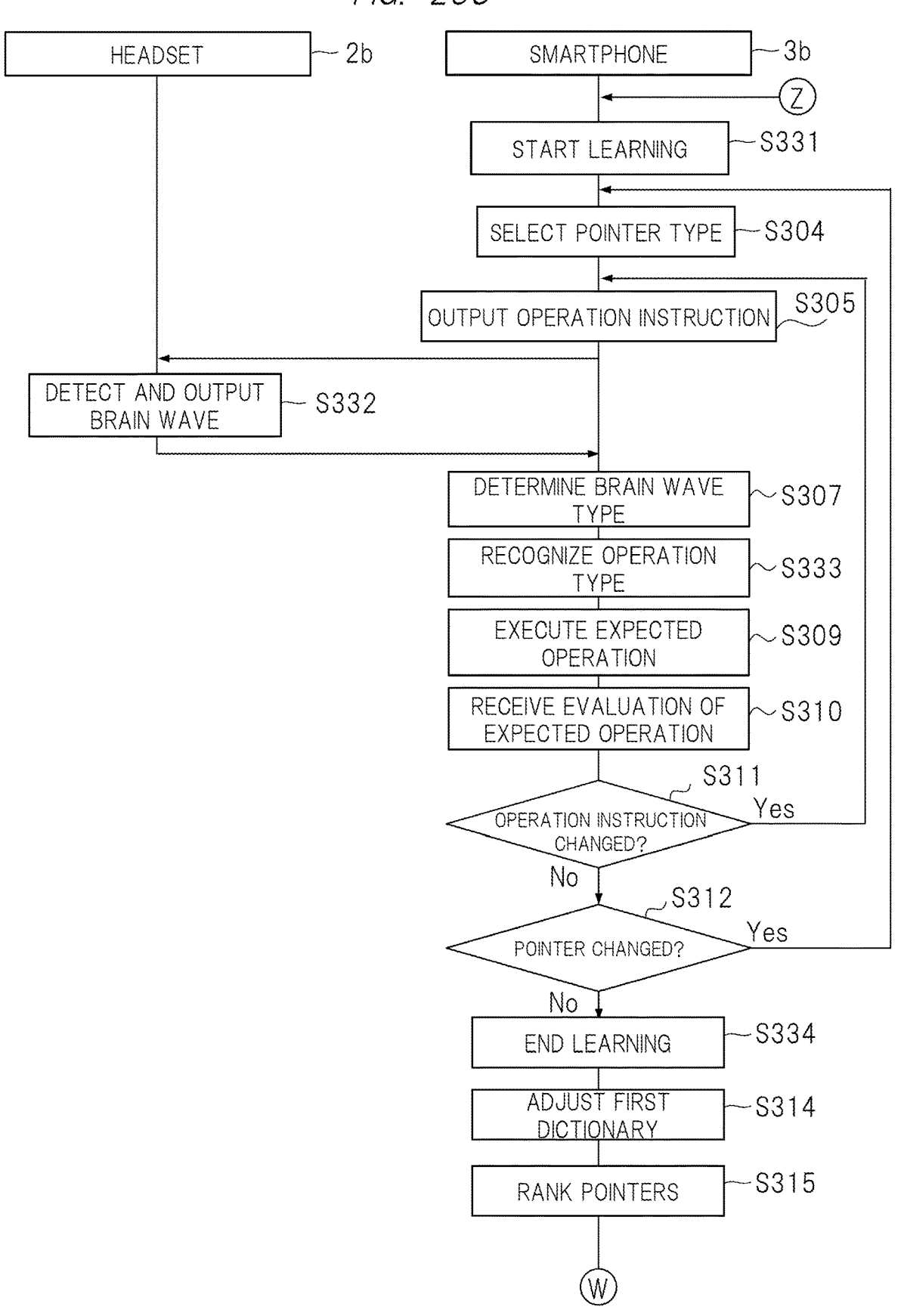
FIG. 28C is a flowchart of processings of the information processing system according to the fourth embodiment.
Figure 28D:
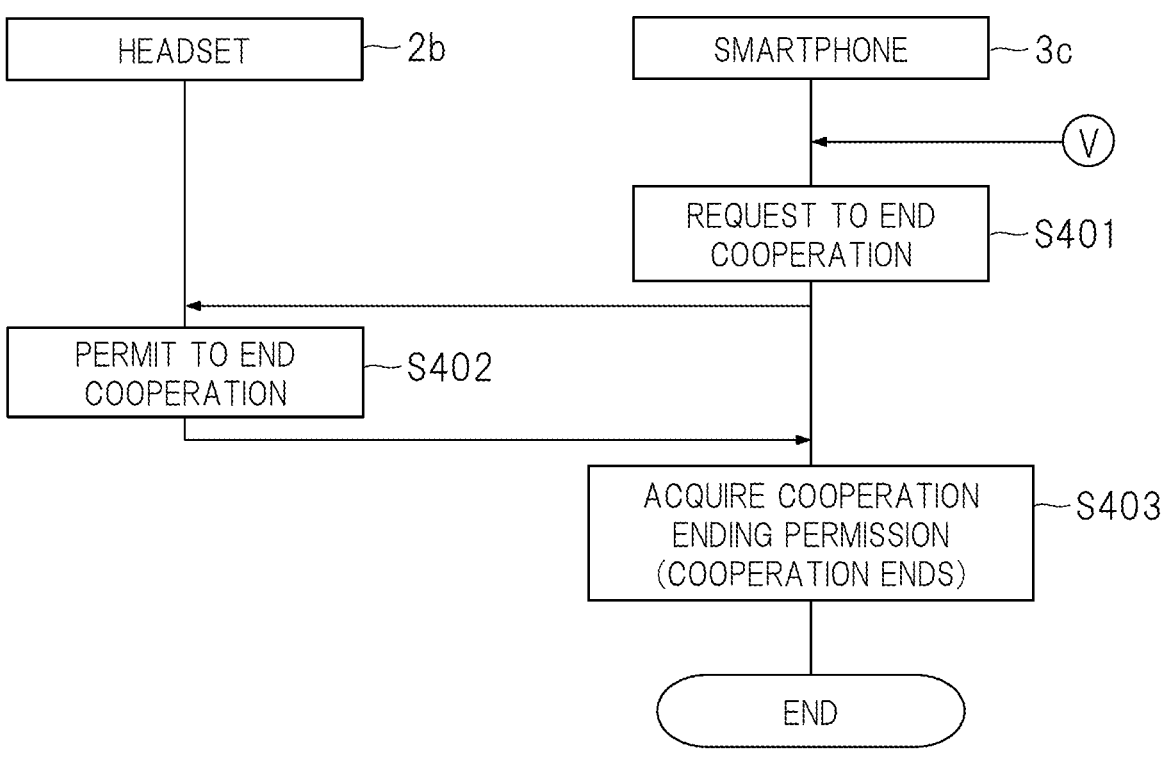
FIG. 28D is a flowchart of processings of the information processing system according to the fourth embodiment.

Further, in the flow of processings of FIG. 28B, it is determined whether the input mode has changed (S210). If it is determined that the input mode has not changed (S210: No), it is not determined whether the software in use has changed while it is immediately determined whether the learning mode has been selected (S212). To the contrary, if it is determined that the input mode has changed (S210: Yes), the processing returns to step S109, and the input mode is sensed again.

According to the fourth embodiment described above, similar effects as those of the second embodiment can be obtained. Further, since the processings other than the brain wave detection are executed in the smartphone, the number of processings executed by the headset can be decreased, and the configuration of the headset can be simplified.

Fifth Embodiment

In each of the embodiments described above, the headset is an exemplary electrode device according to the present invention, and has optional shape, configuration, use form, and the like. Thus, as the electrode device according to the present invention, for example, a cap type device, an unwearable skin-attachable type device, or the like may be used.

Further, in each of the embodiments described above, the smartphone is an exemplary information processing terminal according to the present invention, and has optional shape, size, specification, and the like. Thus, as the information processing terminal according to the present invention, for example, a tablet terminal, a notebook-type personal computer with a touch panel, and the like may be used instead of the smartphone.

Thus, according to each of the embodiments described above, the operation types to be recognized based on the brain wave of the user are limited to the operation types required at this time, and thus, the brain wave types are easily determined, and the operation types are suppressed from being erroneously recognized. Consequently, a highly-feasible and highly-practical expected operation can be achieved by the operations of the information processing terminal.

Further, the expected operation is achieved without high accuracy in the brain wave detection, the brain wave type determination, or the like, and thus, the expected operation of the information processing terminal can be enjoyed even by use of a relatively inexpensive brain wave detector device.

Further, the pointer is displayed on the touch panel display screen, and the operation using the pointer as the reference or origination is set as the operation type to be recognized, and thus, the expected operation can be more intuitively used instead of the touch operation.

In the foregoing, each embodiment of the present invention has been concretely described. However, the present invention is not limited to the foregoing embodiments, and includes various modifications. The above-described embodiments have been explained for easily understanding the present invention, and are not always limited to the one including all structures explained above. Also, a part of the structure of one embodiment can be replaced with the structure of another embodiment, and besides, the structure of another embodiment can be added to the structure of one embodiment. Further, numerical values, messages, and the like included in the specification and the drawings are merely exemplary, and the use of different ones does not lose the effects of the present invention. All these structures belong to the scope of the present invention. Further, the numerical values, the messages and the like in the specification and drawings are only described as examples, and use of different types does not lose the effects of the present invention.

Further, another structure can be added to/eliminated from/replaced with a part of the structure of each embodiment. Further, a part or all of each of configurations, functions, processors, processing means, and the like described above may be achieved in, for example, hardware by an integrated circuit to be designed. Further, each of configurations, functions, and the like described above may be achieved in software by a processor such as a MPU or a CPU which interprets and executes a program for achieving each function. Further, the scope of the function achieved by the software is not limited, and the hardware and the software may be used in combination. Information on a program, a table, a file, and the like achieving each function is stored in a recording device such as a memory, a hard disc, or a solid state drive (SSD) or in a recording medium such as an IC card, an SD card, or a DVD.

Possible forms of the present invention will be stated below.

Statement 1

An expected-operation recognition method includes:

a detection step of detecting a brain wave of a user used for recognizing an operation expected by the user;

a determination step of determining a brain wave type corresponding to the brain wave detected in the detection step from among brain wave types included in a first table with reference to the first table corresponding an operation type received by an information processing terminal to a brain wave type corresponding to the operation type for each of the operation types;

a recognition step of recognizing the operation expected by the user with reference to the first table in accordance with the brain wave type determined in the determination step;

an execution step of executing an operation recognized in the recognition step; and a limitation step of limiting operation types to be recognized in the recognition step in accordance with a type of the software or the input mode in use in the information processing terminal from among operation types included in the first table, in the determination step, a brain wave type corresponding to the detected brain wave is determined from among brain wave types corresponding to the operation types limited in the limitation step.

Statement 2

The expected-operation recognition method according to the statement 1, includes:

a learning step of receiving an evaluation made by the used for the recognized operation and adjusting a waveform of a brain wave type corresponding to the operation type included in the first table in accordance with the operation to be evaluated and a brain wave used for recognizing the operation.

Statement 3

In the expected-operation recognition method according to the statement 1, in the execution step, an operation using a pointer displayed on a screen of the information processing terminal as a reference or an origination is executed.

Statement 4

The expected-operation recognition method according to the statement 3, includes:

a learning step of outputting an operation instruction for the user for each of a plurality of types of pointers sequentially displayed on the screen, receiving an evaluation made by the user for the recognized operation, and ranking the plurality of types of pointers in accordance with the evaluation.

Statement 5

In the expected-operation recognition method according to the statement 1,
the software includes game software.

Statement 6

In the expected-operation recognition method according to the statement 1,
the input mode includes a text input mode.

Statement 7

In the expected-operation recognition method according to the statement 1,
the information processing terminal is a smartphone, a tablet terminal, or a notebook-type personal computer with a touch panel.

EXPLANATION OF REFERENCE CHARACTERS

1: Information processing system, 2: Headset (brain wave detector), 3: Smartphone (information processing terminal), 9: User, 9w: Brain wave, 24: Brain-wave detection electrode device, 200: Communication device (first communication device), 300: Communication device (second communication device), 201: Detector (detection device), 202: Operation type list application device (first processor), 203: Brain wave type determination device (first processor), 204: Expected-operation recognition device, 205: Learning device (learning device), 206: First controller (first processor), 210: First storage (first storage device), 211: First dictionary (conversion dictionary, first table), 301: Operation type list selector (second processor), 302: Software-in-use sensor (second processor), 303: Input mode sensor (second processor), 304: Expected-operation receiver (second processor), 305: Touch operation receiver (second processor), 306: Voice/sound operation receiver (second processor), 307: Operation reception controller (second processor), 308: Second controller (second processor), 310: Second storage (second storage device), 311: Operating system (software), 312: First application (software), 313: Second application (software), 315: Second dictionary (second table), 316: Headset control tool

The invention claimed is:

1. An information processing system comprising:
a brain wave detector; and
an information processing terminal,
wherein the brain wave detector includes:
a detector configured to detect a brain wave signal;
a first storage configured to store a first dictionary having multiple operation codes, each of the operation codes associated with a specific brain wave pattern;
a first processor configured to:
convert the brain wave signal detected by the detector into a brain wave pattern; and
convert the brain wave pattern into an operation code referring specific brain wave pattern in the first dictionary; and
a first transceiver configured to transmit/receive data to/from the information processing terminal, wherein the information processing terminal includes:

a second transceiver configured to transmit/receive data to/from the brain wave detector;

a second processor configured to execute a process of a software in accordance with an operation code received via the second transceiver; and a second storage configured to store a second dictionary having multiple datasets, each of the datasets having operation codes used for a specific software executed in the information processing terminal, and wherein the second processor configured to:

specify, by referring the second dictionary, operation codes corresponding to the software executed in the information processing termina; and transmit the specified operation codes corresponding to the software to the brain wave detector via the second transceiver.

2. The information processing system according to claim 1, wherein the first processor is configured to limit a number of the specific brain wave pattern to be referred for converting in accordance with the specified operation codes corresponding to the software received via the first transceiver.

3. The information processing system according to claim 1, wherein the second storage is configured to store a third dictionary having multiple datasets, each of the datasets having operation codes used for a specific input mode executed in the information processing terminal, wherein the second processor is configured to:

specify, by referring the third dictionary, operation codes corresponding to an input mode executed in the information processing terminal; and transmit the specified operation codes corresponding to the input mode to the brain wave detector, and wherein the first processor is configured to limit a number of the specific brain wave patterns to be referred for converting, in accordance with the specified operation codes corresponding to the input mode received via the first transceiver.

4. The information processing system according to claim 1, wherein the brain wave detector is further comprising a learning device configured to:

receive an evaluation input, and adjust the specific brain wave pattern in the first dictionary in accordance with the evaluation input.

5. The information processing system according to claim 1, wherein the second processor is configured to execute a process using a pointer displayed on a display of the information processing terminal as a reference point or an origination point of an user operation.

6. The information processing system according to claim 5, wherein the brain wave detector is further comprising a learning device configured to:

output operation instructions sequentially on the display, the operation instructions relating to a plurality of types of pointers; and receive evaluation inputs for the operation instructions; and rank the plurality of types of pointers in accordance with the evaluation inputs.

7. The information processing system according to claim 3, wherein the input mode includes a text input mode.

8. The information processing system according to claim 1, wherein the information processing terminal is a smartphone, a tablet terminal, or a notebook-type personal computer with a touch panel.

9. An information processing terminal comprising:

a transceiver configured to transmit/receive data to/from a brain wave detector;

a storage configured to store a dictionary having multiple datasets, each of the datasets having operation codes used for a specific software executed in the information processing terminal; and a processor configured to execute a process of a software in accordance with an operation code via the transceiver, wherein the processor is configured to:

specify, by referring the dictionary, operation codes corresponding to the software executed in the information processing terminal; and transmit the specified operation codes corresponding to the software to the brain wave detector via the transceiver.

10. The information processing terminal according to claim 9, wherein the storage is configured to store a third dictionary having multiple datasets, each of the datasets having operation codes used for a specific input mode executed in the information processing terminal, and wherein the processor is configured to:

specify, by referring the third dictionary, operation codes corresponding to an input mode executed in the information processing terminal; and transmit the specified operation codes corresponding to the input mode to the brain wave detector.

11. The information processing terminal according to claim 9, wherein the processor is configured to execute a process using a pointer displayed on a display of the information processing terminal as a reference point or an origination point of an user operation.

12. A method for an information processing system comprising a brain wave detector and an information processing terminal, the method comprising:

a detection step of detecting a brain wave signal by a brain wave signal detector of the brain wave detector;

a first conversion step of converting the brain wave signal into a brain wave pattern by a first processor of the brain wave detector;

a second conversion step of converting the brain wave pattern into an operation code referring specific brain wave patterns in a first dictionary stored in a first storage of the brain wave detector, the first dictionary comprising multiple operation codes, each of the operation codes associated with a specific brain wave pattern by the first processor; and an execution step of executing a process of a software, by a second processor of the information processing terminal, in accordance with the operation code received via a second transceiver of the information processing terminal, wherein the method further comprising:

a first specifying step of specifying operation codes, by the second processor of the information processing terminal, corresponding to the software executed in the information processing terminal referring a second dictionary stored in a second storage of the information processing terminal, the second dictionary comprising multiple datasets, each of the datasets having operation codes used for a specific software executed in the information processing terminal;

a first transmitting step of transmitting the operation codes specified in the first specifying step to the brain wave detector, by the second transceiver of the information processing terminal; and a first receiving step of receiving the operation codes specified in the first specifying step, by a first transceiver of the brain wave detector.

13. The method according to claim 12, further comprising a first limitation step of limiting a number of the specific brain wave patterns to be referred in the second conversion step in accordance with the specified operation codes received via the first transceiver by the first processor.

14. The method according to claim 12, further comprising:

a second specifying step of specifying operation codes, by the second processor of the information processing terminal, corresponding to an input mode executed in the information processing terminal referring a third dictionary stored in the second storage of the information processing terminal, the third dictionary comprising multiple datasets, each of the datasets having operation codes used for a specific input mode executed in the information processing terminal;

a second transmitting step of transmitting the operation codes specified in the second specifying step to the brain wave detector, by the second transceiver; and a second receiving step of receiving the operation codes specified in the second specifying step, by the first transceiver.

\* \* \* \* \*